(12) United States Patent
Kajiwara et al.

(10) Patent No.: US 7,650,039 B2
(45) Date of Patent: Jan. 19, 2010

(54) IMAGE ENCODING APPARATUS, IMAGE DECODING APPARATUS, CONTROL METHOD THEREFOR, COMPUTER PROGRAM, AND COMPUTER-READABLE STORAGE MEDIUM

(75) Inventors: Hiroshi Kajiwara, Tokyo (JP); Yuki Matsumoto, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 797 days.

(21) Appl. No.: 11/366,666

(22) Filed: Mar. 3, 2006

(65) Prior Publication Data

US 2006/0210176 A1    Sep. 21, 2006

(30) Foreign Application Priority Data

Mar. 3, 2005 (JP) .............................. 2005-059361
Mar. 3, 2005 (JP) .............................. 2005-059363

(51) Int. Cl.
G06K 9/46       (2006.01)

(52) U.S. Cl. ...................................... 382/238
(58) Field of Classification Search ................. 382/238
See application file for complete search history.

(56) References Cited

U.S. PATENT DOCUMENTS

| 5,828,789 | A |   | 10/1998 | Yokose et al. ............... 382/239 |
| 5,945,930 | A |   | 8/1999  | Kajiwara ..................... 341/50  |
| 5,991,449 | A | * | 11/1999 | Kimura et al. .............. 382/238 |
| 6,028,963 | A |   | 2/2000  | Kajiwara ..................... 382/239 |
| 6,031,938 | A |   | 2/2000  | Kajiwara ..................... 382/239 |
| 6,097,364 | A |   | 8/2000  | Miyamoto et al. ............ 345/97  |
| 6,101,282 | A |   | 8/2000  | Hirabayashi et al. ........ 382/246 |
| 6,212,234 | B1 |  | 4/2001  | Andoh et al. ........... 375/240.08 |
| 6,233,355 | B1 |  | 5/2001  | Kajiwara ..................... 382/238 |

(Continued)

FOREIGN PATENT DOCUMENTS

JP        9-224253        8/1997

(Continued)

OTHER PUBLICATIONS

Wallace; "The JPEG Still Picture Compression Standard", Communications of the ACM, vol. 34, Issue 4, Apr. 1991.*

(Continued)

*Primary Examiner*—Vikkram Bali
*Assistant Examiner*—Eueng-Nan Yeh
(74) *Attorney, Agent, or Firm*—Fitzpatrick, Cella, Harper & Scinto

(57) ABSTRACT

An image having few colors can be losslessly encoded at a higher compression ratio. For this purpose, pixel data are input in raster order and temporarily stored in a buffer. A neighborhood matching determination unit generates first information representing whether a pixel having the same color as that of the pixel of interest exists in neighboring pixels and second information specifying whether a pixel having the same color as that of the pixel of interest exists, and if the pixel having the same color exists, specifying the neighboring pixel. A pixel matching detection unit counts the number of colors contained in the neighboring pixels and generates information representing whether the number of colors is two or less, or three or less. On the basis of the information, a code generation unit outputs one or both of encoded data from a matched-pixel position encoding unit and a prediction error encoding unit.

12 Claims, 37 Drawing Sheets

U.S. PATENT DOCUMENTS

| | | |
|---|---|---|
| 6,310,980 B1 | 10/2001 | Kajiwara .................... 382/238 |
| 6,501,859 B1 | 12/2002 | Kajiwara .................... 382/239 |
| 6,549,676 B1 | 4/2003 | Nakayama et al. .......... 382/246 |
| 6,560,365 B1 | 5/2003 | Nakayama et al. .......... 382/233 |
| 6,665,444 B1 | 12/2003 | Kajiwara .................... 382/240 |
| 6,711,295 B2 | 3/2004 | Nakayama et al. .......... 382/232 |
| 6,768,819 B2 | 7/2004 | Yamazaki et al. ........... 382/240 |
| 6,847,735 B2 | 1/2005 | Kajiwara et al. ............ 382/233 |
| 6,879,726 B2 | 4/2005 | Sato et al. ................... 382/239 |
| 6,879,727 B2 | 4/2005 | Sato et al. ................... 382/239 |
| 6,917,716 B2 | 7/2005 | Kajiwara et al. ............ 382/240 |
| 6,947,600 B1 | 9/2005 | Sato et al. ................... 382/233 |
| 6,985,630 B2 | 1/2006 | Kajiwara .................... 382/233 |
| 7,013,050 B2 | 3/2006 | Kajiwara .................... 382/240 |
| 7,031,536 B2 | 4/2006 | Kajiwara .................... 382/240 |
| 2004/0013312 A1 | 1/2004 | Kajiwara .................... 382/240 |
| 2004/0213347 A1 | 10/2004 | Kajiwara ............... 375/240.11 |
| 2005/0100226 A1 | 5/2005 | Kajiwara et al. ............ 382/232 |
| 2005/0249283 A1 | 11/2005 | Kajiwara et al. ........ 375/240.12 |
| 2006/0013304 A1 | 1/2006 | Maeda et al. .......... 375/240.11 |
| 2006/0045362 A1 | 3/2006 | Ito et al. ..................... 382/232 |
| 2006/0210176 A1 | 9/2006 | Kajiwara et al. ............ 382/232 |
| 2006/0262982 A1 | 11/2006 | Matsumoto et al. ......... 382/238 |
| 2007/0160299 A1 | 7/2007 | Kajiwara et al. ............ 382/240 |
| 2007/0217703 A1 | 9/2007 | Kajiwara .................... 382/238 |
| 2008/0089413 A1 | 4/2008 | Kishi et al. ............ 375/240.13 |

FOREIGN PATENT DOCUMENTS

| | | |
|---|---|---|
| JP | 10-004551 | 1/1998 |
| JP | 10-004557 | 1/1998 |
| JP | 10-336458 | 12/1998 |

OTHER PUBLICATIONS

CCITT; Information Technology—Digital Compression And Coding of Continuous-Tone Still Images—Requirements and Guidelines; T.81, Sep. 1992.*

* cited by examiner

FIG. 3

|   | c | b | d |
|---|---|---|---|
|   | a | x |   |

FIG. 4

| m : PREDICTION SELECTION SIGNAL | PREDICTION EQUATION |
|---|---|
| 0 | NONE |
| 1 | p=a |
| 2 | p=b |
| 3 | p=c |
| 4 | p=a+b−c |
| 5 | p=a+((b−c)/2) |
| 6 | p=b+((a−c)/2) |
| 7 | p=(a+b)/2 |

FIG. 5

| SSSS | e : PREDICTION ERROR |
|---|---|
| 0 | 0 |
| 1 | −1, 1 |
| 2 | −3, −2, 2, 3 |
| 3 | −7〜−4, 4〜7 |
| 4 | −15〜−8, 8〜15 |
| 5 | −31〜−16, 16〜31 |
| 6 | −63〜−32, 32〜63 |
| 7 | −127〜−64, 64〜127 |
| 8 | −255〜−128, 128〜255 |
| 9 | −511〜−256, 256〜511 |
| 10 | −1023〜−512, 512〜1023 |
| 11 | −2047〜−1024, 1024〜2047 |
| 12 | −4095〜−2048, 2048〜4095 |
| 13 | −8191〜−4096, 4096〜8191 |
| 14 | −16383〜−8192, 8192〜16383 |
| 15 | −32767〜−16384, 16384〜32767 |
| 16 | 32768 |

FIG. 6

| SSSS | CODE WORD |
|---|---|
| 0 | 0 |
| 1 | 010 |
| 2 | 011 |
| 3 | 100 |
| 4 | 101 |
| 5 | 110 |
| 6 | 1110 |
| 7 | 11110 |
| 8 | 111110 |
| 9 | 1111110 |
| 10 | 11111110 |
| 11 | 111111110 |
| 12 | 1111111110 |
| 13 | 11111111110 |
| 14 | 111111111110 |
| 15 | 1111111111110 |
| 16 | 1111111111111 |

FIG. 7

| VECTOR INFORMATION | CODE WORD |
|---|---|
| 0 | 0 |
| 1 | 10 |
| 2 | 110 |
| 3 | 111 |

FIG. 8A

FOR SURROUNDING PIXEL STATE INFORMATION 108 = 0

| PREDICTIVELY ENCODED DATA OF R COMPONENT | PREDICTIVELY ENCODED DATA OF G COMPONENT | PREDICTIVELY ENCODED DATA OF B COMPONENT |
|---|---|---|

FIG. 8B

FOR SURROUNDING PIXEL STATE INFORMATION 108 = 1 & MATCHED-PIXEL PRESENCE INFORMATION = 0

| ENCODED DATA OF VECTOR INFORMATION |
|---|

FIG. 8C

FOR SURROUNDING PIXEL STATE INFORMATION 108 = 1 & MATCHED-PIXEL PRESENCE INFORMATION = 1

| ENCODED DATA OF VECTOR INFORMATION | PREDICTIVELY ENCODED DATA OF R COMPONENT | PREDICTIVELY ENCODED DATA OF G COMPONENT | PREDICTIVELY ENCODED DATA OF B COMPONENT |
|---|---|---|---|

FIG. 9

| Header | ENCODED DATA OF PIXEL | ENCODED DATA OF PIXEL | ENCODED DATA OF PIXEL | ---------- | ENCODED DATA OF PIXEL |

FIG. 15A

WHEN Nc = 1

| VECTOR INFORMATION | CODE WORD |
|---|---|
| 0 | 1 |
| 1 | 0 |

FIG. 15B

WHEN Nc = 2

| VECTOR INFORMATION | CODE WORD |
|---|---|
| 0 | 1 |
| 1 | 01 |
| 2 | 00 |

FIG. 15C

WHEN Nc = 3

| VECTOR INFORMATION | CODE WORD |
|---|---|
| 0 | 01 |
| 1 | 001 |
| 2 | 000 |
| 3 | 1 |

FIG. 16

| k\v | 0 VARIABLE LENGTH PART | 0 FIXED-LENGTH PART | 1 VARIABLE LENGTH PART | 1 FIXED-LENGTH PART | 2 VARIABLE LENGTH PART | 2 FIXED-LENGTH PART | 3 VARIABLE LENGTH PART | 3 FIXED-LENGTH PART |
|---|---|---|---|---|---|---|---|---|
| 0 | 1 | | 1 | 0 | 1 | 00 | 1 | 000 |
| 1 | 01 | | 1 | 1 | 1 | 01 | 1 | 001 |
| 2 | 001 | | 01 | 0 | 1 | 10 | 1 | 010 |
| 3 | 0001 | | 01 | 1 | 1 | 11 | 1 | 011 |
| 4 | 00001 | | 001 | 0 | 01 | 00 | 1 | 100 |
| 5 | 000001 | | 001 | 1 | 01 | 01 | 1 | 101 |
| 6 | 0000001 | | 0001 | 0 | 01 | 10 | 1 | 110 |
| 7 | 00000001 | | 0001 | 1 | 01 | 11 | 1 | 111 |
| 8 | 000000001 | | 00001 | 0 | 001 | 00 | 01 | 000 |

FOR SURROUNDING PIXEL STATE INFORMATION = 0

| ENCODED DATA OF VECTOR INFORMATION |
|---|

FIG. 26A

FOR SURROUNDING PIXEL STATE INFORMATION = 1

| ENCODED DATA OF VECTOR INFORMATION | UNCOMPRESSED DATA OF R COMPONENT | UNCOMPRESSED DATA OF G COMPONENT | UNCOMPRESSED DATA OF B COMPONENT |
|---|---|---|---|

| Nc | VECTOR INFORMATION | | NEIGHBORING PIXEL STATE INFORMATION |
|---|---|---|---|
| 1 | FOR X = Xa, | 0 | 0 |
| 1 | FOR X ≠ Xa, | 1 | 1 |
| 2 | FOR X = X1, | 0 | 0 |
| 2 | FOR X = X2, | 1 | 0 |
| 2 | IN OTHER CASES, | 2 | 1 |
| 3 | FOR X = X1, | 0 | 0 |
| 3 | FOR X = X2, | 1 | 0 |
| 3 | FOR X = X3, | 2 | 0 |
| 3 | IN OTHER CASES, | 3 | 1 |
| 4 | UNCONDITIONALLY, | 4 | 1 | ent data of each pixel are input in the order of R, G, and B.
IMAGE ENCODING APPARATUS, IMAGE DECODING APPARATUS, CONTROL METHOD THEREFOR, COMPUTER PROGRAM, AND COMPUTER-READABLE STORAGE MEDIUM

FIELD OF THE INVENTION

The present invention relates to a technique of losslessly encoding/decoding an image.

BACKGROUND OF THE INVENTION

As a conventional method of configuring an image processing apparatus which losslessly encodes and decodes an image, a predictive coding-based method has been proposed. A predictive encoding apparatus generally has a string conversion unit which converts image data into a prediction error by predictive transform. The predictive encoding apparatus also has an entropy encoding unit which converts the prediction error output from the string conversion unit into encoded data of less redundancy by using entropy encoding such as Huffman encoding.

JPEG (ITU-T T.81|ISO/IEC 10918-1) recommended as a still image coding scheme of an international standard by ISO and ITU-T defines a lossless coding scheme in which a lossless process is based on predictive coding. This lossless coding scheme will be called a JPEG lossless coding mode. In the JPEG lossless coding mode, seven prediction equations are defined as a method of predicting the value of a pixel of interest from neighboring pixels, and the prediction method can be selected in accordance with an image.

FIG. 2 is a block diagram showing a conventional image processing apparatus. FIG. 2 shows an example of the apparatus which losslessly compresses an image in the above-described JPEG lossless coding mode. In FIG. 2, reference numeral 201 denotes a buffer; 202, a component value prediction unit; 203, a subtracter; 204, a Huffman table memory; 205, a prediction error encoding unit; 209, a code string formation unit; and 206, 207, and 208, signal lines.

The Huffman table memory 204 stores a Huffman table for use in the prediction error encoding unit 205. Assume that the Huffman table memory 204 stores a Huffman table shown in FIG. 6.

The flow of a process when a conventional image processing apparatus encodes a color image whose R. G, and B components each are expressed by 8 bits will be explained with reference to FIG. 2.

A prediction selection signal m for selecting a prediction method for use in the component value prediction unit 202 is input from the signal line 208. The prediction selection signal m takes an integer value of 0 to 7, and the respective values correspond to different prediction equations. FIG. 4 shows the correspondence between the prediction equation for use and the prediction selection signal m. When the prediction selection signal m is 0, no prediction equation is defined. This means that each component is directly encoded without performing any predictive transform. Symbols p, a, b, and c in FIG. 4 will be explained below.

Image data are sequentially input from the signal line 206. The image data input order is the raster scan order, and componThe R, G, and B components are defined as component numbers of 0, 1, and 2, respectively. The upper left corner of an image is defined as coordinates (0,0), and the value of the component number C of a pixel at the horizontal right pixel position x and vertical lower pixel position y is represented by $P(x,y,C)$. For example, when a pixel at the position $(x,y)=(3, 4)$ has $(R,G,B)=(255,128,0)$, $P(3,4,0)=255$, $P(3,4,1)=128$, and $P(3,4,2)=0$.

The buffer 201 stores image data of two lines that are input from the signal line 206.

When the component value x of the pixel of interest=$P(x,y,C)$, the component value prediction unit 202 extracts, from the buffer 201, the value a of the same component of an immediately preceding pixel=$P(x-1,y,C)$, the value b of the same component of a pixel before one line=$P(x,y-1,C)$, and the value c of the same component of an obliquely upper left pixel=$P(x-1,y-1,C)$. The component value prediction unit 202 generates a predicted value p from the extracted values a, b, and c in accordance with the prediction scheme selection signal m. FIG. 3 shows the positional relationship between a, b, c, and the component value x of the pixel of interest. When the pixel of interest is positioned on the uppermost line of the image, the preceding value a is used as the predicted value p. When the pixel of interest is positioned at the left end of the image, the value b before one line is used as the predicted value p. For the first pixel (pixel at the left end of the uppermost line) of the image, "128" is used as the predicted value p. In the image data input order, which has been described above, the positions of the pixels a, b, and c are encoded-pixel positions.

The subtracter 203 calculates the difference value between the predicted value p and the component value x to be encoded, and outputs it as a prediction error e.

The prediction error encoding unit 205 classifies prediction errors e input from the subtracter 203 into a plurality of groups, and generates a group number SSSS and overhead bits of a bit length defined for each group. FIG. 5 shows the relationship between the prediction error e and the group number SSSS. The overhead bits are Information for specifying a prediction error in the group, and the bit length is given by the group number SSSS. Note that the bit length is exceptionally 0 for SSSS=16 (when the precision of each component is 8 bits, SSSS=16 is not generated). If the prediction error e is positive, the lower SSSS bits of the prediction error e become overhead bits; if the prediction error e is negative, the lower SSSS bits of e−1 become overhead bits. The MSB (Most Significant Bit) of overhead bits is 1 for a positive prediction error e and 0 for a negative prediction error e. In an encoding process, encoded data corresponding to the group number SSSS is output by referring to the Huffman table stored in the memory 204. When SSSS is neither 0 nor 16, overhead bits of a bit length defied by the group number are output.

The code string formation unit 209 forms a code string of a format complying with the JPEG standard from encoded data output from the prediction error encoding unit 205, and additional information (e.g., the prediction selection signal m input via the signal line 208, the numbers of horizontal and vertical pixels of an image, the number of components which form a pixel, and the precision of each component). The code string formation unit 209 outputs the code string to the signal line 207.

When the image processing apparatus using the conventional scheme described above encodes image data (e.g., a CG image or an image of limited colors) having a biased frequency distribution of the luminance, the generation frequency of the prediction error after the above-mentioned string conversion is also biased to several specific prediction error values.

In this case, a prediction error which is rarely or not generated sometimes exists though a short code length is assigned as a code length by entropy encoding, resulting in low compression ratio.

To solve this problem, there has conventionally been known a method of determining whether the generation frequency distribution of the prediction error is discrete, changing encoded data corresponding to a prediction error in accordance with the determination result, and performing entropy encoding (e.g., Japanese Patent Laid-Open No. 10-004551; to be referred to as reference 1 hereinafter). There is also proposed a method of determining whether an image to be encoded is made up of discrete pixel values, and correcting a predicted value in accordance with the determination result (e.g. Japanese Patent Laid-Open No. 10-004557; to be referred to as reference 2 hereinafter). Note that the contents of references 1 and 2 are combined as U.S. Pat. No. 6,028,963. There is also known a method of encoding matching information with neighboring pixels in encoding each pixel (e.g., Japanese Patent Laid-Open No. 10-336458 (U.S. Pat. No. 6,212,234); to be referred to as reference 3 hereinafter). There is also known a method of switching between a plurality of predictive encoding methods (e.g., Japanese Patent Laid-Open No. 9-224253 (U.S. Pat. No. 5,828,789); to be referred to as reference 4 hereinafter).

In reference 1 or 2, the generation status of the component value of each pixel or that of the prediction error must be grasped, increasing the process load. When each component is predictively encoded using a block code such as a Huffman code, at least 1 bit is necessary for one component. High compression ratios can be expected from the predictive coding technique for a natural image (e.g., an image obtained by sensing the real world with a digital camera). However, there is room for improvement in coding efficiency for image data of low entropy such as a text, line art, or CG image. This also applies to references 3 and 4.

SUMMARY OF THE INVENTION

The present invention has been made to overcome the conventional drawbacks, and has as its object to provide a technique of efficiently encoding a natural image (e.g., a photographic image), and a CG image and text image in which the number of appearance colors is relatively limited, and a decoding technique.

In order to solve the above problems, an image encoding apparatus according to the present invention has the following arrangement.

That is, an image encoding apparatus which receives image data in which one pixel is formed from a plurality of color component data, and losslessly encodes the image data is comprising predictive encoding means for obtaining predicted values of respective color component data which form input pixel data of interest, by referring to color component data of an encoded pixel near the pixel of interest, and generating predictively encoded data, color counting means for counting the number of colors contained in a plurality of pixel data at encoded pixel positions near the pixel of interest, and generating color count information, vector information generation means for comparing the pixel data of interest with the plurality of pixel data present at the encoded pixel positions near the pixel of interest, and generating vector information for specifying whether a neighboring pixel having the same color as a color of the pixel of interest exists, and when the neighboring pixel having the same color exists, specifying a position of the neighboring pixel relative to the pixel of interest, vector information encoding means for encoding the vector information, and encoded data generation means for generating encoded data to be output, from encoded data obtained by the predictive encoding means and the vector information encoding means on the basis of the color count information obtained by the color counting means and the vector information obtained by the vector information generation means, wherein when the number of colors represented by the color count information is not more than a predetermined threshold and the vector information represents presence of a neighboring pixel having the same color as the color of the pixel of interest, the encoded data generation means outputs the encoded data generated by the vector information encoding means as encoded data of the pixel of interest, when the number of colors counted by the color counting means is not more than the predetermined threshold and the vector information represents absence of a neighboring pixel having the same color as the color of the pixel of interest, the encoded data generation means outputs, as encoded data of the pixel of interest, the encoded data generated by the vector information encoding means and the predictively encoded data generated by the predictive encoding means, and when the number of colors counted by the color counting means exceeds the predetermined threshold, the encoded data generation means outputs the predictively encoded data generated by the predictive encoding means as encoded data of the pixel of interest.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a view showing the positions of pixels a, b, and c around a pixel x to be encoded;

FIG. 4 is a table showing a prediction equation corresponding to a prediction selection signal m;

FIG. 5 is a table showing the correspondence between the prediction error e and a group number SSSS;

FIG. 6 is a table showing the correspondence between the group number SSSS and a code word;

FIG. 7 is a table showing the correspondence between neighborhood matching information and the code word;

FIGS. 8A to 8C are views each showing the structure of encoded pixel data;

FIG. 9 is a view showing the structure of a code string output from the image processing apparatus;

FIGS. 15A to 15C are tables each showing a code table used to encode neighborhood matching information in image processing apparatuses according to the third, fifth, and seventh embodiments;

FIG. 16 is a table showing an example of Golomb encoding;

FIGS. 26A and 26B are views each showing the structure of encoded pixel data according to the seventh embodiment;

FIG. 37 is a table showing the relationship between the number of colors, vector information, and surrounding pixel state information according to the seventh embodiment.

DETAILED DESCRIPTION OF THE PREFERRED EMBODIMENTS

Preferred embodiments of the present invention will be described in detail below with reference to the accompanying drawings.

First Embodiment

Figure 1:
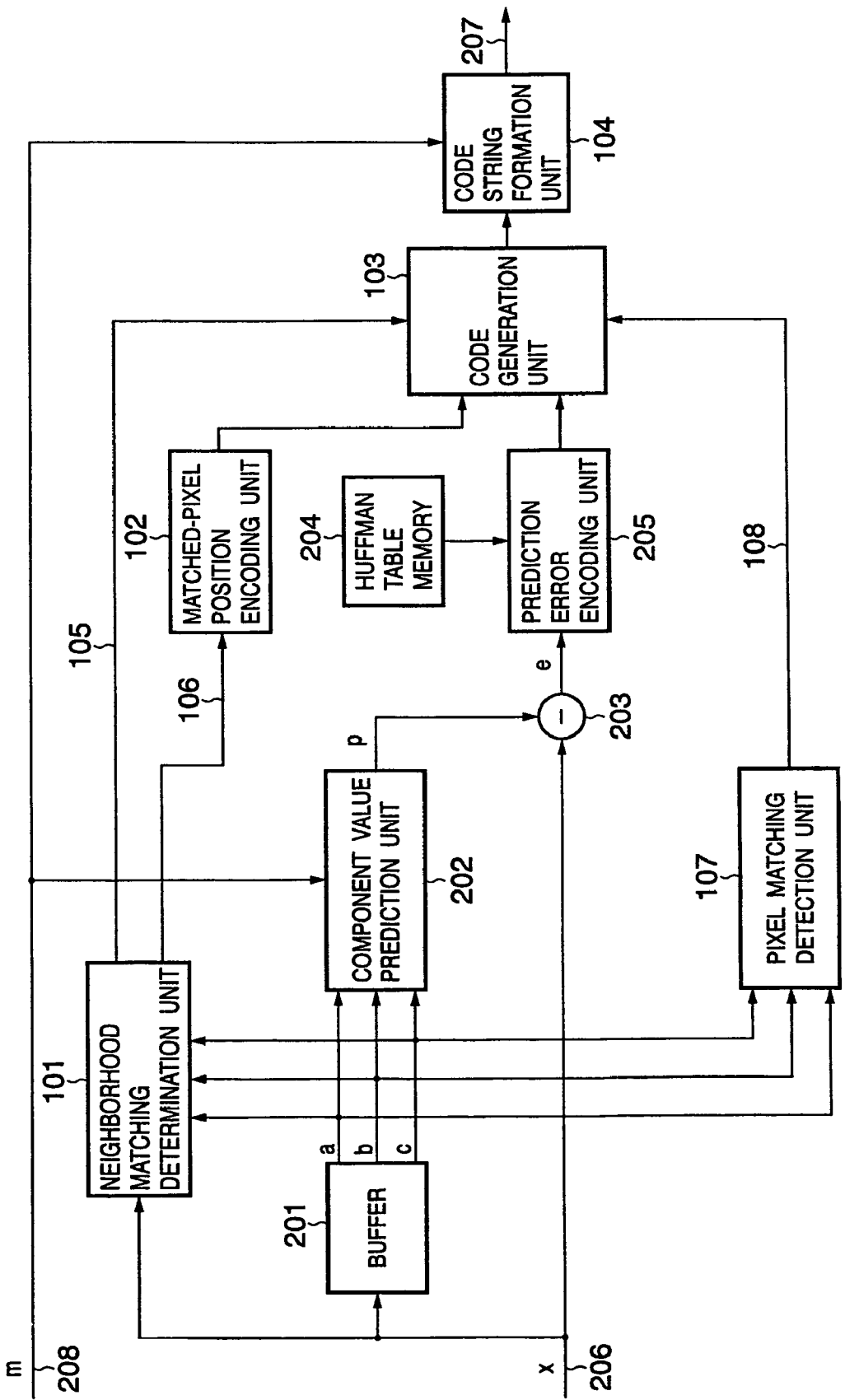
FIG. 1 is a block diagram showing the functional configuration of an image processing apparatus according to the first embodiment.

FIG. 1 is a block diagram showing an image processing apparatus according to the first embodiment.

Figure 2:
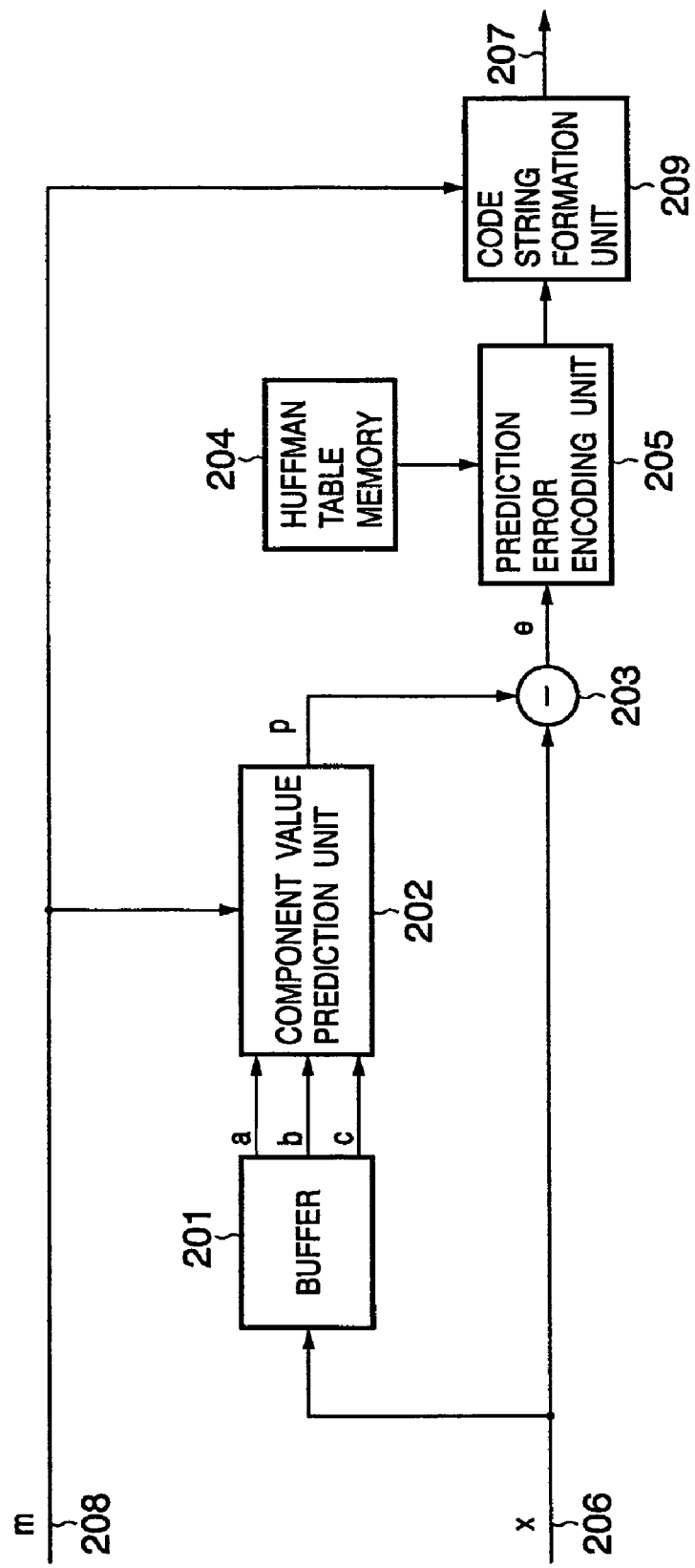
FIG. 2 is a block diagram showing a conventional image processing apparatus.

As shown in FIG. 1, the image processing apparatus according to the first embodiment comprises a neighborhood matching determination unit 101, matched-pixel position encoding unit 102, code generation unit 103, code string formation unit 104, buffer 201, component value prediction unit 202, and subtracter 203. The apparatus also comprises a Huffman table memory 204, prediction error encoding unit 205, and pixel matching detection unit 107. In FIG. 1, reference numerals 206, 207, 208, 105, 106, and 108 denote signal lines. The same reference numerals denote blocks which perform the same operations as those of processing blocks in the conventional image processing apparatus described in BACKGROUND OF THE INVENTION with reference to FIG. 2, and a description thereof will be omitted.

An image encoding process performed by the image processing apparatus according to the first embodiment will be explained with reference to FIG. 1.

Image data to be encoded by the image processing apparatus according to the first embodiment is image data of R, G, and B colors. Each component (color component) is formed from pixel data which expresses a luminance value of 0 to 255 by 8 bits. Image data to be encoded has W horizontal pixels and H vertical pixels. Input image data has a data amount of W×H×3 bytes. The horizontal right direction is defined as the positive direction of the X-coordinate, and the vertical down direction is defined as the positive direction of the Y-coordinate. The input order of input image data is the raster order, and each pixel is formed by laying out data in the order of R, G, and B.

Image data to be encoded are sequentially input from the signal line 206. The source of input image data may be an image scanner or a predetermined storage device which stores image data, and the type of input source is arbitrary.

As already described above, the input order of pixel data is the raster scan order, and component data of each pixel are input in the order of R, G, and B. The luminance values of the R, G, and B components of the pixel are expressed by a component number C: C=0 represents R; C=1, G; and C=2, B. The upper left corner of an input image is defined as coordinates (0,0), and the value (luminance in the embodiment) of the component number C of a pixel at the horizontal pixel position x and vertical pixel position y is represented by P(x,y,C). For example, the R, G, and B component values of a pixel at a horizontal pixel position "10" and vertical pixel position "25" are represented by P(10,25,0), P(10,25,1), and P(10,25,2). When a pixel value is expressed as a set of components, it is expressed as a vector X containing R, G, and B component values as elements. For example, a pixel whose R, G, and B component values are r, g, and b is described as X=(r,g,b).

The image processing apparatus outputs a corresponding code from the code string formation unit 104 for each pixel of image data sequentially input from the signal line 206.

Figure 3:
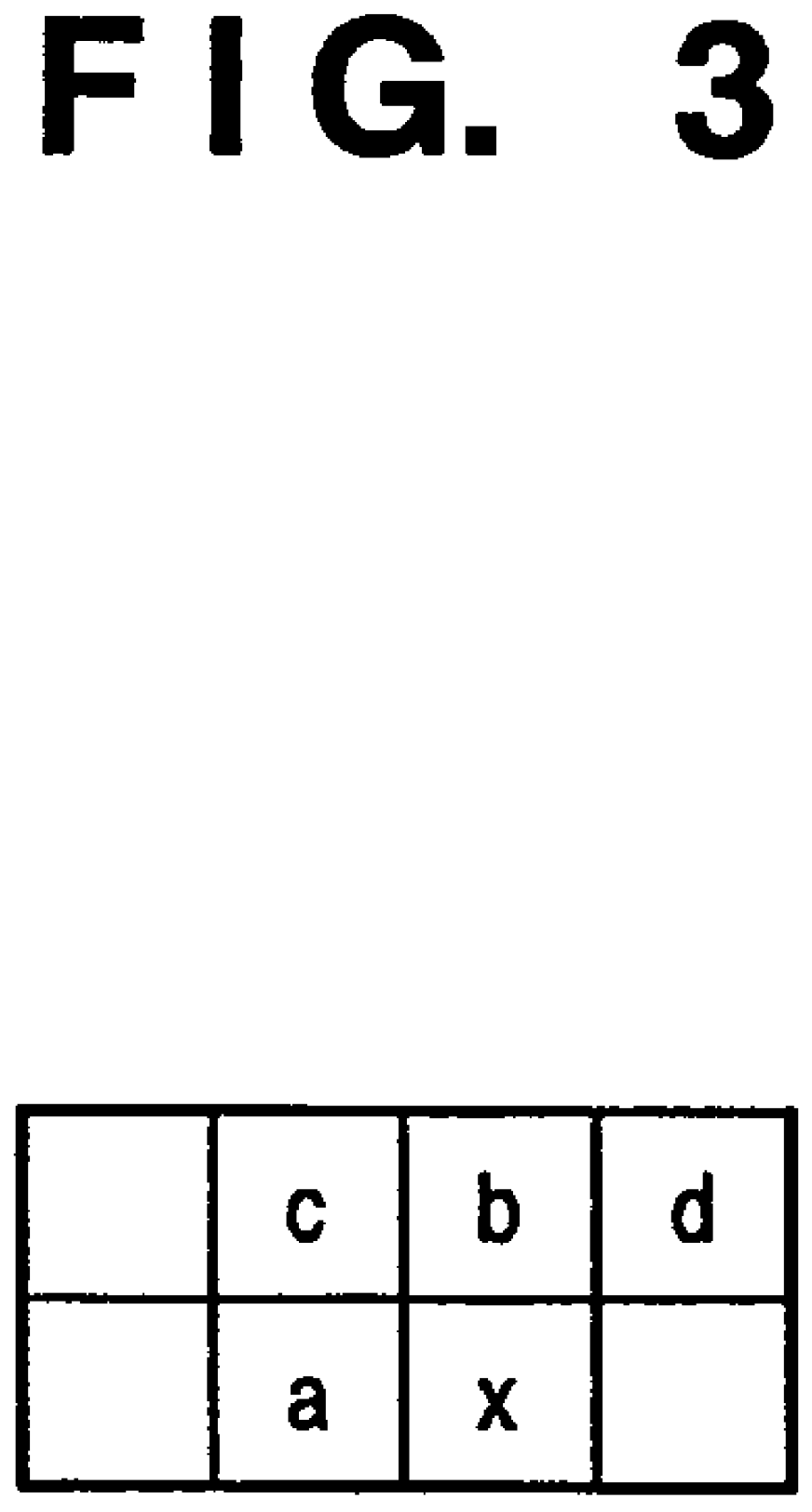

The buffer 201 has an area for storing image data of two lines. The buffer 201 sequentially stores pixel data input from the signal line 206, and stores and holds pixel data of two lines. As described above, image data are input in the raster order of pixels, and the component values of each pixel are input in the order of R, G, and B. For each component, the values of three pixels a, b, and c around a pixel x of interest in FIG. 3 are read out from the buffer 201, and output to the neighborhood matching determination unit 101 and component value prediction unit 202. Letting P(x,y,C) be the component value of interest, a =P(x−1,y,C), b =P(x,y−1,C), and c=P(x−1,y−1,C). Assume that, when a, b, and c are positioned outside an image on the start line of the image or at the start or end of each line, a common value is given to the encoding and decoding sides. In the first embodiment, a, b, and c=0. It should be noted that the pixel x of interest corresponds to a position subjected to encoding, and the positions of the surrounding pixels a, b, and c are positions having undergone encoding.

The neighborhood matching determination unit 101 compares the component value x of the pixel of interest =P(x,y,C) with a, b, and c read out from the buffer 201. The neighborhood matching determination unit 101 then outputs, to the code generation unit 103 on the output stage, information (to be referred to as matched-pixel presence information hereinafter) 105 representing the presence/absence of a neighboring pixel having the same pixel value as that of the pixel of interest. The neighborhood-matching determination unit 101 outputs, to the matched-pixel position encoding unit 102 on the output stage, information (to be referred to as vector information hereinafter) 106 representing the relative direction of a neighboring pixel which matches the pixel of interest.

That two pixels match each other in generating the matched-pixel presence information 105 means that all the component values of two pixels X1=(r1,g1,b1) and X2=(r2, g2,b2) are equal: r1=r2, g1=g2, and b1=b2. If even one of the pixels a, b, and c near the pixel of interest matches the pixel of interest, the matched-pixel presence information 105 is "0"; if no neighboring pixel matches the pixel of interest, "1".

The vector information 106 is defined as follows.

Letting X be the pixel value (color) of interest, Xa be an immediately preceding pixel value, Xb be a pixel value before one line at the same x-coordinate, and Xc be an obliquely upper left pixel value, For X=Xa (Xb and Xc are arbitrary), the vector information 106 is "0", For X≠Xa and X=Xb (Xc is arbitrary), the vector information 106 is "1", For X≠Xa, X≠Xb, and X=Xc, the Vector information 106 is "2", and In other cases, the vector information 106 is "3".

When (x,y) represents the position of the pixel of interest for obtaining the matched-pixel presence information 105 and vector information 106, and X, Xa, Xb, and Xc are expressed using (x,y), the following information is apparently used:

$$X=(P(x,y,0),P(x,y,1),P(x,y,2))$$

$$Xa=(P(x-1,y,0),P(x-1,y,1),P(x-1,y,2))$$

$$Xb=(P(x,y-1,0),P(x,y-1,1),P(x,y-1,2))$$

$$Xc=(P(x-1,y-1,0),P(x-1,y-1,1),P(x-1,y-1,2))$$

From this, when the vector information 106 is "3", the matched-pixel presence information 105 is necessarily "1". To the contrary, when the matched-pixel presence information 105 is "1", the vector information 106 is necessarily "3". Hence, the matched-pixel presence information 105 is obtained from the vector information 106, but is described as another signal for convenience in the embodiment.

The matched-pixel position encoding unit 102 encodes the vector information 106 from the neighborhood matching determination unit 101, and outputs a resultant code word to the code generation unit 103. In the first embodiment, the matched-pixel position encoding unit 102 generates a code word from the vector information 106 (encodes the vector information) by using a code table shown in FIG. 7.

The pixel matching detection unit 107 compares the three pixel values a, b, and c around the pixel of interest that are read out from the buffer 201, and checks whether a pair of pixels having the same pixel value exist in these three surrounding pixels (Xa, Xb, and Xc). If at least a pair of pixels having the same pixel value are detected, the pixel matching detection unit 107 outputs "1" as the surrounding pixel state information 108; if no pair are detected, "0".

More specifically, the pixel matching detection unit 107 outputs "1" as the surrounding pixel state information 108 when "Xa=Xb", "Xa=Xc", or "Xb=Xc" between the three pixels Xa, Xb, and Xc around the pixel X of interest; otherwise, "0". That at least a pair of pixels having the same pixel value exist among three surrounding pixels means that the number of colors contained in the three surrounding pixels is two or less. In other words the surrounding pixel state information 108 can be considered to represent the determination result of whether the number of color types present in three pixels around the pixel of interest is two or less.

When the start line of an image is encoded, at least the neighboring pixels b and c are outside the image area and their pixel values are treated as "0". Since at least Xb=Xc, the surrounding pixel state information 108 is "1" in encoding the start line.

Similar to the conventional scheme described above, each component of the pixel undergoes a predictive encoding process by the component value prediction unit 202, subtracter 203, and prediction error encoding unit 205 in accordance with a prediction selection signal m input from the signal line 208. The prediction selection signal m can be arbitrarily determined by the setting of the apparatus, and is fixed during at least encoding of all target image data.

The code generation unit 103 temporarily stores the code word of the vector information that is output from the matched-pixel position encoding unit 102, and predictively encoded data of each component of the pixel of interest that is output from the prediction error encoding unit 205. The code generation unit 103 forms encoded data of the pixel of interest in accordance with the matched-pixel presence information 105 and surrounding pixel state information 108, and outputs the encoded data. A concrete operation of the code generation unit 103 is as follows.

i) When the surrounding pixel state information 108 is "0", i.e., no pair of pixels having the same color exist in the three pixels Xa, Xb, and Xc around the pixel X of interest, the code generation unit 103 selects and outputs predictively encoded data of each component that is output from the prediction error encoding unit 205. This process corresponds to normal encoding.

ii) When the surrounding pixel state information 108 is "1" (at least a pair of pixels having the same color exist in the three pixels Xa, Xb, and Xc around the pixel X of interest), and the matched-pixel presence information 105 is "0" (the color of the pixel of interest matches that of any one of the three surrounding pixels Xa, Xb, and Xc), the code generation unit 103 selects and outputs encoded data of vector information (in this case, necessarily a value of 0 to 2) that is output from the matched-pixel position encoding unit 102.

iii) When the surrounding pixel state information 108 is "1", and the matched-pixel presence information 105 is "1" (the color of the pixel of interest does not match that of any one of the three surrounding pixels Xa, Xb, and Xc), the code generation unit 103 outputs encoded data of vector information (in this case, necessarily "3") that is output from the matched-pixel position encoding unit 102. After that, the code generation unit 103 outputs predictively encoded data of each component that is output from the prediction error encoding unit 205.

FIGS. 8A to 8C show the code structures of three encoded data. FIG. 8A shows encoded: data of the pixel of interest when the surrounding pixel state information 108 is "0" under the condition i. FIG. 8B shows encoded data of the pixel of interest when the surrounding pixel state information 108 is "1" under the condition ii and the matched-pixel presence information 105 is "0". FIG. 8C shows encoded data of the pixel of interest when the surrounding pixel state information 108 is "1" under the condition iii and the matched-pixel presence information 105 is "1".

In FIGS. 8A to 8C, attention is given to encoded data in FIG. 8B. The condition under which this encoded data is generated is that the number of colors near the pixel of interest is a predetermined value or less and the color of the pixel X of interest matches that of any one of the neighboring pixels Xa, Xb, and Xc. From a comparison between FIG. 8B and FIG. 8A or 8C, encoded data of each color component is no longer necessary, the code length can be expressed by 3 bits at maximum, as shown in FIG. 7, and higher compression efficiency is expected. This will be explained in more detail below.

It is generally known that a natural image (e.g., an image (especially a landscape image) sensed by a digital camera) tends to have almost the same color in neighboring pixels. This does not mean that the colors of neighboring pixel completely match each other. These colors are highly likely to have a small difference. Considering this, an example of the process will be explained.

Assume that the prediction error of the R component falls within the range of −31 to −16 or 16 to 31. Referring to FIG. 5, the group number SSSS of this prediction error is "5". Referring to FIG. 6, the code word of the group number "5" is "110(B)" (B means a binary number). From FIG. 5, the overhead bit length is "5". Thus, predictively encoded data of the R component that is finally obtained is "110XXXXX(B)" (X is bit 0 or 1)

Referring to FIG. 7, the code word for the vector information 106="2" is "110(B)" (B means a binary number), which undesirably coincides with the first 3 bits of the encoded data of the R component. In a decoding process, it cannot be discriminated from only this code word whether "110(B)" means a code word for vector information "2" or a code word for the group number SSSS "5".

However, in decoding, the pixels a, b, and c near the pixel of interest have already been decoded. That is, when the pixel of interest is to be decoded, it can be easily detected whether at least a pair of pixels having the same color exist in the neighboring pixels a, b, and c. When a pair of pixels having the same color exist in the neighboring pixels a, b, and c (the number of colors is two or less), it is ensured that encoded data corresponds to either FIG. 8B or 8C, and it turns out that "110" is the code word of the vector information. To the contrary, when no pair of pixels having the same color exist in the neighboring pixels a, b, and c (the number of colors is three), it is found that the encoded data is made up of only encoded data of the prediction error, as shown in FIG. 8A. This also applies to another code word of vector information.

Encoded data in FIG. 8C is more redundant than encoded data in FIG. 8A by the code word "111(B)" for vector information "3", preceding to encoded data of the prediction error. That is, when predictively encoded data is employed, it is desired to decrease the possibility at which a code word as shown in FIG. 8C is generated. For this purpose, according to the first embodiment, the condition under which encoded data in FIG. 8C is generated is that at least a pair of pixels having the same color exist in the neighboring pixels a, b, and c (the number of colors is two or less). In other words, when the neighboring pixels a, b, and c all have different colors (the number of colors is three), encoded data in FIG. 8A is generated. For a natural image and the like, the possibility at which encoded data in FIG. 8A is generated can successfully increase.

For computer graphics, an image is often painted with colors which are artificially generated by a computer. In computer graphics, therefore, the number of colors used to generate an image which resembles a natural image in appearance is smaller than in a natural image. In other words, the ratio at which the colors of neighboring pixels completely match each other becomes much higher than that of a natural image. Encoded data in FIG. 8B is more highly likely to be generated, and higher compression ratio can be expected than in predictive encoding which is conventional lossless encoding. Particularly in a text document image formed from general characters, the number of colors is only 2 (black and white), so the possibility at which encoded data as shown in FIG. 8A is generated can be increased.

For an image sensed by a digital camera or the like, many encoded data shown in FIG. 8A are generated, and the same code amount as the conventional one can be maintained even for a natural image.

Referring back to the description of FIG. 1, the code string formation unit 104 forms a code string of a predetermined format from encoded data output from the code generation unit 103, and additional information (e.g., the prediction selection signal m input via the signal line 208, the numbers of horizontal and vertical pixels of an image, the number of components which form a pixel, and the precision of each component). The code string formation unit 104 outputs the code string via the signal line 207. The output destination may be a storage device or communication line. When the code string is output to the storage device, it is stored as a file.

FIG. 9 shows an example of the structure of the code string output from the code string formation unit 104. The Header field at the start of the code string stores additional information (containing information on the prediction selection signal m, and the numbers of horizontal and vertical pixels of an image). Subsequently, encoded data of pixels are aligned in the raster scan order. Encoded data of pixels in FIG. 9 have one of the structures in FIGS. 8A to 8C.

As described above, the image processing apparatus according to the first embodiment checks the encoded pixels Xa, Xb, and Xc around the pixel X to be encoded. When a pair of pixels having the same color exist in Xa, Xb, and Xc (the number of colors is two or less), the image processing apparatus checks a match/mismatch between information of the pixel X and the pixels Xa, Xb, and Xc. If the pixel X matches the pixel Xa, Xb, or Xc, the image processing apparatus encodes vector information for specifying the relative position of the matched neighboring pixel. If no same color exists between the pixel X of interest, and Xa, Xb, or Xc, the image processing apparatus subsequently generates predictively encoded data of each component of the pixel of interest. This process can greatly increase the lossless compression ratio of image data (e.g., a text, line art, or CG image) in which a pixel having the same color as that of the pixel of interest is highly likely to exist around the pixel of interest.

If no pair of pixels having the same color exist in Xa, Xb, and Xc, each component of the pixel of interest is predictively encoded without encoding vector information. As a result, addition of encoded data of vector information can be avoided even in encoding image data (e.g., a natural image) in which the pixel of interest is less likely to completely match a surrounding pixel value. The same code amount as that in a conventional predictive encoding technique can be maintained.

Modification to First Embodiment

The first embodiment may be implemented by software. The modification will explain a case wherein the first embodiment is implemented by software.

Figure 11:
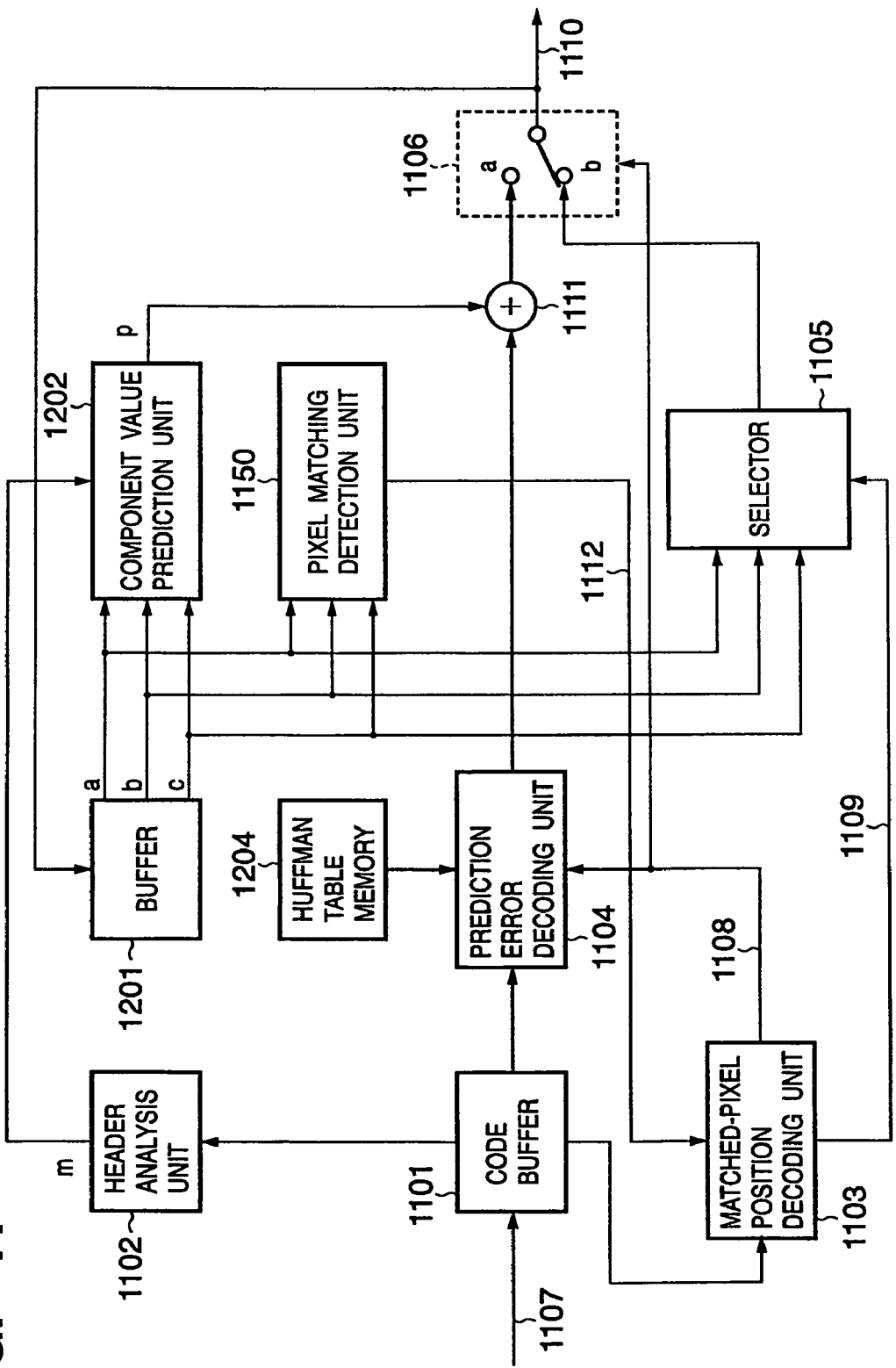
FIG. 11 is a block diagram showing the functional configuration of an image processing apparatus according to the second embodiment.

When the first embodiment is implemented by software, processes corresponding to various building components typified by the neighborhood matching determination unit 101 shown in FIG. 1 are implemented by functions, subroutines, and the like in software. In the modification, the names of the processing units in FIG. 11 are directly used for descriptive convenience. A buffer 1201 and code buffer 1101 are allocated in a RAM 1402 by a CPU 1401 prior to the start of a process.

Figure 14:
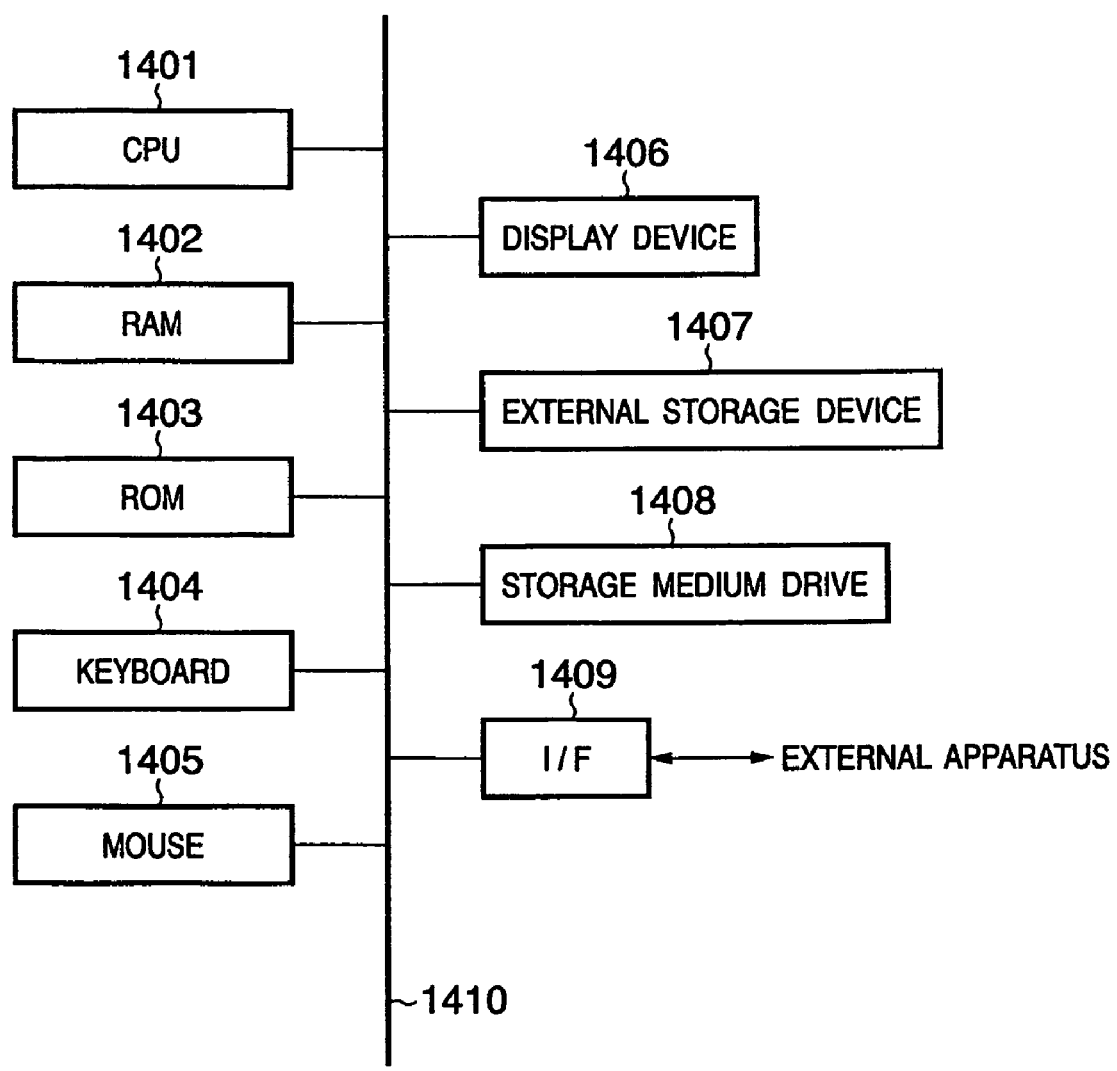
FIG. 14 is a block diagram showing an apparatus configuration for encoding and decoding by software according to the embodiments.

FIG. 14 is a block diagram showing the basic configuration of the apparatus when the apparatus is implemented by software.

In FIG. 14, the CPU 1401 controls the overall apparatus by using programs and data which are stored in the RAM 1402 and a ROM 1403. In addition, the CPU 1401 executes image encoding and decoding processes to be described later.

The RAM 1402 is used to store programs and data which are downloaded from an external storage device 1407, a storage medium drive 1408, or an external apparatus via an I/F 1409. The RAM 1402 is also used as a work area when the CPU 1401 executes various processes. The buffer 201, Huffman table 204, and the like shown in FIG. 1 are also allocated in the RAM 1402.

The ROM 1403 stores a boot program, apparatus setting programs, and data.

Reference numerals 1404 and 1405 denote a keyboard and a pointing device (e.g., mouse®), respectively, which allow the user to input various instructions to the CPU 1401.

Reference numeral 1406 denotes a display device which is made up of a CRT, liquid crystal screen, and the like, and can display Information such as an image and text.

The external storage device 1407 is a large-capacity information storage device such as a hard disk drive. The external storage device 1407 saves an OS, programs for image encoding and decoding processes to be described later, image data to be encoded, encoded data of an image to be decoded, and the like. Programs and data which are stored in the external storage device 1407 are loaded into a predetermined area in the RAM 1402 under the control of the CPU 1401.

The storage medium drive 1408 reads out programs and data which are recorded on a storage medium such as a CD-ROM or DVD-ROM, and outputs the readout programs and data to the RAM 1402 and external storage device 1407.

Note that the storage medium may record programs for image encoding and decoding processes to be described later, image data to be encoded, encoded data of an image to be decoded, and the like. In this case, the CPU 1401 loads, to a predetermined area in the RAM 1402, programs and data which are stored in the storage medium drive 1408.

The I/F 1409 connects an external apparatus to the image processing apparatus, and allows data communication between the image processing apparatus and the external apparatus. For example, the I/F 1409 allows inputting image data to be encoded, encoded data of an image to be decoded, and the like to the RAM 1402, external storage device 1407, or storage medium drive 1408 of the apparatus. Reference numeral 1410 denotes a bus which connects the above units.

Figure 10:
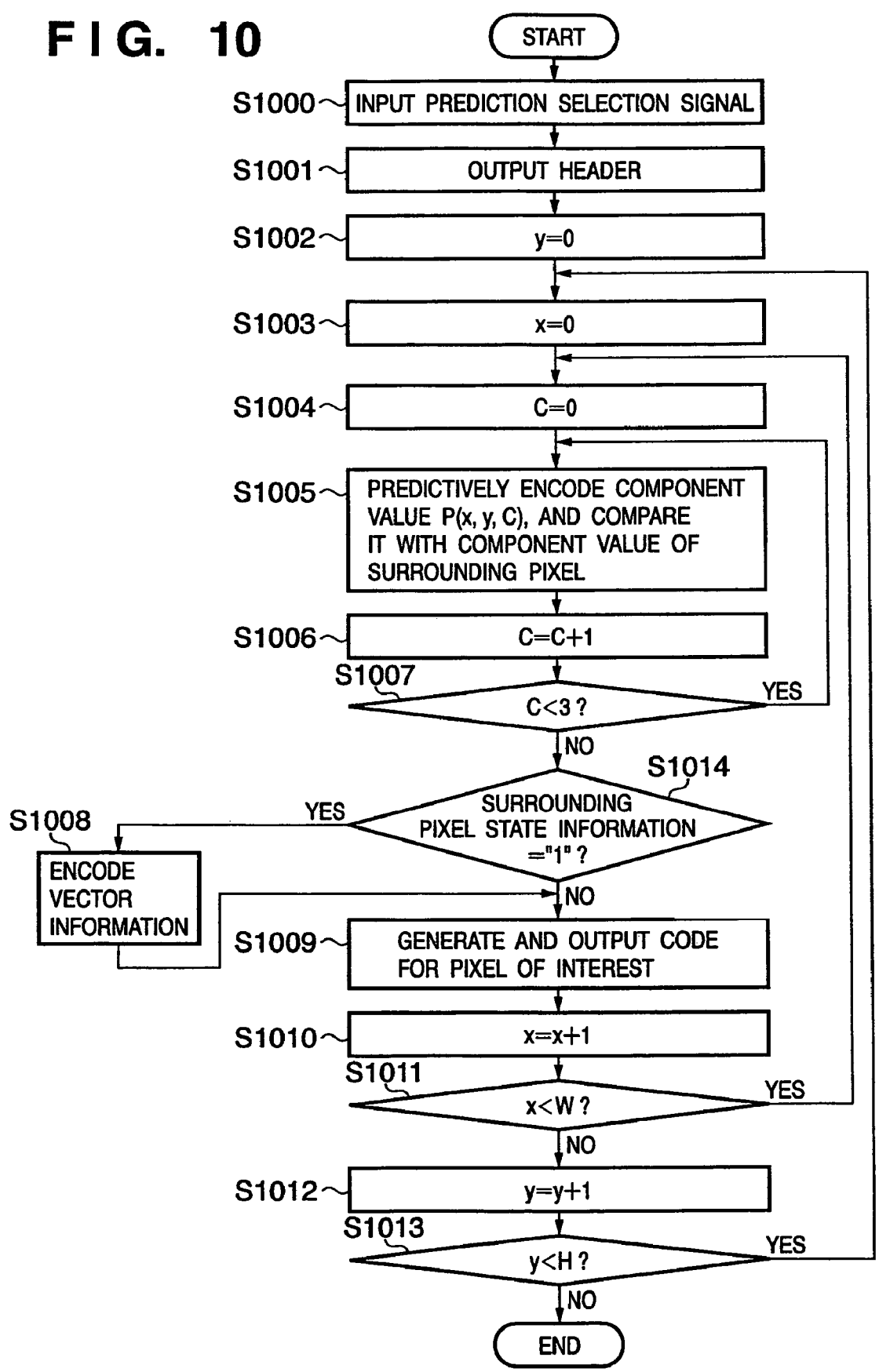
FIG. 10 is a flowchart showing the flow of a process of encoding target image data by the image processing apparatus according to the first embodiment.

FIG. 10 is a flowchart showing the flow of an encoding process by an image encoding application in the image processing apparatus according to the modification. Note that a program complying with FIG. 10 is loaded into the RAM 1402 and executed by the CPU 1401 to achieve the process complying with the flowchart of FIG. 10. Processes corresponding to various processing units shown in FIG. 1 are implemented by functions, subroutines, and the like in software. In the modification, the names of the processing units in FIG. 1 are directly used for descriptive convenience. The whole flow of the image encoding process performed by the CPU 1401 of the image processing apparatus according to the modification will be explained with reference to FIG. 4.

The prediction selection signal m is externally input via the signal line 208 (step S1000). The code string formation unit 104 generates and outputs a header containing additional information (e.g., the prediction selection signal m) of an image to be encoded (step S1001).

A counter y which holds the vertical position of the pixel of interest is set to 0 (step S1002), and a counter x which holds the horizontal position of the pixel of interest is set to 0 (step S1003). Similarly, a counter C which holds the component number of interest is set to 0 (step S1004).

The component value P(x,y,C) of the pixel of interest is input from the signal line 206, and stored in the buffer 1201. The component value P(x,y,C) is predictively encoded by the component value prediction unit 202, subtracter 203, and prediction error encoding unit 205. At the same time, the component value P(x,y,C) is compared with the value of a surrounding pixel for each component by the neighborhood matching determination unit 101 (step 1005).

The component number C of interest is incremented by one (step S1006), and compared with "3" which is the number of color components of an RGB image. If C<3, the process returns to step S1005 to similarly process the next component; otherwise, shifts to step S1014.

In step S1014, the pixel matching detection unit 107 determines whether the same pixel value exists between three surrounding pixels. If the same pixel value exists (YES in step S1014), the process shifts to step S1008; if NO, to S1009. In step S1008, the vector information 106 obtained by the neighborhood matching determination unit 101 is encoded by the matched-pixel position encoding unit 102.

In step S1009, a code for the pixel of interest is generated in accordance with the matched-pixel presence information 105 from the neighborhood matching determination unit 101, the surrounding pixel state information 108 from the pixel matching detection unit 107, and encoded data of vector information from the matched-pixel position encoding unit 102. The generated code is output via the code string formation unit 104 (step S1009).

After that, the counter x which holds the horizontal position of the pixel of interest is incremented by one (step S1010), and compared with the horizontal pixel count W of the image. If x<W, the process returns to step S1004 to perform the encoding process for the next pixel. If x≧W, the counter y which holds the vertical position of the pixel of interest is incremented by one (step S1012). The y-coordinate of the pixel of interest is compared with the vertical pixel count H to determine whether y<H (step S1013). If y<H, the encoding process is not completed, and the process returns to step S1003 to similarly process a pixel on the next line. If y≧H, the encoding process for one image has ended, and the encoding process ends.

As described above, even software can attain the same operation effects as those of the first embodiment.

Second Embodiment

An example of decoding encoded data which is generated in the first embodiment (or its modification) will be described as the second embodiment. The decoding process is basically executed by procedures opposite to those of the encoding process in the image processing apparatus according to the first embodiment.

FIG. 11 is a block diagram showing an image processing apparatus which decodes encoded image data according to the second embodiment.

As shown in FIG. 11, the image processing apparatus according to the second embodiment comprises a code buffer 1101, header analysis unit 1102, matched-pixel position decoding unit 1103, prediction error decoding unit 1104, selector 1105, switch 1106, and buffer 1201. The apparatus also comprises a component value prediction unit 1202, adder 1111, and pixel matching detection unit 1150. In FIG. 11, reference numerals 1113, 1108, 1109, 1110, and 1112 denote signal lines.

A process performed by the image processing apparatus according to the second embodiment will be explained with reference to FIG. 11.

Encoded data to be decoded is input to the code buffer 1101 of the image processing apparatus via the signal line 1113.

The header analysis unit 1102 analyzes the header field of the encoded data stored in the code buffer 1101, obtaining additional information (e.g., the prediction selection signal m, the numbers of horizontal and vertical pixels of an image, the number of components which form a pixel, and the precision of each component). The additional information is used during decoding, and especially the prediction selection signal m is output to the component value prediction unit 1202.

The decoded pixel data is finally output from the switch 1106. The decoded pixel data is also stored in the buffer 1201 (having a capacity enough to store decoded pixel data of two lines).

Similar to the pixel matching detection unit 107 according to the first embodiment, the pixel matching detection unit 1150 checks whether a pair of pixels having the same color exist in three pixels (Xa, Xb, and Xc) around the pixel of interest. The pixel matching detection unit 1150 outputs the detection result as surrounding pixel state information 1112 to the matched-pixel position decoding unit 1103. In order to make the decoding process correspond to the encoding process, when the pixel of interest to be decoded is positioned on the start line of the image, Xb=Xc=0. When the pixel of interest is positioned at the start position of each line, Xa=0.

If the surrounding pixel state information 1112 is "1", i.e., at least a pair of pixels having the same color exist in the decoded pixel data Xa, Xb, and Xc around the pixel X to be decoded, the input encoded data has the structure shown in FIG. 8B or 8C. Since it is ensured that the encoded data to be decoded is encoded data of vector information, the matched-pixel position decoding unit 1103 decodes the encoded data as vector information 1109 by referring to the table shown in FIG. 7, and outputs the vector information 1109 to the selector 1105. At this time, when the decoded vector information is "3", a signal 1108 for controlling the prediction error decoding unit 1104 and switch 1106 is set to "1" and output via the signal line 1108; otherwise, "0" is output.

If the surrounding pixel state information 1112 is "0", the encoded data is one shown in FIG. 8A. Hence, the matched-pixel position decoding unit 1103 does not perform any decoding process, and outputs "1" to the signal line 1108.

When the control signal 1108 from the matched-pixel position decoding unit 1103 is "1", the prediction error decoding unit 1104 decodes the prediction error of each component of the pixel of interest by referring to a Huffman table stored in a Huffman table memory 1204.

Similar to encoding, the component value prediction unit 1202 generates and outputs a predicted value p of the component value of interest by using a prediction equation selected by the prediction scheme selection signal m.

The adder 1111 adds a prediction error e decoded by the prediction error decoding unit 1104 to the predicted value p output from the component value prediction unit 1202, thereby reconstructing and outputting the component value of interest.

In accordance with the vector information 1109 from the matched-pixel position decoding unit 1103, the selector 1105 selects and outputs one of the component values of the pixels Xa, Xb, and Xc around the pixel X of interest that are read out from the buffer 1201. More specifically, the selector 1105 selects each component value of Xa for vector Information "0", that of Xb for "1", and that of Xc for "2". When the vector information is "3", an output from the selector 1105 becomes invalid and is arbitrary because the switch 1106 does not select the data.

When the signal 1108 from the matched-pixel position decoding unit 1103 is "1", the switch 1106 selects the input terminal a, i.e., predictively decoded pixel data, and outputs the data. When the signal 1108 is "0", the switch 1106 selects the input terminal b, i.e., pixel data generated in accordance with the vector information, and outputs the data.

The decoded value of each component of each pixel is output from the signal line 1110. As described above, decoded pixel data of two lines are also stored in the buffer 1201, and used as surrounding pixel values in decoding a subsequent pixel.

By the above process, original image data can be completely reconstructed (losslessly decoded) from encoded data.

Modification to Second Embodiment

The second embodiment may be implemented by software. An example of the software will be explained. An apparatus configuration when the apparatus is implemented by software is the same as that in FIG. 14 which is referred to in the modification to the first embodiment, and a description thereof will be omitted. The process procedures of a decoding application which runs in the apparatus will be described with reference to the flowchart of FIG. 12. Processes corresponding to various processing units shown in FIG. 11 are implemented by functions, subroutines, and the like in software. In the modification, the names of the processing units in FIG. 11 are directly used for descriptive convenience. The process content of each unit corresponds to a process described in the second embodiment. As a matter of course, the buffer 1201 and code buffer 1101 are allocated in a RAM 1402 by a CPU 1401 prior to the start of a process.

Encoded data to be decoded is input from the signal line 1107 to the code buffer. The header analysis unit 1102 analyzes the header of the encoded data to extract additional information necessary for decoding (e.g. the prediction selection signal m, the numbers of horizontal and vertical pixels of an image, the number of components which form a pixel, and the precision of each component) (step S1201).

A counter y which holds the vertical position of the pixel of interest is set to 0 (step S1202), and a counter x which holds the horizontal position of the pixel of interest is set to 0 (step S1203). Further, a counter C which holds the component number of interest is set to 0 (step S1204).

In decoding each pixel, the pixel matching detection unit 1150 determines whether a pair of pixels having the same color exist in three surrounding pixels. If the pair exists (YES in step S1215), the process shifts to step S1205; if NO, to step S1216.

In step S1205, the matched-pixel position decoding unit 1103 decodes vector information, outputs the decoded vector information from the signal line 1109, and outputs the control signal 1108 for controlling the prediction error decoding unit 1104 and switch 1106. In step S1206, it is determined whether the decoded vector information is "3". If the determination result is YES, the process shifts to step S1207; if NO, to step S1208.

If YES in step S1206 (at this time, the signal line 1108 holds "1"), the switch 1106 is made to select the terminal a. As a result, the component value P(x,y,C) of interest is decoded by the component value prediction unit 202, prediction error decoding unit 1104, and adder 1111, and the decoded data is output (step S1207). If NO in step S120.6 (at this time, the signal line 1108 holds "0"), the switch 1106 is connected to the terminal b. On the basis of neighborhood matching information decoded by the matched-pixel position decoding unit 1103, the selector 1105 selects and outputs one of the component values of surrounding pixels that are read out from the buffer 1201. The selected component value is the decoded component value P(x,y,C) of the pixel of interest (step S1208).

The component value P(x,y,C) output in step S1207 or S1208 is output from the signal line 1110 outside the apparatus, and at the same time, stored in the buffer 1201.

In step S1209, the counter C which holds the component number of interest is incremented by one, and compared with "3" which is the number of color components of an RGB image. If C<3, the process returns to step S1206 to similarly process the next component; otherwise, the process shifts to step S1211.

If the process shifts to step S1216 at the branch of step S1215, the detection result output from the pixel matching detection unit 1150 is "0", the control signal output from the matched-pixel position decoding unit 1103 is "1", and the switch 1106 is connected to the terminal a. Consequently, the component value P(x,y,0) of interest is decoded by the component value prediction unit 202, prediction error decoding unit 1104, and adder 1111 (step S1216).

Similarly, the component value P(x,y,1) is decoded by the component value prediction unit 202, prediction error decoding unit 1104, and adder 1111 decode (step S1217), and then the component value P(x,y,2) is decoded (step S1218).

In step S1211, the counter x which holds the horizontal position of the pixel of interest is incremented by one. In step S1212, x is compared with W to determine whether the decoded pixel of interest is a pixel at the end position of the line. If x<W, the decoding processing is not completed for the line, and the process returns to step S1204 to perform the decoding process for the next pixel. If x≧W, the process advances to step S1213 to increment by one the counter y which holds the vertical position of the pixel of interest.

In step S1214, the vertical coordinate y of the pixel of interest is compared with the vertical pixel count H of the image. If y<H, the process returns to step S1203 to similarly process each pixel on the next line. If y≧H, the decoding process for the entire image has ended, and the decoding process ends.

As a result of the above process, lossless decoding can be achieved, similar to the second embodiment.

Third Embodiment

In the first embodiment and its modification, vector information is encoded using a single code table. This configuration is simple but redundant. The possibility at which the pixel value of interest is equal to one of surrounding pixel values is high when the number of surrounding colors is small, and low when the number of colors is large. Considering this, the third embodiment will describe a technique which tries to eliminate code redundancy and further increase the compression efficiency. According to this technique, whether to encode vector information is adaptively switched in accordance with the number of colors in surrounding pixels, and the vector information encoding method is changed in accordance with the number of colors.

Figure 13:
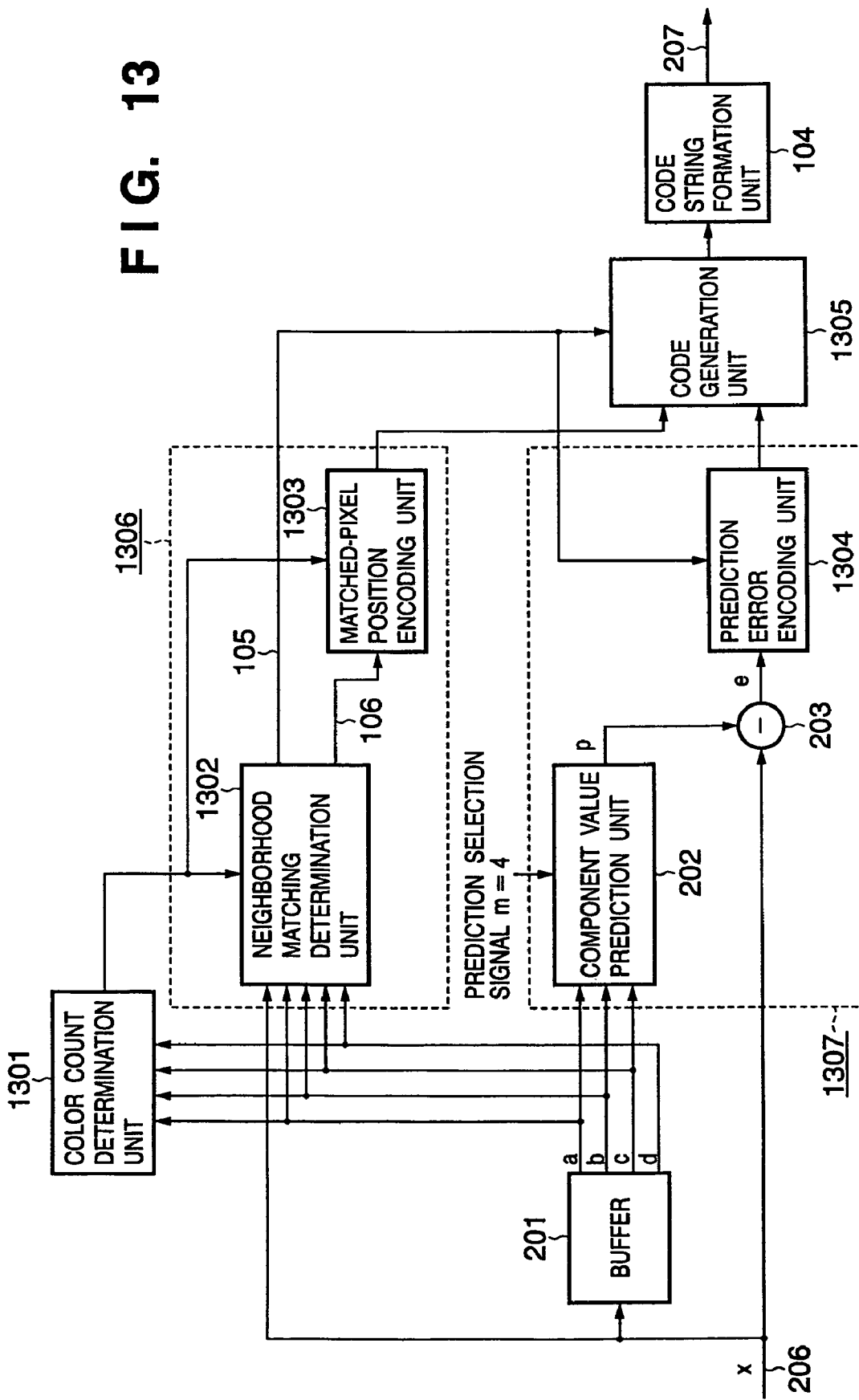
FIG. 13 is a block diagram showing the functional configuration of an image processing apparatus according to the third embodiment.

FIG. 13 is a block diagram showing an image processing apparatus which encodes an image according to the third embodiment.

As shown in FIG. 13, the image processing apparatus which encodes image data according to the third embodiment comprises a color count determination unit 1301, neighborhood matching determination unit 1302, matched-pixel position encoding unit 1303, prediction error encoding unit 1304, code generation unit 1305, and buffer 201. The apparatus also comprises a code string formation unit 104, component value prediction unit 202, and subtracter 203. In FIG. 13, reference numerals 105, 106, 206, and 207 denote signal lines. The same reference numerals denote processing units which perform the same operations as those of processing units in the image processing apparatus according to the first embodiment, and a description thereof will be omitted.

An image encoding process performed by the image processing apparatus according to the third embodiment will be explained with reference to FIG. 13.

Image data to be encoded by the image processing apparatus according to the third embodiment is identical to that according to the first embodiment. That is, image data to be encoded is image data of R, G, and B colors. Each component (color component) is formed from pixel data which expresses a luminance value of 0 to 255 by 8 bits. Image data to be encoded is formed by laying out pixels dot-sequentially, i.e., in the raster scan order, and each pixel is formed by laying out data in the order of R, G, and B. An image is made up of W horizontal pixels and H vertical pixels.

In the image processing apparatus according to the first embodiment, the prediction selection signal m for selecting a prediction scheme for use in the component value prediction unit 202 is externally input, and the prediction scheme is switched in accordance with the prediction selection signal m. In the image processing apparatus according to the third embodiment, the prediction selection signal m set for the component value prediction unit 202 is fixed to "4".

For each component of the pixel X of interest, the color count determination unit 1301 reads out the values of four surrounding pixels a, b, c, and d in 10. FIG. 3 for each component from the buffer 201, obtaining pixels Xa, Xb, Xc, and Xd. Letting (x,y) be the position of the pixel of interest, Xa, Xb, and Xc are represented as described above. The pixel Xd is represented by $$Xd=(P(x+1,y-1,0),P(x+1, y-1,1),P(x+1,y-1,2))$$

The color count determination unit 1301 detects the number of color types present in a set of the pixel data Xa, Xb, Xc, and Xd, and outputs color count information Nc. More specifically, the color count determination unit 1301 determines whether paired Xa and Xb, Xa and Xc, Xa and Xd, Xb and Xc, Xb and Xd, and Xc and Xd in six combinations each prepared by extracting two pixels from four pixels match each other. The color count determination unit 1301 counts the number of matched pairs. The color count determination unit 1301 determines that four colors exist if the number of matched pairs is "0", three colors if "1", two colors if "2" or "3", and one color if "6". The color count determination unit 1301 outputs the number of colors as the color count information NC.

The neighborhood matching determination unit 1302 generates and outputs vector information 106, and matched-pixel presence information 105 representing whether a pixel having the same color as that of the pixel X of interest exists in the four surrounding pixels (Xa, Xb, Xc, and Xd).

In the first embodiment described above, the neighborhood matching determination unit 101 refers to three surrounding pixels. In the third embodiment, the neighborhood matching determination unit 1302 compares the pixel X of interest with four surrounding pixels including the pixel data Xd.

The third embodiment generates and outputs the vector information 106, which depends on the color count information Nc output from the neighborhood matching determination unit 1302 and color count determination unit 1301. The neighborhood matching determination unit 1302 executes the following processes in accordance with the value (1 to 4) of the color count Nc.

i) When the color count information Nc is 4, i.e., Xa, Xb, Xc, and Xd all have different colors, the neighborhood matching determination unit 1302 outputs "4" as the vector information 106 regardless of a match/mismatch with the neighboring pixels Xa to Xd.

ii) When the color count Nc is 1, i.e., the neighboring pixels Xa to Xd have the same pixel value (same color), the pixel X of interest is compared with Xa. If X=Xa, the neighborhood matching determination unit 1302 outputs "0" as the vector information 106; if X≠Xa, "1".

iii) When the color count Nc is 2, i.e., two colors exist in the neighboring pixels Xa to Xd, the first pixel value (color) X1 and second pixel value X2 are obtained in the order of Xa, Xb, Xc, and Xd. If the pixel X of interest=X1, the neighborhood matching determination unit 1302 outputs "0" as the vector information 106; if X=X2, "1"; and if X≠X1 and X≠X2, "2". The first and second pixel values are defined as follows. In the order of Xa, Xb, Xc and Xd, the first pixel X1 is unconditionally Xa. The second pixel value is the value of a pixel which is first detected to have a different value (color) from Xa when Xb, Xc, and Xd are checked in the order named. For example, when Xa=Xb=Xc and Xd does not match any of Xa to Xc, the first pixel value X1 is Xa and the second pixel value X2 is Xd.

iv) When the color count Nc is 3, i.e., three colors exist in the neighboring pixels Xa to Xd, the first pixel value X1, second pixel value X2, and third pixel value X3 are obtained in the order of Xa, Xb, Xc, and Xd. If X=X1, the neighborhood matching determination unit 1302 outputs "0" as the vector information 106; if X=X2, "1"; if X=X3, "2"; and if X≠X1, X≠X2, and X≠X3, "3".

The neighborhood matching determination unit 1302 executes the following process in outputting the matched-pixel presence information 105.

The neighborhood matching determination unit 1302 compares information output as the vector information 106 with the color count Nc obtained from the color count determination unit 1301. If the vector information 106 coincides with the color count Nc, the neighborhood matching determination unit 1302 outputs "1" to the signal line 105; otherwise, "0". If the color count Nc=4, the matched-pixel presence information 105 is always "1". If the color count Nc is a value other than 4 and the pixel X of interest does not match any of the four surrounding pixels Xa, Xb, Xc, and Xd, the neighborhood matching determination unit 1302 outputs "1"; if the pixel X of interest matches at least one of the four surrounding pixels, "0".

The matched-pixel position encoding unit 1303 encodes the vector information 106 from the neighborhood matching determination unit 1302, and outputs a code word as a result of encoding to the code generation unit 1305. The matched-pixel position encoding unit 1303 according to the third embodiment switches between code tables in FIGS. 15A to 15C and uses the selected one in accordance with the color count Nc output from the color count determination unit 1301. When the color count Nc is 4, the matched-pixel position encoding unit 1303 does not output any code.

Among code words in FIGS. 15A to 15C, for example, "1 (binary)" exists for Nc=1, 2, 3. Even if encoded data of the pixel of interest has this code, the decoding apparatus (to be described later) can specify one of the codes in FIGS. 15A to 15C on the basis of the color count Nc of decoded surrounding pixels. It is ensured that the encoded data can be correctly decoded.

Similar to the first embodiment, each component of the pixel of interest is predictively encoded by the component value prediction unit 202, subtracter 203, and prediction error encoding unit 1304. In the third embodiment, the prediction selection signal m is set to a fixed value "4", and the predicted values of all component values are obtained by an equation "a+b−c".

In the first embodiment, Huffman encoding is executed by the prediction encoding unit 205 using the code table in FIG. 6. The third embodiment will explain an example using Golomb encoding.

Golomb encoding encodes a nonnegative integral value, and as its feature, can achieve encoding based on different probability models in accordance with a parameter variable k. Golomb encoding can derive a code word from a symbol to be encoded and the parameter variable k, and does not require any code table. One form of Golomb encoding is employed as a prediction error encoding scheme in JPEG-LS (ISO/IEC 14495-1|ITU-T Recommendation T.87) recommended as an international standard by ISO and ITU-T. In the third embodiment, a prediction error e output from the subtracter 203 is converted into a nonnegative integral value (defined as V) in accordance with the following equation, and V is Golomb-encoded by the selected parameter k:

For e≧0, $V=2 \times e$

For e<0, $V=-2 \times e-1$

The procedures of Golomb-encoding the nonnegative integral value V at the encoding parameter k are as follows.

V is shifted to the right by k bits to obtain an integral value m. The code of V is formed from a combination of "1" (variable length part) following m "0"s and the lower k bits (fixed-length part) of V. FIG. 16 shows an example of Golomb codes at k=0, 1, 2. The above-described code formation method is merely an example, and a uniquely decodable code can be formed even by replacing the fixed-length part and variable length part. The code can also be formed by replacing 0 and 1. As the method of selecting the encoding parameter k, various methods are conceivable, including a method of selecting an optimal parameter k in a predetermined unit and integrating the parameter k into a code string. The third embodiment adopts a method of updating the parameter k during encoding by the same method as JPEG-LS. The method of selecting the encoding parameter k will be described.

The prediction error encoding unit 1304 comprises a counter N which holds the number of encoded pixels, and counters A[C] (C is a component number of 0 to 2) each of which holds the sum of the absolute values of encoded prediction errors for each component. At the start of encoding, the counter N is set to 1, and the counters A[0] to A[2] are set to 2. A maximum value k at which N×2^k (x^y means y powers of x) does not exceed A[C] is obtained for each component value to be encoded. The prediction error e is Golomb-encoded by the above-described procedure using k, outputting a code word. When the information 105 from the neighborhood matching determination unit 1302 is "1" (the same color as that of the pixel X of interest does not exist in the neighboring pixels a, b, c, and d), k is updated by adding the absolute value |e| of the prediction error to A[C] after the encoding process of each component. In this case, the variable N is incremented by one and updated after the encoding process of all components. In order to limit A[C] and N within a predetermined range, a process of updating A[C] and N to ½ at the timing when N reaches a predetermined value (e.g., 32) is applied.

In accordance with the matched-pixel presence information 105, the code generation unit 1305 generates encoded data of the pixel of interest from the code word output from the matched-pixel position encoding unit 1303, and predictively encoded data of each component that is output from the prediction error encoding unit 1304. When the matched-pixel presence information 105 is "0", encoded data of the pixel of interest is formed from only the code word output from the matched-pixel position encoding unit 1303, as shown in FIG. 8B. When the matched-pixel presence information 105 is "1", encoded data of the pixel of interest is formed by concatenating predictively encoded data of each component value that is output from the prediction error encoding unit 1304, to the code word output from the matched-pixel position encoding unit 1303, as shown in FIG. 8C. When the color count Nc detected by the color count determination unit 1301 is 4, no code word is output from the matched-pixel position encoding unit 1303 (i.e., the code word length of neighborhood matching information is 0).

The code string formation unit 104 forms a code string of a predetermined format from encoded data output from the code generation unit 1305, and additional information (e.g., the prediction selection signal m, the numbers of horizontal and vertical pixels of an image, the number of components which form a pixel, and the precision of each component). The code string formation unit 104 outputs the code string to the signal line 207. Also in the third embodiment, similar to the first embodiment, a code string having the structure shown in FIG. 9 can be generated. In the image processing apparatus according to the third embodiment, the prediction selection signal m is set to a fixed value. If the prediction selection signal m is also fixed in a decoding apparatus, the header need not store any prediction selection signal m.

As described above, the image processing apparatus according to the third embodiment changes the presence/absence of a code word for vector information and assignment of a code in encoding the vector information, in accordance with the number of colors in encoded pixels Xa, Xb, Xc, and Xd around the pixel X to be encoded. This process can further increase the lossless compression ratio of image data (e.g., a text, line art, or CG image) in which a pixel having the same color as that of the pixel of interest is highly likely to exist around the pixel of interest. An efficient code can be generated without generating any redundant addition to even image data (e.g., a natural image) in which a pixel having the same color as that of the pixel of interest is less likely to exist around the pixel of interest.

Modification to Third Embodiment

The third embodiment may be implemented by software. An example of the software will be explained. An apparatus configuration when the apparatus is implemented by software is the same as that in FIG. 14 which is referred to in the modification to the first embodiment, and a description thereof will be omitted. The process procedures of an encoding application which runs in the apparatus will be explained.

Figure 22:
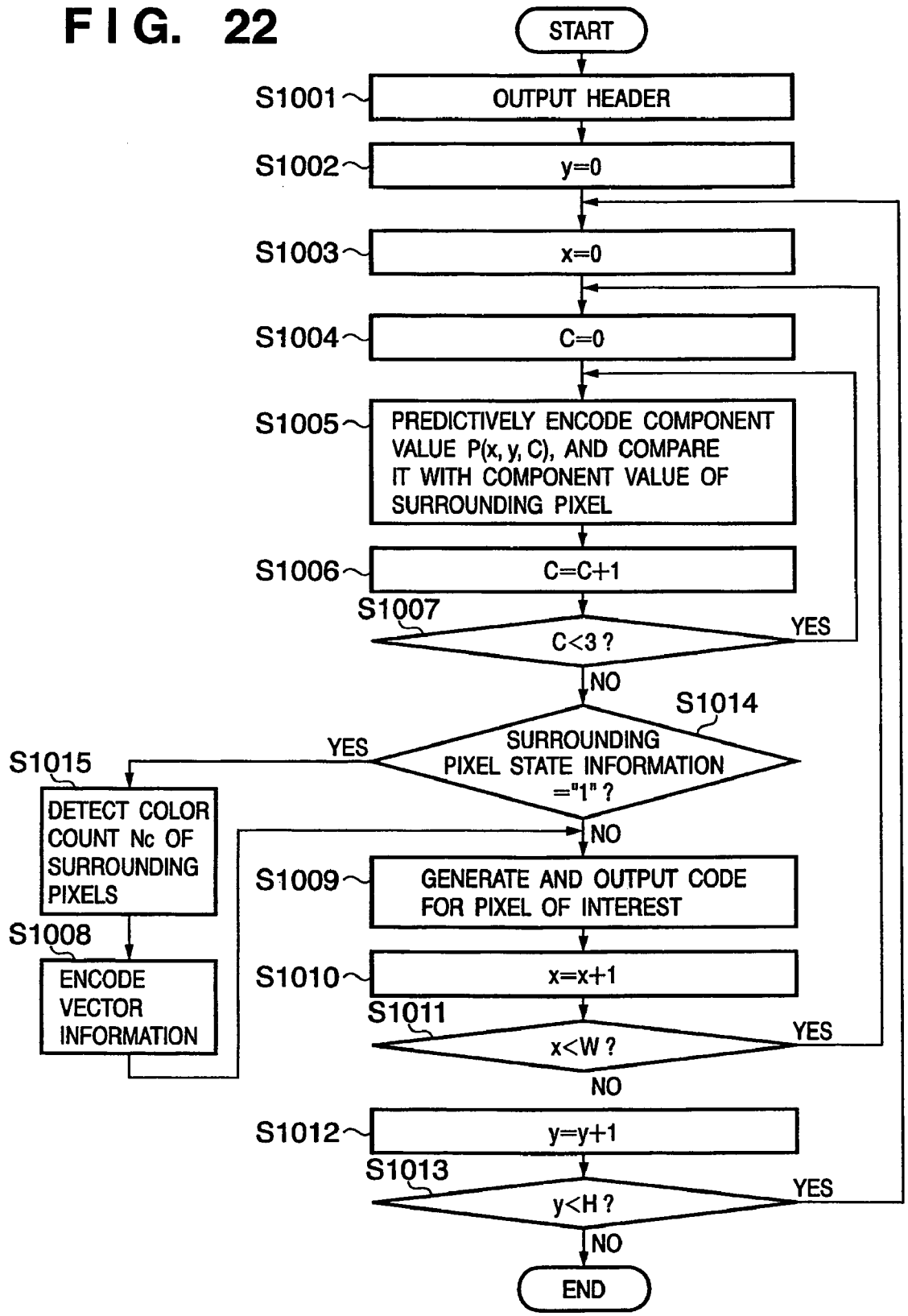
FIG. 22 is a flowchart showing the flow of a process of encoding target image data by the image processing apparatus according to the third embodiment.

FIG. 22 shows the procedures of an encoding process according to the third embodiment. As shown in FIG. 22, the flow is almost the same as the flowchart of FIG. 10 showing the flow of the encoding process in the first embodiment described above, and the same reference symbols denote the same processes. The flow in FIG. 22 is different from that in FIG. 10 in that input of the prediction selection signal m in step S1000 of FIG. 10 is omitted, and a process of obtaining the color count Nc by the color count determination unit 1301 in step S1015 is added. The modification to the third embodiment will be explained. Note that various buffers are allocated in a RAM 1402 by a CPU 1401 prior to the start of a process.

The code string formation unit 104 generates and outputs a header containing additional information of an image to be encoded (step S1001). A counter y which holds the vertical position of the pixel of interest is set to 0 (step S1002), and a counter x which holds the horizontal position of the pixel of interest is set to 0 (step S1003). Similarly, a counter C which holds the component number of interest is set to 0 (step S1004).

The component value P(x,y,C) of the pixel of interest is input from the signal line 206, and stored in the buffer 201. The component value P(x,y,C) is predictively encoded by the component value prediction unit 202, subtracter 203, and prediction error encoding unit 1304. At the same time, the component value P(x,y,C) is compared with the value of a surrounding pixel for each component by the neighborhood matching determination unit 1302 (step S1005). The component number C of interest is incremented by one (step S1006), and compared with "3" which is the number of color components of an RGB image. If C<3, the process returns to step S1005 to similarly process the next component; otherwise, shifts to step S1014.

If all the components of the pixel of interest are input, the color count determination unit 1301 obtains the color count Nc (step S1015). By using the color count Nc, the neighborhood matching determination unit 1302 generates the vector information 106 and matched-pixel presence information 105. If Nc is 4, no vector information is encoded (step S1008).

The code generation unit 1305 generates a code for the pixel of interest in accordance with the matched-pixel presence information 105 on the basis of the code word of neighborhood matching information that is output from the matched-pixel position encoding unit 1303, and predictively encoded data of each component that is output from the prediction error encoding unit 1304. The code generation unit 1305 outputs the result via the code string formation unit 104 (step S1009).

Thereafter, the counter x which holds the horizontal position of the pixel of interest is incremented by one (step S1010), and compared with the horizontal pixel count W of the image. If x<W, the process returns to step S1004 to perform the encoding process for the next pixel. If x≧W, the process advances to step S1012 to increment by one the counter y which holds the vertical position of the pixel of interest. The counter y representing the vertical position of the pixel of interest is compared with the vertical pixel count H of the image. If y<H, the process returns to step S1003 to similarly process a pixel on the next line. If y≧H, the entire image has been encoded, and the encoding process ends.

As described above, even the modification can attain the same operation effects as those of the third embodiment.

Fourth Embodiment

An example of decoding encoded image data which is generated in the third embodiment and its modification will be described as the fourth embodiment. The decoding process is basically executed by procedures opposite to those of the encoding process according to the third embodiment.

Figure 17:
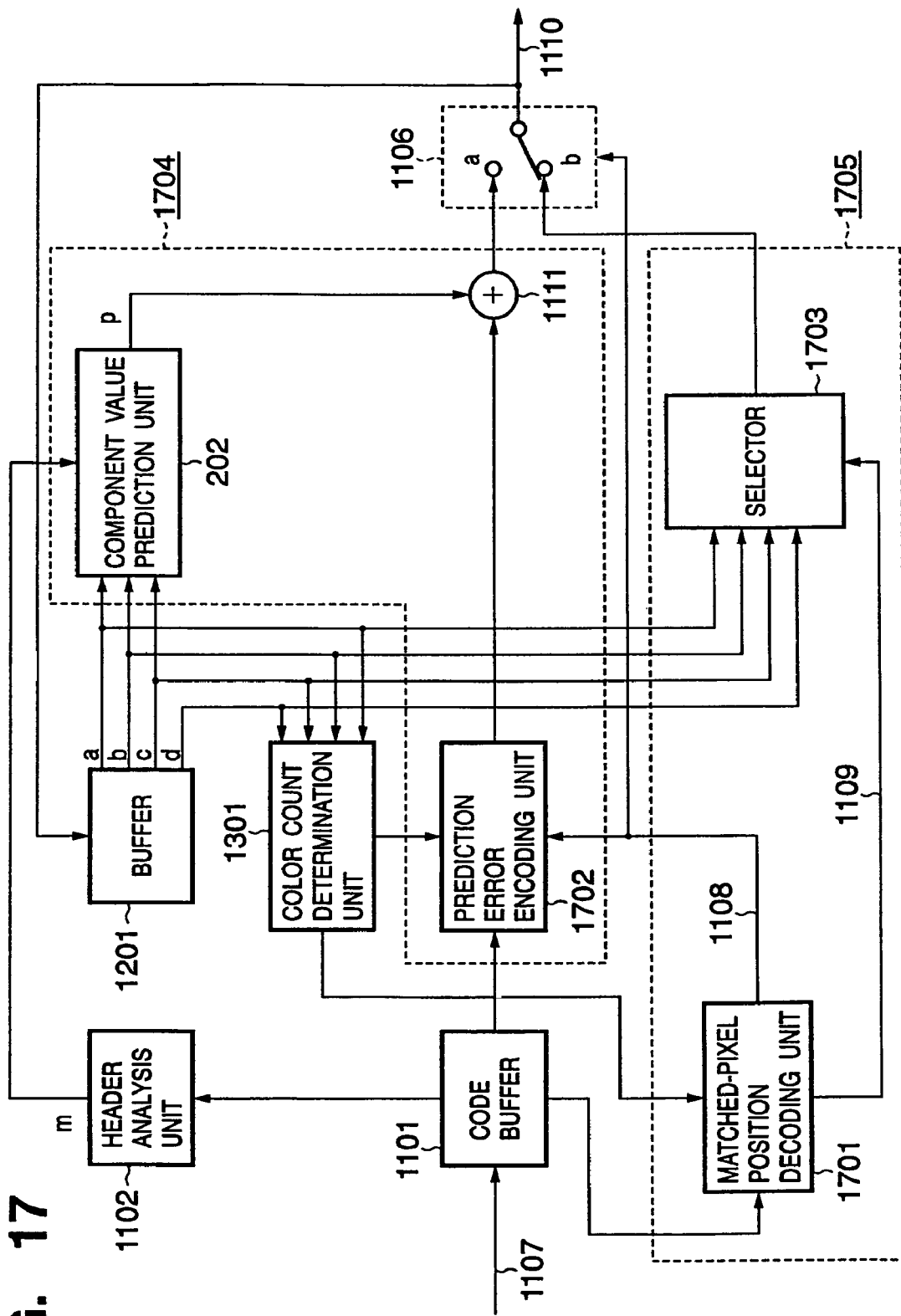
FIG. 17 is a block diagram showing the functional configuration of an image processing apparatus according to the fourth embodiment.

FIG. 17 is a block diagram showing the functional configuration of an image processing apparatus which decodes image data according to the fourth embodiment. As shown in FIG. 17, the image processing apparatus according to the fourth embodiment comprises a matched-pixel position decoding unit 1701, prediction error decoding unit 1702, selector 1703, color count determination unit 1301, code buffer 1101, header analysis unit 1102, switch 1106, and buffer 201. The apparatus also comprises a component value prediction unit 202 and adder 1111. In FIG. 17, reference numerals 1107, 1108, 1109, and 1110 denote signal lines. The same reference numerals denote blocks which perform the same operations as those of processing blocks in the image processing apparatuses according to the first to third embodiments, and a description thereof will be omitted.

A difference of a process performed by the image processing apparatus according to the fourth embodiment from that performed by the image processing apparatus described in the second embodiment will be explained with reference to FIG. 17.

Similar to the second embodiment, encoded data to be decoded is input to the image processing apparatus via the signal line 1107, and properly stored in the code buffer 1101. The header analysis unit 1102 acquires additional information.

Also in the fourth embodiment, pixel data finally obtained by decoding is output from the switch 1106. Image data of two lines are stored in the buffer 201 the buffer 201 is cleared to 0 at the start of the decoding process).

The color count determination unit 1301 obtains the color count Nc of pixels a, b, c, and d near the pixel of interest by the process described in the third embodiment.

When the color count Nc output from the color count determination unit 1301 is one of 1 to 3, the matched-pixel position decoding unit 1701 determines which of the tables in FIGS. 15A to 15C is to be used for encoded data of each pixel, and then decodes a code word into vector information. The decoded vector information is output to the selector 1703 via the signal line 1109.

The matched-pixel position decoding unit 1701 compares the decoded vector information with the color count Nc. When the decoded vector information coincides with the color count Nc, the matched-pixel position decoding unit 1701 outputs "1" as a signal 1108 for controlling the prediction error decoding unit 1702 and switch 1106; otherwise, "0". When the color count Nc is 4, the matched-pixel position decoding unit 1701 outputs a control signal "1" from the signal line 1108, and outputs "4" as the vector information to the signal line 1109.

When the control signal 1108 from the matched-pixel position decoding unit 1701 is "1", the prediction error decoding unit 1702 decodes the prediction error of each component of the pixel of interest by a decoding procedure paired with the encoding process of the prediction error encoding unit 1304 that has been described in the third embodiment. Similar to the prediction error encoding unit 1304, the prediction error decoding unit 1702 comprises a counter N which holds the number of encoded pixels, and counters A[C] (C is a component number of 0 to 2) each of which holds the sum of the absolute values of encoded prediction errors for each component. At the start of decoding, the counter N is set to 1, and the counters A[0] to A[2] are set to 2. In decoding the component value of interest in the pixel of interest, the same value as the parameter k used for encoding is derived from N and A[0] to A[2] by the same method as that in encoding. By using the parameter k, a nonnegative integral value V is decoded. A Golomb code is decoded by a procedure opposite to the encoding procedure. First, the run of "0"s is checked after the start of decoding, and held as an integral value m. Then, k bits are extracted immediately after "1" which terminates the run of "0"s. The integral value m is shifted to the left by k bits, and ORed with the extracted k bits to decode the nonnegative integral value V. A prediction error e is decoded from the nonnegative integral value V by the following equations:

When V is an odd number, $e=-(V+1)/2$

When V is an even number, $e=V/2$

Similar to the second embodiment, the component value prediction unit 202 generates a predicted value p. The adder 1111 adds the predicted value p and prediction error e to reconstruct and output the color component of interest in the pixel of interest. After each component is decoded, the counter A[C] is updated by adding the absolute value |e| f the decoded prediction error to the counter A[C]. After all the components of the pixel of interest are decoded, the counter N is incremented by one and updated. In order to limit A[C] and N within a predetermined range, a process of updating A[C] and N to ½ at the timing when N reaches a predetermined value (e.g., 32) is applied. This process must be executed commonly on the encoding and decoding sides in order to obtain the same parameter k on the two sides.

In accordance with the vector information 1109 from the matched-pixel position decoding unit 1701, the selector 1703 selects and outputs one of the component values of the pixels Xa, Xb, Xc, and Xd around the pixel X of interest that are read out from the buffer 1201. More specifically, when the vector information 1109 is "0", the selector 1703 selects each component value of Xa. When the vector information 1109 is "1", the selector 1703 selects each component value of a pixel having the second pixel value (color) different from Xa in the order of Xa, Xb, Xc, and Xd. Similarly, when the vector information 1109 is "2", the selector 1703 selects and outputs each component value of a pixel having the third pixel value different from the first pixel value (Xa) and second pixel value in the order of Xa, Xb, Xc, and Xd. When the vector information 1109 is "3" or "4", an output from the selector 1703 is invalid. In this case, the switch 1106 is connected to the terminal a, and an output from the selector 1703 is arbitrary.

When the signal 1108 from the matched-pixel position decoding unit 1701 is "1", the switch 1106 selects the terminal a, and outputs pixel data obtained by predictive decoding. When the signal 1108 is "0", the switch 1106 selects the terminal b, and outputs, as a decoding result, pixel data obtained on the basis of the vector information. As described above, the pixel data output from the switch 1106 is stored in the buffer 1201, and used as a surrounding pixel in decoding subsequently input encoded data.

As described above, original image data can be completely reconstructed from encoded data.

Modification to Fourth Embodiment

The fourth embodiment may be implemented by software. An example of the software will be explained.

Processes corresponding to various processing units shown in FIG. 17 are implemented by functions, subroutines, and the like in software. In the modification, the names of the processing units in FIG. 17 are directly used for descriptive convenience. An apparatus configuration is the same as that in FIG. 14, and a description thereof will be omitted. The process procedures of a decoding application which runs in the apparatus will be described with reference to the flowchart of FIG. 23.

Figure 12:
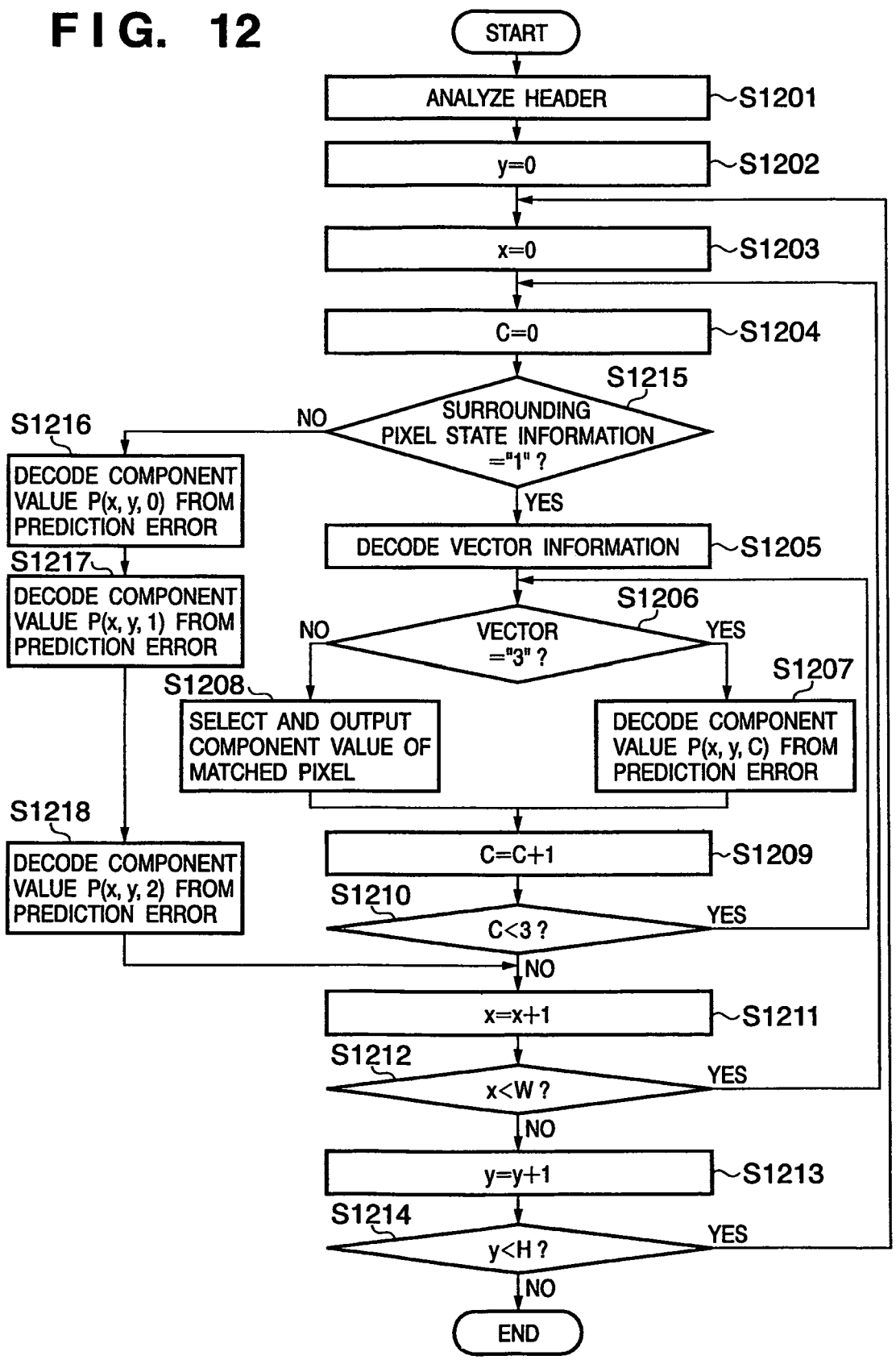
FIG. 12 is a flowchart showing the flow of a decoding process by the image processing apparatus according to the second embodiment.
Figure 23:
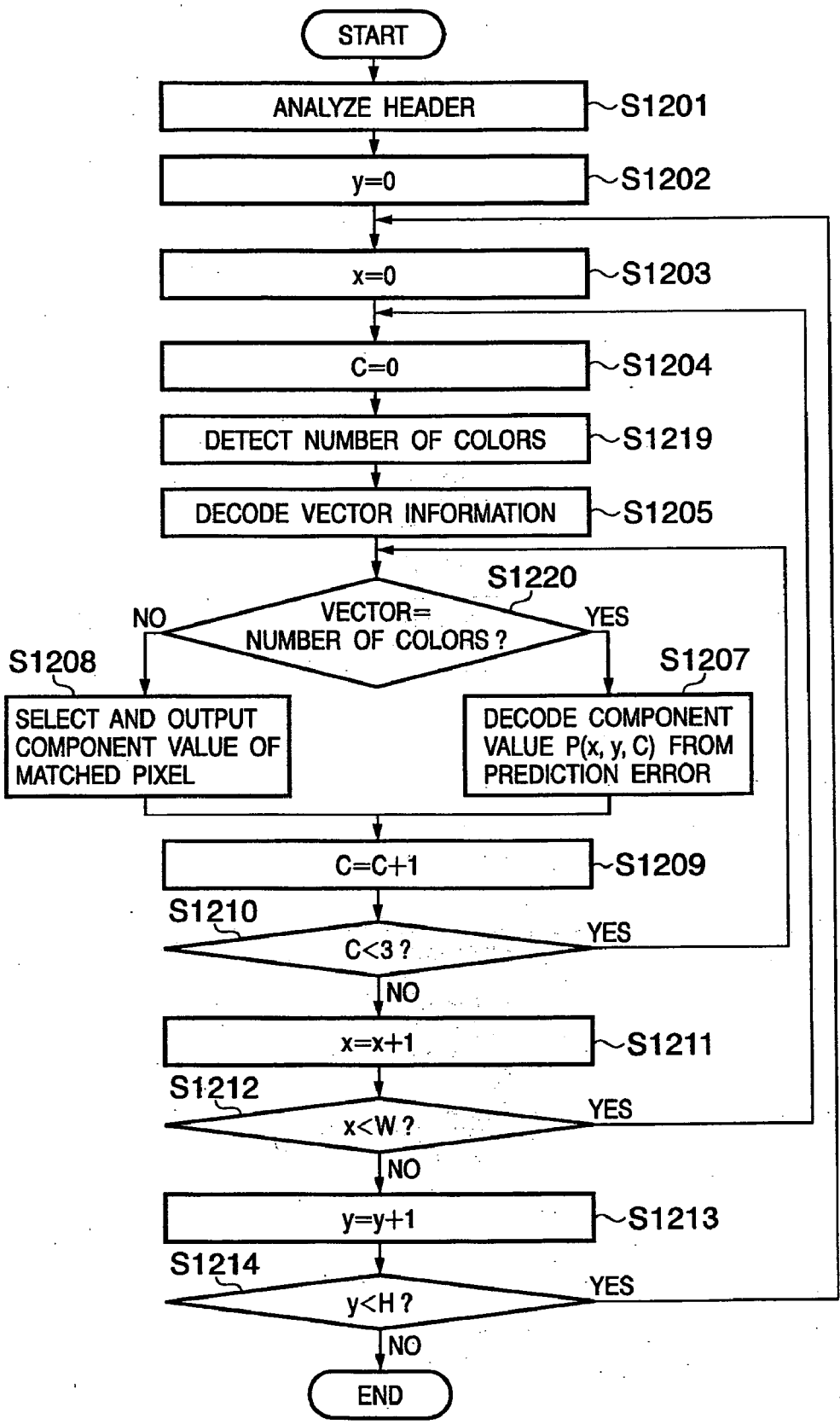
FIG. 23 is a flowchart showing the flow of a decoding process by the image processing apparatus according to the fourth embodiment.

As shown in FIG. 23, the decoding process is done by almost the same procedures as those of the flowchart in FIG. 12 that is explained as the flow of the decoding process according to the second embodiment. The same reference symbols as those in the flowchart of FIG. 12 denote the same processes. The flow in FIG. 23 is especially different from that in FIG. 12 in that a process of detecting the color count Nc in step S1219 is added, vector information is decoded in accordance with the color count Nc in step S1205, and it is determined in step S1220 instead of step S1206 whether decoded vector information coincides with the color count Nc. Note that a program complying with FIG. 23 is loaded into a RAM 1402 and executed by a CPU 1401.

Encoded data to be decoded is stored in the code buffer 1101 from the signal line 1107. The header analysis unit 1102 analyzes the header of the encoded data to extract additional information necessary for decoding (step S1201). A counter y which holds the vertical position of the pixel of interest is set to 0 (step S1202), and a counter x which holds the horizontal position of the pixel of interest is set to 0 (step S1203). Further, a counter C which holds the component number of interest is set to 0 (step S1204).

In decoding each pixel, the color count determination unit 1301 obtains the color count Nc of surrounding pixels, and the matched-pixel position decoding unit 1701 decodes vector information 1109 corresponding to the value Nc. At this time, the matched-pixel position decoding unit 1701 also generates matched-pixel presence information 1108, and outputs it as a control signal to the prediction error decoding unit 1702 and switch 1106 (step S1205).

It is determined whether the decoded vector information coincides with the color count Nc (step S1220). If the decoded vector information coincides with the color count Nc (YES in step S1220), the process shifts to step S1207; if NO, to step S1208.

After the process shifts to step S1207 (at this time, the signal line 1108 holds "1"), the terminal a of the switch 1106 is selected. The component value P(x,y,C) of interest is decoded by the component value prediction unit 202, prediction error decoding unit 1702, and adder 1111. If NO in step S1220 (at this time, the signal line 1108 holds "0"), the process shifts to step S1208. In step S1208, the terminal b of the switch 1106 is selected. On the basis of the vector information decoded by the matched-pixel position decoding unit 1701, the selector 1703 selects one of the component values of surrounding pixels that are read out from the buffer 1201. The selection result is output as the component value P(x,y,C) of the pixel of interest. The component value P(x,y,C) output in step S1207 or S1208 is output from the signal line 1110 outside the apparatus, and at the same time, stored in the buffer 1201.

In step S1209, the counter C which holds the component number of interest is incremented by one, and compared with "3" which is the number of color components of an RGB image. If C<3, the process returns to step S1206 to perform the decoding process for the next component. If C=3, the process shifts to step S1211 to increment by one the counter x which holds the horizontal position of the pixel of interest. If it is determined in step S1212 that x<W, the process returns to step S1204 to perform the decoding process for the next pixel. If x≧W, the process shifts to step S1213 to increment by one the counter y which holds the vertical position of the pixel of interest. After that, y is compared with the vertical pixel count H of the image. If y<H, the process returns to step S1203 to similarly process each pixel on the next line. If y≧H, the decoding process for the entire image has been completed, and the decoding process ends.

By the above operation, original image data can be completely reconstructed from encoded data.

Fifth Embodiment

In the image processing apparatus according to the third embodiment, whether to encode vector information and a table used in encoding are switched for the pixel of interest in accordance with the number of colors in encoded surrounding pixels. Even an image (e.g., a natural image) in which a surrounding pixel having the same pixel value (color) as that of the pixel of interest is less likely to exist can be prevented from increasing the code amount by encoding vector information. In addition, higher compression efficiency can be expected from a CG image or the like in which a neighboring pixel having the same pixel value (color) as that of the pixel of interest is highly likely to exist. In order to implement higher compression ratio, a combination with run-length encoding is also effective. As the fifth embodiment, an example of combining the third embodiment and run-length encoding will be explained.

Figure 18:
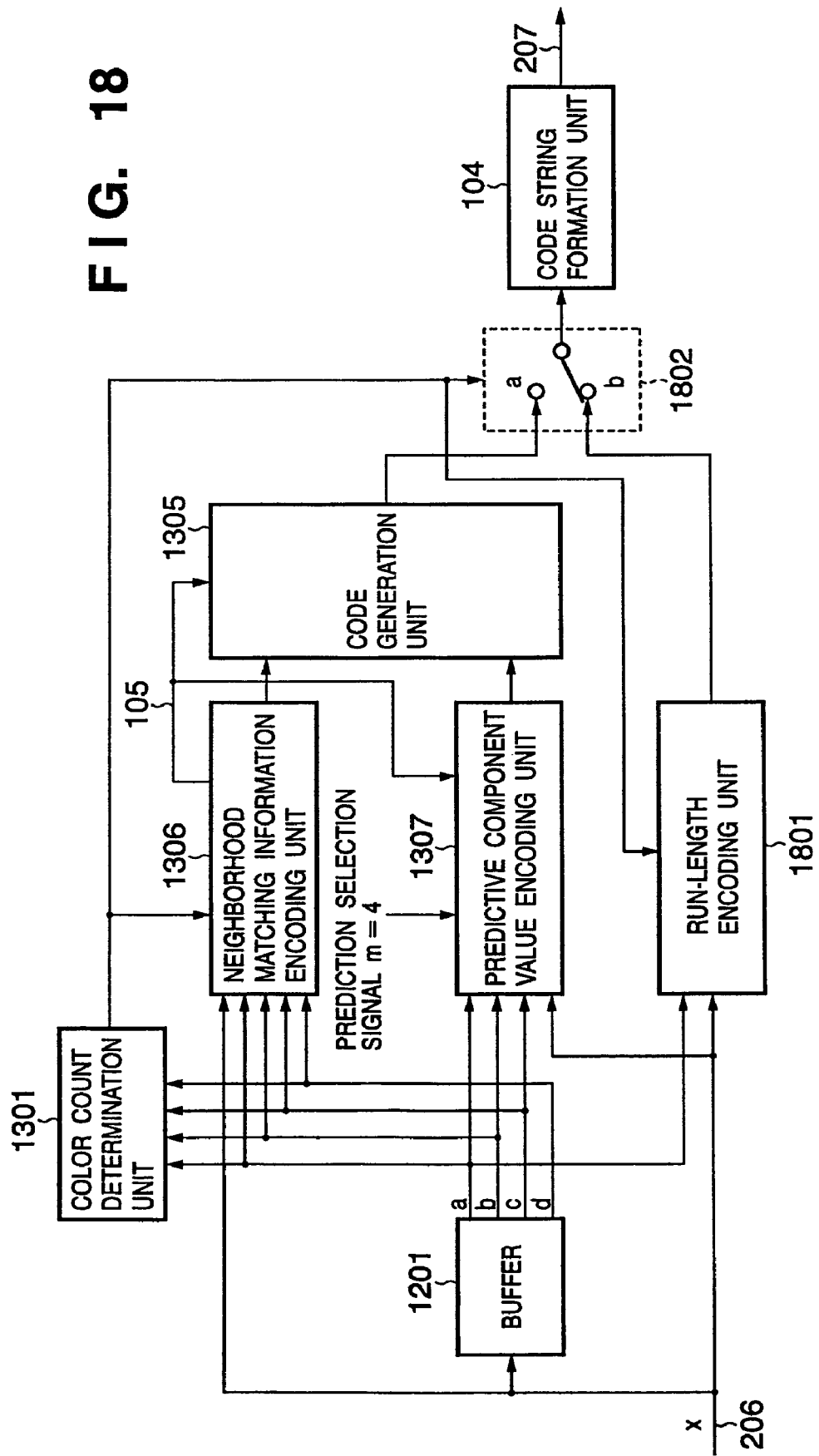
FIG. 18 is a block diagram showing the functional configuration of an image processing apparatus according to the fifth embodiment.

FIG. 18 is a block diagram showing the functional configuration of an image processing apparatus which encodes an image according to the fifth embodiment. As shown in FIG. 18, the image processing apparatus according to the fifth embodiment comprises a run-length encoding unit 1801, switch 1802, color count determination unit 1301, neighborhood matching information encoding unit 1306, and predictive component value encoding unit 1307. The apparatus also comprises a code generation unit 1305, buffer 1201, and code string formation unit 104. Reference numerals 105, 206, and 207 denote signal lines. The same reference numerals denote blocks which perform the same operations as those of processing blocks in the image processing apparatus according to the first embodiment, and a description thereof will be omitted.

An image encoding process by the image processing apparatus according to the fifth embodiment will be explained with reference to FIG. 18.

The image processing apparatus according to the fifth embodiment is configured by adding the run-length encoding unit 1801 and switch 1802 to the image processing apparatus according to the third embodiment shown in FIG. 13. The neighborhood matching information encoding unit 1306 corresponds to a broken-line part containing the neighborhood matching determination unit 1302 and matched-pixel position encoding unit 1303 in FIG. 13. The predictive component value encoding unit 1307 corresponds to a broken-line part containing the component value prediction unit 202, subtracter 203, and prediction error encoding unit 1304 in FIG. 13.

In the fifth embodiment, image data to be encoded is image data of C, M, Y, and K colors. Each component (color component) is formed from pixel data which expresses a luminance value of 0 to 255 by 8 bits. Image data to be encoded is formed by laying out pixels dot-sequentially, i.e., in the raster scan order, and each pixel is formed by laying out data in the order of C, M, Y, and K. An image is made up of W horizontal pixels and H vertical pixels. A color space of C (Cyan), M (Magenta), Y (Yellow), and K (blacK) is adopted as another example because an image to be encoded is image data of R, G, and B colors in the above-described embodiments.

The operation of each unit in the image processing apparatus according to the fifth embodiment will be explained. Similar to the third embodiment described above, the prediction scheme used in the component value prediction unit 202 (inside the predictive component value encoding unit 1307) is fixed, and the prediction selection signal m=4 is always input.

Image data to be encoded are sequentially input from the signal line 206. The input order of pixel data is the raster scan order, and component data of each pixel are input in the order of C, M, Y, and K. The density values of the C, M, Y, and K components of the pixel are defined as component numbers of 0, 1, 2, and 3, respectively. The upper left corner of an image is defined as coordinates (0,0), and the value of the component number C of a pixel at the horizontal pixel position x and vertical pixel position y is represented by P(x,y,C). For example, the C, M, Y, and K component values of a pixel at a horizontal pixel position "104" and vertical pixel position "335" are represented by P(104,335,0), P(104,335,1), P(104, 335,2), and P(104,335,3). When a pixel value is expressed as a set of components, it is expressed as a vector X containing C, M, Y, and K component values as elements. For example, a pixel whose C, M, Y, and K component values are c, m, y, and k is described as X=(c,m,y,k).

The image processing apparatus basically outputs a corresponding code from the code string formation unit 104 for each pixel of image data sequentially input from the signal line 206. For a part of data to which run-length encoding is applied, a code is output in accordance with the run of pixels.

The buffer 1201 has an area for storing image data of two lines, and sequentially stores image data input from the signal line 206. As described above, image data are input in the raster order of pixels, the component values of each pixel are input in the order of C, M, Y, and K, and the input data are stored in the buffer 1201. The values of four pixels a, b, c, and d in FIG. 3 are read out for each component from the buffer 1201, and supplied to the color count determination unit 1301, neighborhood matching information encoding unit 1306, and predictive component value encoding unit 1307. Letting P(x,y,C) be the component value of the pixel of interest, a=P(x−1,y,C), b=P(x,y−1,C), c=P(x−1,y−1,C) and d=P(x+1,y−1,C). Assume that, when a, b, c, and d are positioned outside an image on the first line of the image or at the start or end of each line, a common value is given to the encoding and decoding sides. In the fifth embodiment, this value is 0.

For each component of the pixel X of interest, the color count determination unit 1301 reads out the values of the four surrounding pixels a, b, c, and d for each component in FIG. 3 from the buffer 1201, obtaining pixels Xa, Xb, Xc, and Xd. Letting (x,y) be the position of the pixel of interest, Xa, Xb, Xc, and Xd are expressed as follows:

$$Xa=(P(x-1,y,0),P(x-1,y,1),P(x-1,y,2),P(x-1,y,3))$$

$$Xb=(P(x,y-1,0),P(x,y-1,1),P(x,y-1,2),P(x,y-1,3))$$

$$Xc=(P(x-1,y-1,0),P(x-1,y-1,1),P(x-1,y-1,2),P(x-1,y-1,3))$$

$$Xd=(P(x+1,y-1,0),P(x+1,y-1,1),P(x+1,y-1,2),P(x+1,y-1,3))$$

The color count determination unit 1301 detects the number of color types present in a set of Xa, Xb, Xc, and Xd, and outputs a color count Nc. More specifically, the color count determination unit 1301 counts the number by which two extracted pixels match each other in six combinations each prepared by extracting two pixels from four pixels. The color count determination unit 1301 determines that there are four colors if the count is "0", three colors if "1", two colors if "2" or "3", and one color if "6". The color count determination unit 1301 outputs to the signal line 105, the color count Nc. This is the same as in the third embodiment.

The neighborhood matching information encoding unit 1306 receives the color count Nc of the four surrounding pixels that is output from the color count determination unit 1301. Similar to the third embodiment, when the color count Nc is one of 1 to 3, the neighborhood matching information encoding unit 1306 encodes vector information for specifying a match/mismatch between the pixel X of interest and the four surrounding pixels (Xa, Xb, Xc, and Xd), and if the pixel X matches any surrounding pixel, specifying the matched neighboring pixel. Then, the neighborhood matching information encoding unit 1306 outputs a code word for the vector information. The neighborhood matching information encoding unit 1306 outputs surrounding pixel state information representing whether a pair of pixels having the same color exist in the four surrounding pixels.

Similar to the third embodiment, the C, M, Y, and K components of the pixel of interest are encoded by the predictive component value encoding unit 1307. Predictive encoding of each component by the predictive component value encoding unit 1307 may employ, e.g., an encoding method in a regular mode by the international standard scheme JPEG-LS.

In accordance with the surrounding pixel state information from the signal line 105, the code generation unit 1305 generates encoded data of the pixel of interest from the code word of the vector information that is output from the neighborhood matching information encoding unit 1306, and predictively encoded data of each component that is output from the predictive component value encoding unit 1307. The operation of the code generation unit 1305 is the same as that described in the third embodiment.

The run-length encoding unit 1801 holds a counter RL which counts the run of the same pixel value. When the color count Nc output from the color count determination unit 1301 becomes 1, the counter RL starts and continues counting. If, however, the pixel X of interest has a value different from the immediately preceding pixel value Xa or reaches the final pixel on one line, the current run length held by the counter RL is encoded and output. The run length can be encoded by various methods. The fifth embodiment employs the same method as run-length encoding using a run mode in the international standard JPEG-LS, and details thereof will be omitted. For descriptive convenience, counting of the run of pixels starts on the basis of the color count Nc output from the color count determination unit 1301. The counting may start as far as generation of the run (run of pixel values) can be predicted on the encoding and decoding sides. For example, letting Xe be a pixel immediately before Xa and Xa=Xe, counting of the run starts.

When the color count Nc output from the color count determination unit 1301 is 1, the switch 1802 is connected to the terminal b. The switch 1802 is fixed to the terminal b while the run-length encoding unit 1801 counts the run length. After the run length terminates and the run-length encoding unit 1801 outputs a code, the switch 1802 is switched to the terminal a.

As described above, the image processing apparatus according to the fifth embodiment comprises the neighborhood matching information encoding unit 1306, predictive component value encoding unit 1307, and run-length encoding unit 1801. Encoding is executed by selectively executing these encoding schemes in accordance with the number of colors in the encoded pixels Xa, Xb, Xc, and Xd around the pixel X to be encoded. This selection is based on the encoded pixel value, so no information for switching the encoding scheme need be transmitted. In addition to the same effects as those of the third embodiment the fifth embodiment can further increase the lossless compression ratio of a text, line art, CG image, and the like by introducing run-length encoding.

Modification to Fifth Embodiment

The fifth embodiment may be implemented by software. An example of the software will be explained. An apparatus configuration when the apparatus is implemented by software is the same as that in FIG. 14 which is referred to in the modification to the first embodiment, and a description thereof will be omitted. The process procedures of an encoding application which runs in the apparatus will be described.

Figure 19:
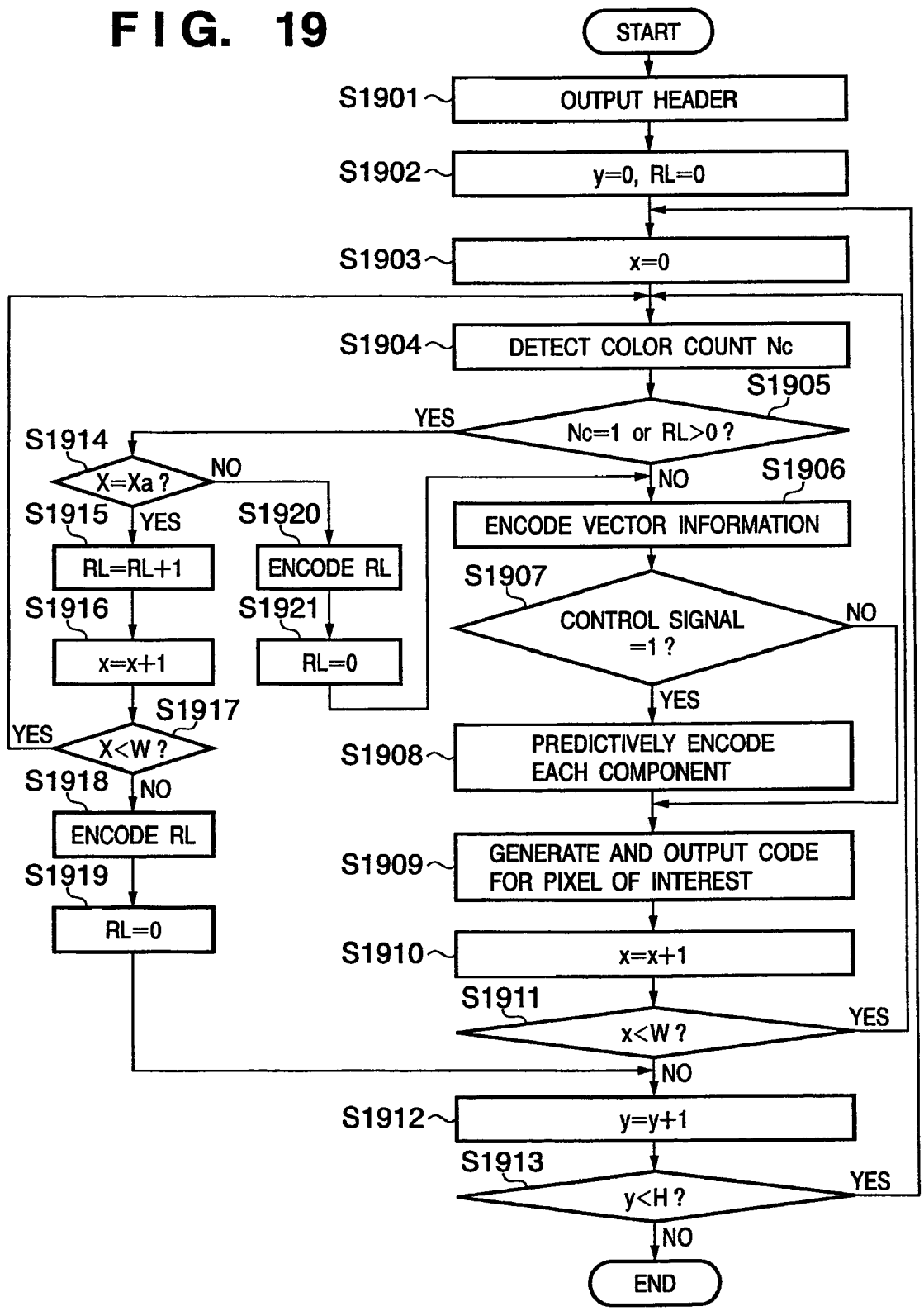
FIG. 19 is a flowchart showing the flow of a process of encoding target image data by the image processing apparatus according to the fifth embodiment.

The procedures of an encoding process according to the fifth embodiment are shown in the flowchart of FIG. 19. FIG. 19 is a flowchart showing the flow of the encoding process by the image processing apparatus according to the fifth embodiment. Note that a program complying with FIG. 19 is loaded into a RAM 1402 and executed by a CPU 1401. When the fifth embodiment is implemented by software, processes corresponding to the processing units shown in FIG. 18 are implemented by functions, subroutines, and the like in software. In the modification, the names of the processing units in FIG. 18 are directly used for descriptive convenience.

The code string formation unit 104 generates and outputs a header containing additional information of an image to be encoded (step S1901). A counter y which holds the vertical position of the pixel of interest is set to 0, and the counter RL held in the run-length encoding unit 1801 is set to 0 (step S1902). Further, a counter x which holds the horizontal position of the pixel of interest is set to 0 (step S1903).

The color count determination unit 1301 obtains the color count Nc of four pixels around the pixel X of interest positioned at coordinates (x,y) (step S1904). If the color count Nc is 1 or the counter RL holds a value other than 0 (YES in step S1905), the process shifts to step S1914; if NO, to step S1906 (step S1905). If YES in step S1905, the switch 1802 selects the terminal b; if NO, the terminal a.

In step S1906, the neighborhood matching information encoding unit 1306 generates and encodes vector information for specifying a match/mismatch with four surrounding pixels, and if the pixel X of interest matches any surrounding pixel, specifying the position of the matched surrounding pixel. Moreover, the neighborhood matching information encoding unit 1306 generates neighboring pixel state information representing whether a pair of pixels having the same color exist in the four surrounding pixels, and outputs the information to the signal line 105.

It is determined whether the control signal 105 is "1" (step S1907). If it is determined that the control signal 105 is "1", the component value predictive encoding process in the predictive component value encoding unit 1307 is performed for the C, M, Y, and K components to generate a code (step S1908). Subsequently, the code generation unit 1305 generates a code for the pixel of interest in accordance with the control signal from the signal line 105. The code is output via the switch 1802 to the code string formation unit 104, which forms a code string of a predetermined format (step S1909).

Thereafter, the counter x which holds the horizontal position of the pixel of interest is incremented by one (step S1910), and compared with the horizontal pixel count W of the image. If x<W (YES in step S1911), the process returns to step S1904 to perform the encoding process for the next pixel. If x≧W, the process shifts to step S1912 (step S1911).

If the process advances from step S1905 to step S1914, the pixel value X of interest is compared with the immediately preceding pixel value Xa. If X≠Xa (NO in step S1914), the process shifts to step S1920; if X=Xa (YES), to step S1915.

After the process advances to step S1915, the counter RL held in the run-length encoding unit 1801 is incremented by one (step S1915), and then the counter x which holds the horizontal position of the pixel of interest is incremented by one (step S1916). The counter x is compared with the horizontal pixel count W of the image. If x<W, the process returns to step S1904 to perform the encoding process for the next pixel. If x≧W, the run reaches the right end of the image. At this time, the run length is finalized, and the run-length encoding unit 1801 encodes the run length held by the counter RL, and outputs a code. The code output from the run-length encoding unit 1801 is sent via the switch 1802 to the code string formation unit 104, which forms a code string of a predetermined format (step S1918). After the end of run-length encoding, the counter RL is reset to 0 (step S1919). At this time, the connection of the switch 1802 is changed to the terminal a. The process shifts to step S1912, and the target of the encoding process shifts to the next line.

If the process advances from step S1914 to step S1920, this means that the run is terminated by the appearance of a pixel value X different from the immediately preceding pixel value Xa. Hence, the run-length encoding unit 1801 encodes the run length held by the counter RL, and outputs a code. The code output from the run-length encoding unit 1801 is sent via the switch 1802 to the code string formation unit 104, which forms a code string of a predetermined format. After the end of run-length encoding, the counter RL is reset to 0 (step S1921). At this time, the connection of the switch 1802 is changed to the terminal a. The process shifts to step S1906 to continue the encoding process for the pixel X of interest that terminates the run.

Upon the completion of encoding image data of one line, the process advances to step S1912 to increment by one the counter y which holds the vertical position of the pixel of interest. In step S1913, the counter y is compared with the vertical pixel count H of the image. If y<H (YES in step S1913), the process returns to step S1903 to similarly process each pixel on the next line. If y≧H, this means that the entire target image data has been encoded, so the encoding process ends (step S1913).

As described above, even this modification (the fifth embodiment is implemented by software) can attain the same operation effects as those of the fifth embodiment.

Sixth Embodiment

An apparatus which decodes encoded data generated in the fifth embodiment (and its modification) will be described as the sixth embodiment.

Figure 20:
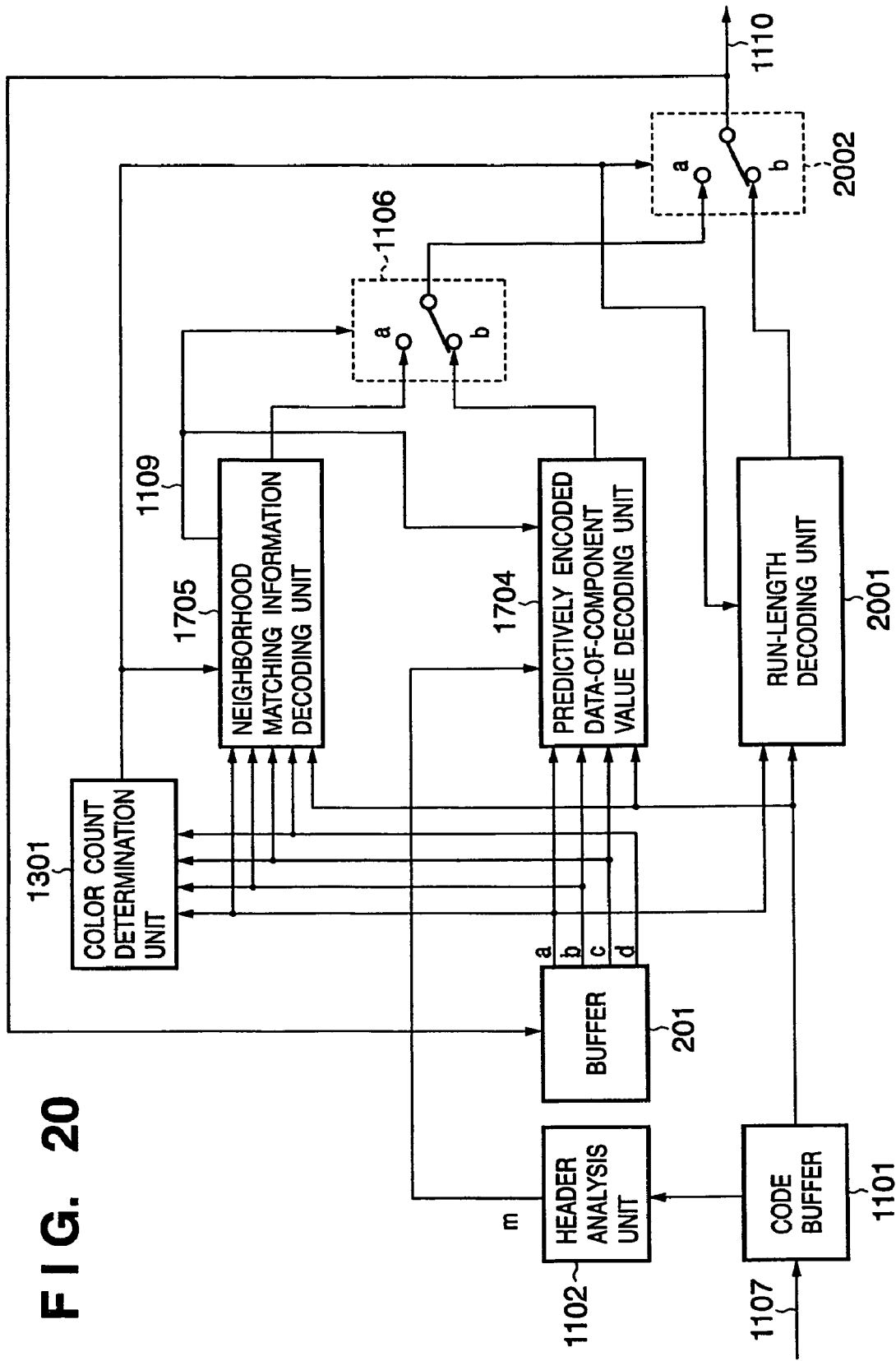
FIG. 20 is a block diagram showing the functional configuration of an image processing apparatus according to the sixth embodiment.

FIG. 20 is a block diagram showing an image processing apparatus which decodes encoded image data according to the sixth embodiment. As shown in FIG. 20, the image processing apparatus according to the sixth embodiment comprises a dolor count determination unit 1301, code buffer 1101, header analysis unit 1102, switch 1106, and buffer 201. The apparatus also comprises a predictively encoded data of component value decoding unit 1704, neighborhood matching information decoding unit 1705, run-length decoding unit 2001, and switch 2002. In FIG. 20, reference numerals 1107, 1108, and 1110 denote signal lines. The same reference numerals denote blocks which perform the same operations as those of processing blocks in the conventional image processing apparatus and the image processing apparatuses according to the first to fifth embodiments, and a description thereof will be omitted.

An image decoding process performed by the image processing apparatus according to the sixth embodiment will be explained with reference to FIG. 20. The image processing apparatus according to the sixth embodiment is configured by adding the run-length decoding unit 2001 and switch 2002 to the image processing apparatus according to the fourth embodiment shown in FIG. 17. The neighborhood matching information decoding unit 1705 corresponds to a broken-line part containing the matched-pixel position decoding unit 1701 and selector 1703 in FIG. 17. The predictively encoded data-of-component value decoding unit 1704 corresponds to a broken-line part containing the component value prediction unit 202, prediction error decoding unit 1702, and adder 1111 in FIG. 17.

Similar to the fourth embodiment, encoded data to be decoded is input to the image processing apparatus via the signal line 1107, and properly stored in the code buffer 1101. The header analysis unit 1102 analyzes the header field at the start of the encoded data to acquire additional information necessary for the decoding process.

The color count determination unit 1301 obtains and outputs a color count No by the process described in the third embodiment.

The neighborhood matching information decoding unit 1705 receives the color count Nc of four surrounding pixels that is output from the color count determination unit 1301. If the color count Nc is one of 1 to 3, the neighborhood matching information decoding unit 1705 decodes vector information, similar to the fourth embodiment. The vector information specifies a match/mismatch between the pixel X of interest and the four surrounding pixels (Xa, Xb, Xc, and Xd), and if the pixel X matches any pixel, specifies the neighboring pixel having the same color as that of the pixel of interest. If the decoded vector information is different from the color count Nc, one of Xa, Xb, Xc, and Xd is output in accordance with the vector information. The neighborhood matching information decoding unit 1705 outputs, to the signal line 1108, neighborhood pixel state information representing whether a pair of pixels having the same color exist in the four pixels around the pixel of interest, i.e., whether the vector information coincides with Nc.

Similar to the fourth embodiment, the predictively encoded data-of-component value decoding unit 1704 reads out encoded data from the code buffer 1101, and decodes the C, M, Y, and K components of the pixel.

When the color count Nc output from the color count determination unit 1301 is 1, the run-length decoding unit 2001 reads out encoded data from the code buffer 1101, decodes the run RL of the same pixel value as the immediately preceding pixel Xa, and successively outputs RL pixel values Xa as decoded pixel values. The decoding process of the run-length decoding unit 2001 is paired with the encoding process of the run-length encoding unit 1801 in the fifth embodiment.

When the color count Nc output from the color count determination unit 1301 is 1, the switch 2002 is connected to the terminal b. The switch 2002 is kept connected to the terminal b while RL pixel values Xa decoded by the run-length decoding unit 2001 are output. After the RL pixel values Xa are output, the switch 2002 is connected to the terminal a.

Modification to Sixth Embodiment

Figure 21:
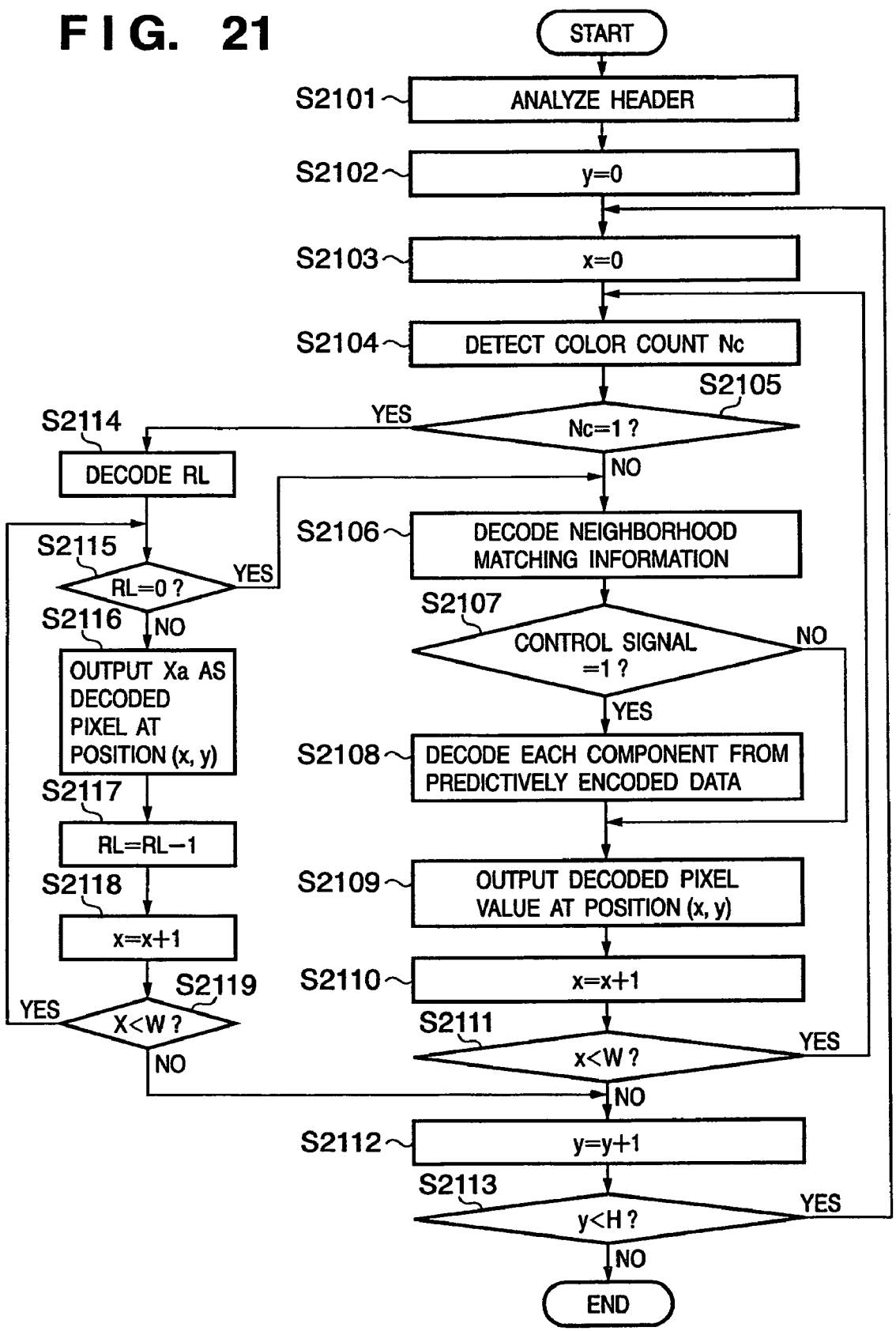
FIG. 21 is a flowchart showing the flow of a decoding process by the image processing apparatus according to the sixth embodiment.

FIG. 21 is a flowchart showing process procedures when the process in the sixth embodiment is implemented by software. An apparatus configuration when the process is implemented by software is the same as that in FIG. 14 which is referred to in the modification to the first embodiment, and a description thereof will be omitted. The process procedures of a decoding application which runs in the apparatus will be described.

Note that a program complying with FIG. 21 is loaded into a RAM 1402 and executed by a CPU 1401. When the process is implemented by software, processes corresponding to the processing units shown in FIG. 20 are implemented by functions, subroutines, and the like in software. In the modification, the names of the processing units in FIG. 20 are directly used for descriptive convenience.

When encoded data to be decoded is input from the signal line 1107 to the code buffer 1101, the header analysis unit 1102 analyzes the header of the encoded data to extract additional information necessary for decoding (step S2101). A counter y which holds the vertical position of the pixel of interest is set to 0 (step S2102), and a counter x which holds the horizontal position of the pixel of interest is set to 0 (step S2103). Attention is given to a pixel positioned at coordinates (x,y), and the color count determination unit 1301 obtains the color count Nc by referring to decoded surrounding pixels Xa to Xd (step S2104). If the color count Nc is 1 (YES in S2105), the process shifts to step S2114; if NO, to step S2106 (step S2105). If YES in step S2105, the switch 2002 is connected to the terminal b; if NO, to the terminal a.

In step S2106, the neighborhood matching information decoding unit 1705 decodes vector information. The vector information specifies a match/mismatch with the four surrounding pixels, and if the pixel of interest matches any surrounding pixel, specifies the matched neighboring pixel. If the decoded vector information is different from the color count Nc, one of Xa to Xd is selected and output in accordance with the vector information. The neighborhood matching information decoding unit 1705 outputs, to the signal line 1108, neighborhood pixel state information representing whether the vector information coincides with the color count Nc. In step S2107, it is determined whether the signal line 1108 holds "1". If the signal line 1108 holds "1" (YES in step S2107), the predictively encoded data-of-component value decoding unit 1704 decodes the component values of the C, M, Y, and K components of the pixel from predictively encoded data (step S2108). At this time, if the signal line 1108 holds "0", the switch 1106 is connected to the terminal a; if "1", to the terminal b. With this operation, the pixel value output from the neighborhood matching information decoding unit 1705 or predictively encoded data-of-component value decoding unit 1704 is output as a decoded pixel value at the position (x,y) from the signal line 1110 via the switches 1106 and 2002 (step S2109).

The counter x which holds the horizontal position of the pixel of interest is incremented by one (step S2110), and compared with the horizontal pixel count W of the image. If x<W (YES in step S2111), the process returns to step S2104 to perform the decoding process for the next pixel. If x≧W, the process shifts to step S2112.

After the process shifts to step S2114, the run length RL is decoded in the run-length decoding unit 2001. The decoded run length RL is compared with 0 (step S2115). If RL=0 (YES in step S2115), the process shifts to step S2106. In this case, the connection of the switch 2002 is changed from the terminal b to the terminal a. If RL≠0 (NO), Xa is output as a decoded pixel value at the position (x,y) from the signal line 1110 via the switch 2002 (step S2116). The counter RL is decremented by one (step S2117), and the counter x which holds the horizontal position of the pixel of interest is incremented by one (step S2118). In step S2119, the counter x is compared with the horizontal pixel count W of the image. If x<W as a result of the comparison (YES in step S2119), the process returns to step S2115; if x≧W, the process shifts to step S2112.

After the decoding process for one line ends, the counter y which holds the vertical position of the pixel of interest is incremented by one in step S2112, and compared with the vertical pixel count H of the image in step S2113. If y<H (YES in step S2113), the process returns to step S2103 to similarly process each pixel on the next line. If y≧H, the decoding process for the entire image has ended, and the decoding process ends.

The above operation can also provide the same operation effects as those of the sixth embodiment.

The present invention is not limited the above-described embodiments. Applications of the embodiments will be described below.

In the third to sixth embodiments, vector information for specifying a match/mismatch with Nc pixel values, and if the pixel of interest matches any neighboring pixel, specifying the position of the neighboring pixel is encoded in accordance with the color count Nc of surrounding pixels. As the vector information, a symbol of Nc+1 is encoded. For example, when the color count Nc is 3, the vector information is encoded into 0 if the pixel of interest matches the first pixel value X1; 1 if the pixel of interest matches the second pixel value X2; 2 if the pixel of interest matches the third pixel value X3; and 3 if the pixel of interest does not match any of X1 to X3. The symbols of four values are encoded using a code table in FIG. 15C. However, not all Nc pixel values need be subjected to match/mismatch determination. For example, when Nc=3, a match/mismatch between the pixel X of interest and the first and second pixel values X1 and X2 is determined, and the symbol is 0 for X=X1, 1 for X=X2, and 3 for X≠X1 and X≠X2. In this manner, the symbol which takes three values of 0, 1, and 3 ("2" is excluded on purpose in consideration of a comparison between vector information and Nc) may be encoded.

The method of obtaining the first, second, and third pixel values X1, X2, and X3 is not limited to the above-described embodiments. For example, the first, second, and third pixel values may be acquired in the order of Xb, Xa, Xc, and Xd, which is different from the above-described one. The order may be changed in accordance with matching between Xa, Xb, Xc, and Xd. For example, the first, second, and third pixel values are acquired in the order of Xa, Xb, Xc, and Xd. When Xa Xb, Xd may be set as the second pixel value X2.

Encoding of vector information may use a code word which is set in advance on the assumption of the probability distribution. However, a code word different from those in the above examples may be used, or an encoding technique of a different algorithm such as an arithmetic code may be applied.

As the method of predicting the component value of interest, several prediction methods may be prepared and adaptively switched. Alternatively, nonlinear prediction may be used to feed back the average value of prediction errors generated in encoded component values to prediction of the component of interest.

The above embodiments employ Huffman encoding and Golomb encoding as entropy encoding of the prediction error of a component value. Another entropy encoding may also be adopted.

As described above, according to the first to sixth embodiments of the present invention, the encoding efficiency of image data (e.g., a natural image) can substantially maintain the conventional one. Further, an image (e.g., a CG image or text document) having a small number of appearance colors can be losslessly encoded at higher compression ratio.

According to another invention, encoded data can be losslessly decoded to completely reconstruct an original image.

Seventh Embodiment

Figure 24:
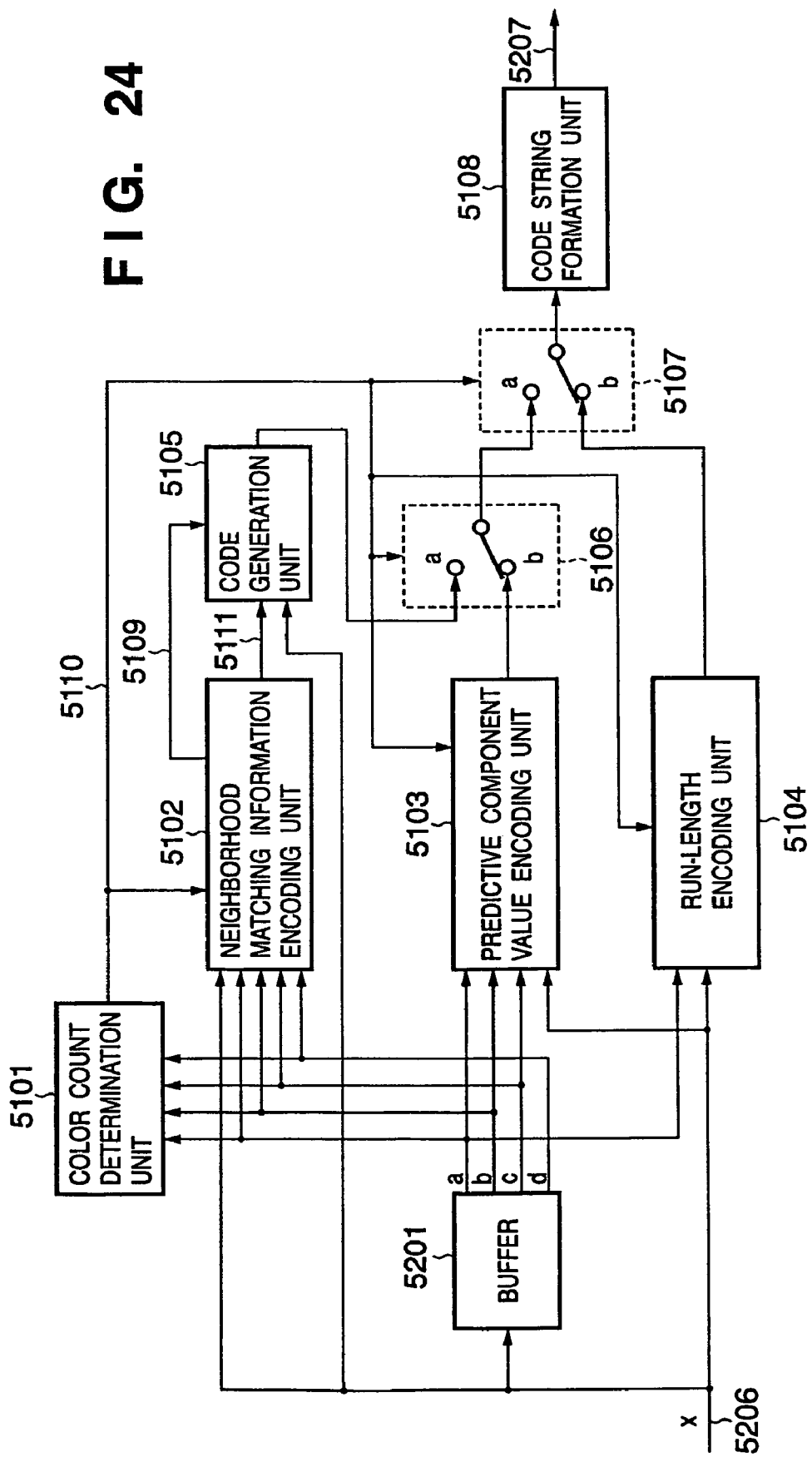
FIG. 24 is a block diagram showing an image processing apparatus according to the seventh embodiment.

FIG. 24 is a block diagram showing an image processing apparatus according to the seventh embodiment.

As shown in FIG. 24, the image processing apparatus according to the seventh embodiment comprises a color count determination unit 5101, neighborhood matching information encoding unit 5102, predictive component value encoding unit 5103, run-length encoding unit 5104, and code generation unit 5105. The apparatus also comprises switches 5106 and 5107, a code string formation unit 5108, and a buffer 5201. In FIG. 24, reference numerals 5109, 5110, 5111, 5206, and 5207 denote signal lines.

An image encoding process performed by the image processing apparatus according to the seventh embodiment will be explained with reference to FIG. 24.

Image data to be encoded by the image processing apparatus according to the seventh embodiment is image data of R, G, and B colors, similar to the first embodiment described above. Each component (color component) is formed from pixel data which expresses a luminance value of 0 to 255 by 8 bits. Image data to be encoded has W horizontal pixels and H vertical pixels. Input image data has a data amount of W×H×3 bytes. The horizontal right direction is defined as the positive direction of the X-coordinate, and the vertical down direction is defined as the positive direction of the Y-coordinate. The input order of input image data is the raster order, and each pixel is formed by laying out data in the order of R, G, and B.

Image data to be encoded are sequentially input from the signal line 5206. The source of input image data may be an image scanner or a predetermined storage device which stores image data, and the type of input source is arbitrary.

Image data to be encoded are sequentially stored in the buffer 5201 via the signal line 5206. The input order of pixel data is the raster scan order, and component data of each pixel are input in the order of R, G, and B. The R, G, and B components are defined as component numbers of 0, 1, and 2, respectively. The upper left corner of an image is defined as coordinates (0,0), and the value of the component number C of a pixel at the horizontal pixel position x and vertical pixel position y is represented by P(x,y,C). For example, when a pixel at the position (x,y)=(3,4) has a value (R,G,B)=(255, 128,0) P(3,4,0)=255, P(3,4,1)=128, P(3,4,2)=0.

The color count determination unit 5101 reads out, from the buffer 5201, the same-component values of four pixels a, b, c, and d (pixel data at these pixel positions have already been encoded) in FIG. 3 near the pixel X of interest to be encoded, obtaining pixels Xa, Xb, Xc, and Xd. Letting (x,y) be the position of the pixel X of interest, the position (x,y) is used to represent Xa, Xb, Xc, and Xd:

$$Xa=(P(x-1,y,0),P(x-1,y,1),P(x-1,y,2))$$

$$Xb=(P(x,y-1,0), P(x,y-1,1),P(x,y-1,2))$$

$$Xc=(P(x-1,y-1,0),P(x-1,y-1,1),P(x-1,-y-1,2))$$

$$Xd=(P(x+1,y-1,0),P(x+1,y-1,1),P(x+1,y-1,2))$$

The color count determination unit 5101 detects the number of color types present in Xa, Xb, Xc, and Xd, and outputs a color count No to the signal line 5110. More specifically, the color count determination unit 5101 counts the number of pairs each of pixels having the same color in six combinations "Xa and Xb", "Xa and Xc", "Xa and Xd", "Xb and Xc", "Xb and Xd", "Xc and Xd" each prepared by extracting two paired pixels from four pixels. The color count determination unit 5101 determines that there are four colors if the count is 0, three colors if 1, two colors if 2 or 3, and one color if 6. The color count determination unit 5101 outputs the color count Nc to the signal line 5110.

The neighborhood matching information encoding unit 5102 receives the color count Nc from the color count determination unit 5101 via the signal line 5110. When the color count No is one of 1 to 3 (at least a pair of pixels having the same color exist in four pixels around the pixel of interest), the neighborhood matching information encoding unit 5102 internally generates vector information for specifying whether a pixel having the same color as the pixel X of interest exists in the four surrounding pixels (Xa, Xb. Xc, and Xd), and specifying the position of the matched neighboring pixel. Then, the neighborhood matching information encoding unit 5102 outputs a code word as a result of encoding the vector information to the signal line 5111. At the same time, the neighborhood matching information encoding unit 5102 generates surrounding pixel state information on the basis of the pixel X of interest and the four surrounding pixels, and outputs it to the signal line 5109.

Figure 29:
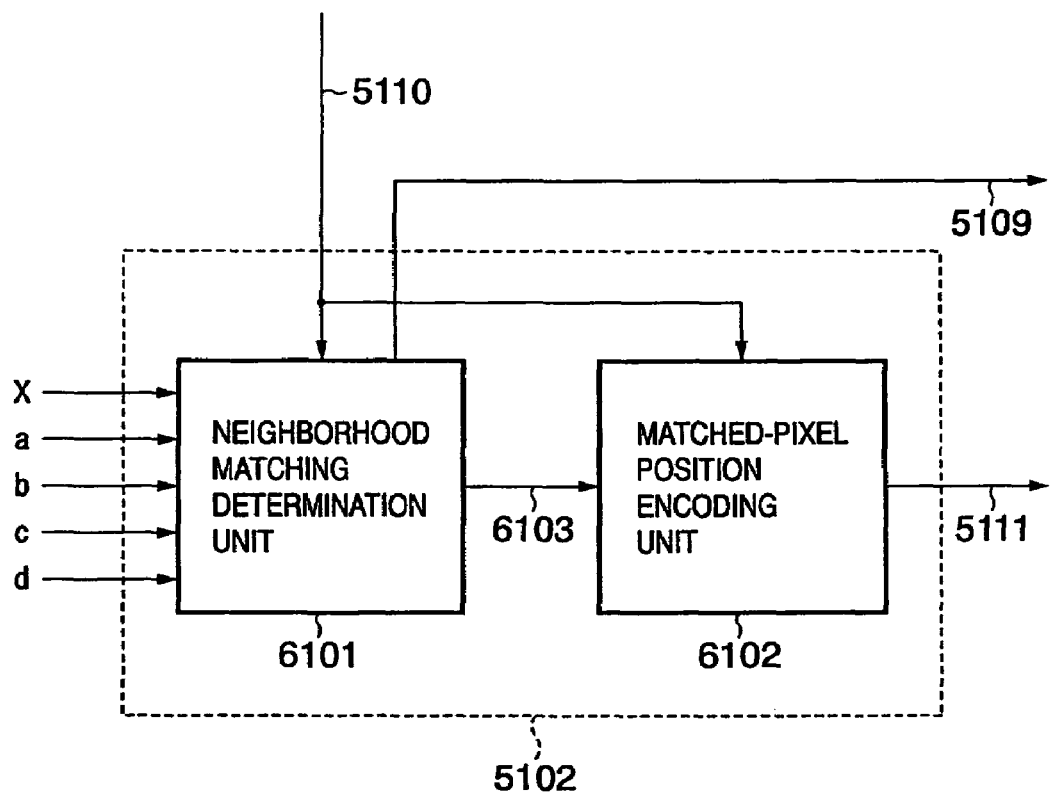
FIG. 29 is a block diagram showing a neighborhood matching information encoding unit 5102.

FIG. 29 is a block diagram showing details of the neighborhood matching information encoding unit 5102. As shown in FIG. 29, the neighborhood matching information encoding unit 5102 is comprised of a neighborhood matching determination unit 6101 and matched-pixel position encoding unit 6102. Reference numeral 6103 denotes a signal line which transmits the vector information. A process performed in the neighborhood matching information encoding unit 5102 will be explained with reference to FIG. 29.

The neighborhood matching determination unit 6101 generates vector information representing whether the same pixel value as that of the pixel X of interest exists in the four surrounding pixels (Xa, Xb, Xc, and Xd), and if the same pixel value exists, which of the four surrounding pixels has the same color as that of the pixel of interest. The neighborhood matching determination unit 6101 outputs the generated vector information to the signal line 6103.

The vector information is determined depending on the color count Nc input via the signal line 5110. Processes by the neighborhood matching determination unit 6101 will be described for respective color counts Nc.

When the color count NC is 4, i.e., Xa, Xb, Xc, and Xd all have different pixel values, the neighborhood matching determination unit 6101 outputs "4" as the vector information to the signal line 6103 regardless of pixel data of Xa, Xb, Xc, and Xd.

When the color count Nc is 1, i.e., Xa to Xd have the same color, X is compared with Xa. If X=Xa, the neighborhood matching determination unit 6101 outputs "0" as the vector information to the signal line 6103; if X≠Xa, "1".

When the color count Nc is 2, i.e., two colors exist in Xa to Xd, the first pixel value (color) X1 and second pixel value X2 are obtained in the order of Xa, Xb, Xc, and Xd. If X=X1, the neighborhood matching determination unit 6101 outputs "0" as the vector information to the signal line. 6103; if X=X2, "1"; and if X≠X1 and X≠X2, "2". In the order of Xa, Xb, Xc, and Xd, the first pixel X1 is necessarily Xa. The second pixel X2 is a pixel which is first detected to have a value different from Xa when Xb, Xc, and Xd are checked in the order named.

When the color count Nc is 3, i.e., three colors exist in Xa to Xd, the first pixel value X1, second pixel value X2, and third pixel value X3 are obtained in the order of Xa, Xb, Xc, and Xd. If X=X1, the neighborhood matching determination unit 6101 outputs "0" as the vector information to the signal line 6103; if X=X2, "1"; if X=X3, "2"; and if X≠X1, X≠X2, and X≠X3, "3".

Surrounding pixel state information to be output from the neighborhood matching determination unit 6101 to the signal line 5109 (FIGS. 24 and 29) is generated under the following condition.

The neighborhood matching determination unit 6101 compares the vector information output to the signal line 6103 with the color count Nc input via the signal line 5110. If the vector information coincides with the color count Nc, the neighborhood matching determination unit 6101 outputs "1" as the surrounding pixel state information; otherwise, "0". If the color count Nc is 4, the signal line 5109 always holds "1".

FIG. 37 shows the relationship between the color count Nc, the vector information, and the surrounding pixel state information.

As shown in FIG. 37, the surrounding pixel state information represents whether at least a pair of pixels having the same color exist in the four pixels Xa, Xb, Xc, and Xd around the pixel X of interest (this means that the number of colors is three or less), and whether a pixel having the same color as that of the pixel X of interest exists In the four surrounding pixels.

The matched-pixel position encoding unit 6102 encodes the vector information input from the signal line 6103, and outputs a code word to the signal line 5111. In the seventh embodiment, the matched-pixel position encoding unit 6102 switches between the code tables in FIGS. 15A, 15B, and 15C and uses the selected one in accordance with the color count Nc input via the signal line 5110. When the color count Nc is "4", the matched-pixel position encoding unit 6102 does not output any code. Even if the matched-pixel position encoding unit 6102 outputs a code, the code is ignored. For descriptive convenience, the method of switching between the three code tables on the basis of the color count Nc has been described. However, various methods can be applied as far as the encoding method is executed in accordance with a probability distribution assumed for each color count.

It should be noted in FIGS. 15A, 15B, and 15C that the number of assigned bits decreases as the number of colors in four pixels around the pixel X of interest decreases. This is because, as the number of colors in four surrounding pixels becomes smaller, the probability at which the color of the pixel X of interest matches a surrounding color becomes higher. By using this fact, the number of bits of a generated code word is efficiently utilized.

By the above-described operation, a code word as a result of encoding vector information is output to the signal line 5111.

Referring back to the description of FIG. 24, in accordance with the surrounding pixel state information (0 or 1) input via the signal line 5109, the code generation unit 5105 generates a code for the pixel of interest from the code word output from the signal line 5111, and the component value of interest in the pixel of interest that is input via the signal line 5206. Then, the code generation unit 5105 outputs the generated code.

More specifically, when the surrounding pixel state information input via the signal line 5109 is "0", the code generation unit 5105 directly outputs the code word of the vector information that is input from the signal line 5111. When the surrounding pixel state information is "1", the code generation unit 5105 outputs the code word of the vector information that is input from the signal line 5111, and subsequently outputs each component of the pixel of interest without any change (without compression).

FIG. 26A shows the data structure of code data output from the code generation unit 5105 when the surrounding pixel state information is "0". FIG. 26B shows the data structure of code data output from the code generation unit 5105 when the surrounding pixel state information is "1". When the color count No is 4, no code word is output for neighborhood matching information. Thus, the code word length at this field is 0, and the component data starts from uncompressed data of the R component.

When the color count Nc output from the color count determination unit 5101 is 4, the predictive component value encoding unit 5103 predictively encodes each component value of the pixel X of interest. Predictive encoding of the component value can utilize a JPEG lossless coding mode, or a scheme described as a regular mode in JPEG-LS (ITU-T T.87|ISO/IEC 14495-1) serving as an international standard for lossless coding and near lossless coding. For descriptive convenience, a simple configuration will be explained.

Figure 25:
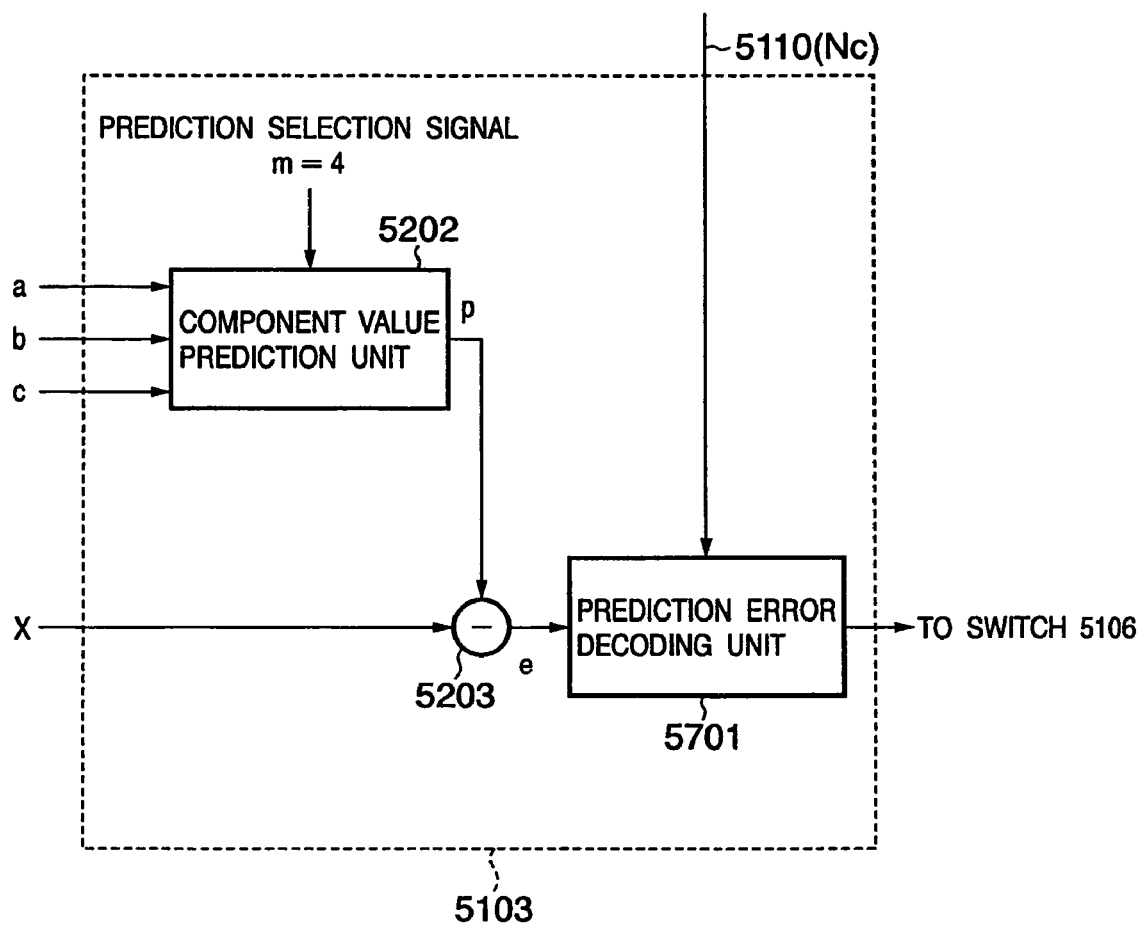
FIG. 25 is a block diagram showing the internal configuration of a predictive component value encoding unit 5103 in FIG. 24.

FIG. 25 is a block diagram showing details of the predictive component value encoding unit 5103. As shown in FIG. 25, the predictive component value encoding unit 5103 is made up of a component value prediction unit 5202, subtracter 5203, and prediction error encoding unit 5701. Reference numeral 5110 denotes a signal line. The component value prediction unit 5202 and subtracter 5203 are identical to the component value prediction unit 202 and subtracter 203 in FIG. 2 which is referred to in BACKGROUND OF THE INVENTION, and a description thereof will be omitted. A process performed in the predictive component value encoding unit 5103 will be explained with reference to FIG. 25.

By the same operation as the conventional scheme described above, the component value prediction unit 5202 generates a predicted value p from values a, b, and c of pixels for each component around the pixel of interest. The subtracter 5203 generates a difference (prediction error) e (=x−p) between the component value x of the pixel of interest and the predicted value p, and inputs the prediction error e to the prediction error encoding unit 5701. In the seventh embodiment, a prediction selection signal m input to the component value prediction unit 5202 is set to a fixed value "4", and all component values are predicted by an equation: p=a+b−c.

The prediction error encoding unit 5701 encodes the prediction error e by using Golomb encoding. Golomb encoding has been described in the third embodiment, and a description thereof will be omitted.

The prediction error encoding unit 5701 operates only when the color count Nc input via the signal line 5110 is 4. Even if the color count Nc is 4, the prediction error encoding unit 5701 does not operate while the switch 5107 is connected to the terminal b and run-length encoding (to be described later) is applied.

The run-length encoding unit 5104 according to the seventh embodiment will be explained. The run-length encoding unit 5104 holds a counter RL which counts the run of the same pixel value. When the color count Nc output from the color count determination unit 5101 is 1, the counter RL starts counting. Once the counting starts, the number of pixels is kept counted regardless of the color count Nc until the pixel X of interest becomes different from the immediately preceding pixel value Xa or the process of the final pixel on one line ends. When the run terminates (no run may be counted), the run length held by the counter RL is encoded and output. For descriptive convenience, counting of the run of pixels starts on the basis of the color count Nc output from the color-count determination unit 5101. The counting may start as far as generation of the run (run of pixel values) can be predicted on the encoding and decoding sides. For example, letting Xe be a pixel immediately before Xa and Xa=Xe, counting of the run starts. In the above description, Xa is used as an assumed pixel value. However, a case wherein the run is counted on the basis of identity with Xb or the like also falls within the scope of the present invention.

Assume that pixels on a given line are . . . , $X_{i-1}$, $X_i$, $X_{i+1}$, . . . , and the pixel $X_i$ is set as the pixel of interest. Color counts Nc at the respective pixel positions are represented by . . . , $Nc_{i-1}$, $Nc_i$, $Nc_{i+1}$, . . . .

A case wherein $Nc_{i-1}$ takes a value other than 1, $X_{i-1}$ is encoded by a method other than run-length encoding, and $Nc_i$ becomes 1. If $X_{i+1} \neq X_i$, $X \neq Xa$ and the run-length encoding unit 5104 outputs a code word for no run. At this time, encoded data from the code generation unit 5105 is output as encoded data of the pixel X of interest immediately after the run-length code word is output. If $X_{i-1} = X_i$, the run-length encoding unit 5104 increments RL by one, and counts the run of pixels which match an immediately preceding pixel.

Although various methods can be applied to run-length encoding, the seventh embodiment employs the same method as run-length encoding based on run model in the international standard JPEG-LS, and details thereof will be omitted.

The switch 5106 switches its connection in accordance with the color count Nc output from the color count determination unit 5101. When Nc is 4, the switch 5106 is connected to the terminal b; otherwise (Nc=1, 2, 3), to the terminal a.

The switch 5107 switches its connection in accordance with the color count Nc output from the color count determination unit 5101. When Nc is 1, the switch 5107 is connected to the terminal b. The switch 5107 is fixed to the terminal b while the run-length encoding unit 5104 counts the run length. After the run terminates and the run-length encoding unit 5104 outputs a code, the switch 5107 is switched to the terminal a.

The code string formation unit 5108 forms a code string of a predetermined format from encoded data output from the code generation unit 5105, predictive component value encoding unit 5103, and run-length encoding unit 5104, and additional information (e.g., the prediction selection signal m, the numbers of horizontal and vertical pixels of an image, the number of components which form a pixel, and the precision of each component). The code string formation unit 5108 outputs the code string to the signal line 5207. When the output destination is a storage device such as a hard disk, the code string is stored as a file.

Figure 27:
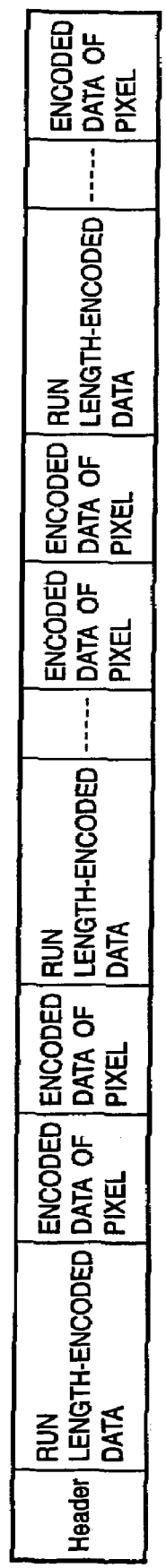
FIG. 27 is a view showing the structure of an output code string according to the seventh embodiment.

FIG. 27 shows an example of the structure of the code string output from the code string formation unit 5108. In FIG. 27, the order of run length-encoded data and pixel-encoded data is arbitrary. It should be noted that no special marker bit for discriminating respective encoded data is required. In the image processing apparatus according to the seventh embodiment, the prediction selection signal m is set to a fixed value, and can also be excluded from the header.

As described above, the image processing apparatus according to the seventh embodiment executes encoding by dynamically switching between predictive encoding, run-length encoding, and neighborhood matching information encoding in accordance with the number of colors in the encoded pixels Xa, Xb, Xc, and Xd around the pixel X of interest to be encoded. If the number of colors in surrounding pixel values is small, no same pixel value as that of the pixel of interest exists in surrounding pixels, and predictive encoding is applied, a large difference value is generated to locally generate many codes. In this case, the image processing apparatus according to the seventh embodiment avoids an increase in code amount by transmitting each component of the pixel of interest without compression. This process can increase the lossless compression ratio of image data (e.g., a text, line art, or CG image) in which a pixel having the same color as that of the pixel of interest is highly likely to exist around the pixel of interest. Efficient encoding can also be implemented without generating any redundant addition to even image data (e.g., a natural image) in which a pixel having the same color as that of the pixel of interest is less likely to exist around the pixel of interest.

Modification to Seventh Embodiment

The seventh embodiment may be implemented by software. The modification will describe an example of implementing the seventh embodiment by software. The configuration of an apparatus (PC or the like) when the apparatus is implemented by software is the same as that in FIG. 14, and a detailed description thereof will be omitted. Processes corresponding to the processing units shown in FIG. 24 are implemented by functions, subroutines, and the like in software. In the modification, the names of the processing units in FIG. 24 are directly used for descriptive convenience.

Figure 34:
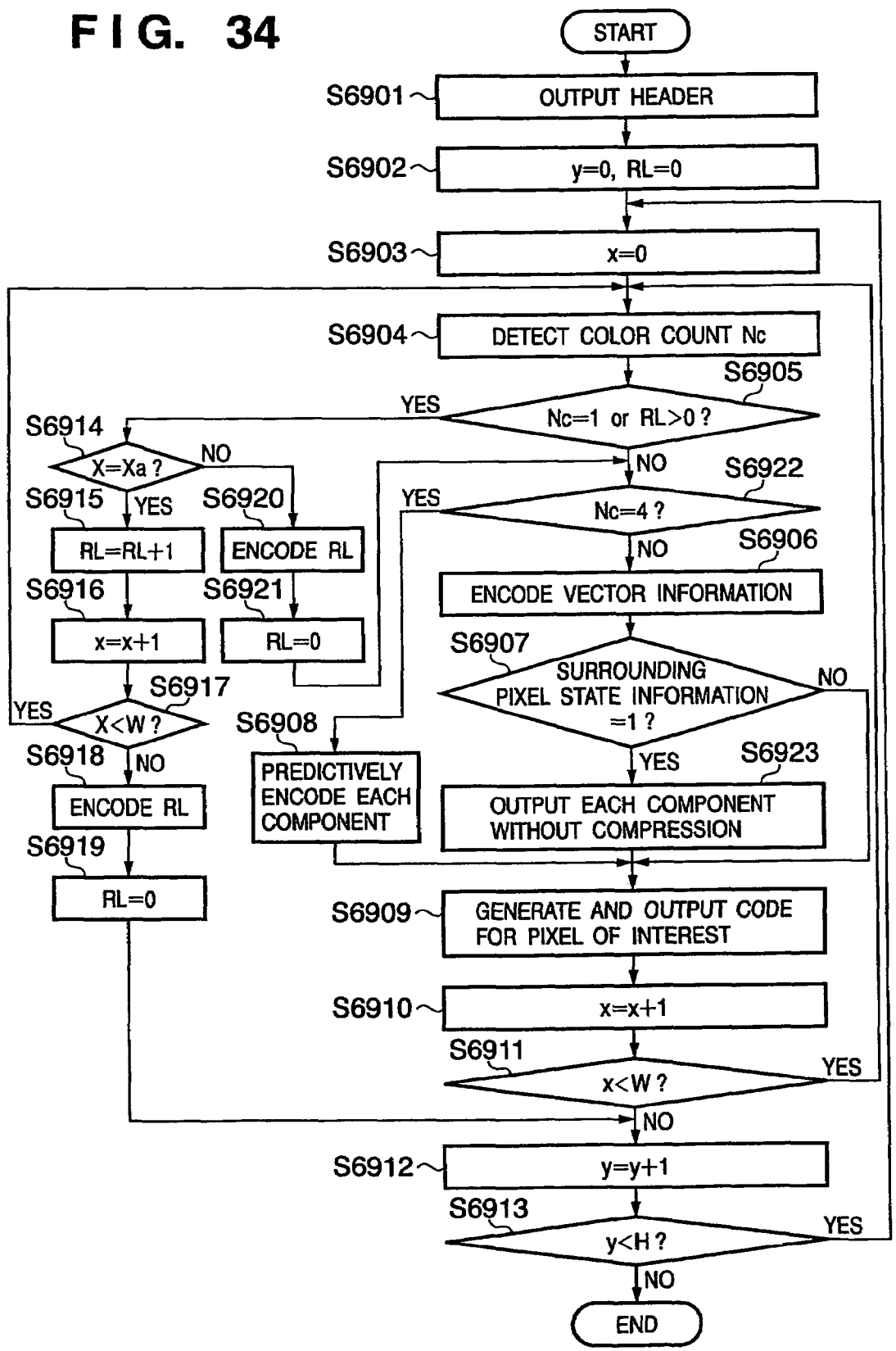
FIG. 34 is a flowchart showing process procedures according to a modification to the seventh embodiment.

Note that a program complying with FIG. 24 is loaded into a RAM 1402 and executed by a CPU 1401 to achieve a process complying with the flowchart shown in FIG. 34. The overall flow of the application program according to the modification will be explained with reference to FIG. 34.

The code string formation unit 5108 generates and outputs a header containing additional information of an image to be encoded (step S6901). A counter y which holds the vertical position of the pixel of interest is set to 0, and the counter RL held in the run-length encoding unit 5104 is initialized to 0 (step S6902). Further, a counter x which holds the horizontal position of the pixel of interest is set to 0 (step S6903). The color count determination unit 5101 obtains the color count Nc of pixels a, b, c, and d around the pixel X of interest at coordinates (x,y) (step S6904). When the pixel of interest is positioned on the first line of the image to be encoded, none of b, c, and d (see FIG. 3) exists, and the R, G, and B component values of these surrounding pixels are set to 0. When x=0, neither the surrounding pixel a nor c exists, and their R, G, and B component values are set to 0. However, the R, G, and B component values are not limited to these values as far as the values become equal to those in the decoding process.

In step S6905, it is determined whether the color count Nc is 1 or the counter RL holds a value other than 0. If the color count Nc=1 or the counter RL holds a value other than 0 (YES in step S6905), the process shifts to step S6914. If the above conditions are not met (NO in step S6905), the process shifts to step S6922 step S6905). If YES in step S6905, the switch 5107 is connected to the terminal b; if NO, to the terminal a.

After the process shifts to step S6922, it is determined whether the color count Nc is 4. If Nc=4 (YES in step S6922), the switch 5106 is connected to the terminal b. The predictive component value encoding unit 5103 predictively encodes each component of the pixel of interest to generate a code string. The generated code string is output to the code string formation unit 5108 via the switches 5106 and 5107 (step S6908).

If Nc≠4 (NO in step S6922), the switch 5106 is connected to the terminal a, and the neighborhood matching information encoding unit 5102 generates and encodes vector information. The neighborhood matching information encoding unit 5102 outputs, to the signal line 5109, surrounding pixel state information representing whether a pixel having the same color as that of the pixel of interest exists in four surrounding pixels (step S6906). It is determined whether the surrounding pixel state information is "1" (step S6907). If the surrounding pixel state information is "1" (YES in step S6907), the code generation unit 5105 concatenates each component of the pixel of interest to the code word of the vector information input via the signal line 5111 without compression, and then outputs the resultant code string. The code string output from the code generation unit 5105 and predictive component value encoding unit 5103 is converted into a predetermined format by the code string formation unit 5108, forming a code string for the pixel of interest (step S6909). Then, the counter x which holds the horizontal position of the pixel of interest is incremented by one (step S6910). The counter x is compared with the horizontal pixel count W of the image. If x<W (YES in step S6911), the process returns to step S6904 to perform the encoding process for the next pixel. If x≧W (NO in step S6911), the process shifts to step S6912 (step S6911).

If it is determined in step S6905 that the color count Nc=1 or the counter RL holds a value other than 0, the process shifts to step S6914 to compare the pixel X of interest (pixel value m represented by the counters x and y) with the immediately preceding pixel value Xa. If X≠Xa (NO in step S6914), the process advances to step S6920. If X=Xa (YES in step S6914), the counter RL held in the run-length encoding unit 5104 is incremented by one (step S6915). Subsequently, the counter x which holds the horizontal position of the pixel of interest is incremented by one (step S6916). The counter x is compared with the horizontal pixel count W of the image. If x<W, the process returns to step S6904 to perform the encoding process for the next pixel. If x≧W, the run reaches the right end of the image. At this time, the run length is finalized, and the run-length encoding unit 5104 encodes the run length held by the counter RL, and outputs a code. The code output from the run-length encoding unit 5014 is sent via the switch 5107 to the code string formation unit 5108, which forms a code string of a predetermined format (step S6918). After the end of run-length encoding, the counter RL is reset to 0 (step S6919). The connection of the switch 5107 is changed to the terminal a. The process shifts to step S6912, and the target of the encoding process shifts to the next line.

If the process advances to step S6920, this means that the run is terminated by the appearance of a pixel value X different from the immediately preceding pixel value Xa. Therefore, the run-length encoding unit 5104 encodes the run length held by the counter RL, and outputs a code. The code output from the run-length encoding unit 5104 is sent via the switch 5107 to the code string formation unit 5108, which forms a code string of a predetermined format. After the end of run-length encoding, the counter RL is reset to 0 (step S6921). The connection of the switch 5107 is changed to the terminal a. The process shifts to step S6922 to continue the encoding process for the pixel X of interest that terminates the run.

In step S6912, the counter y which holds the vertical position of the pixel of interest is incremented by one. In step S6913, the counter y is compared with the vertical pixel count H of the image. If y<H, the process returns to step S6903 to similarly process a pixel on the next line. If y≧H, the encoding process for the target image ends.

As described above, even the modification can achieve the same operation effects as those of the seventh embodiment.

Eighth Embodiment

An example of decoding encoded data which is generated in the seventh embodiment (or its modification) will be described as the eighth embodiment. The decoding process is basically executed by procedures opposite to those of the encoding process in the image processing apparatus according to the seventh embodiment.

Figure 28:
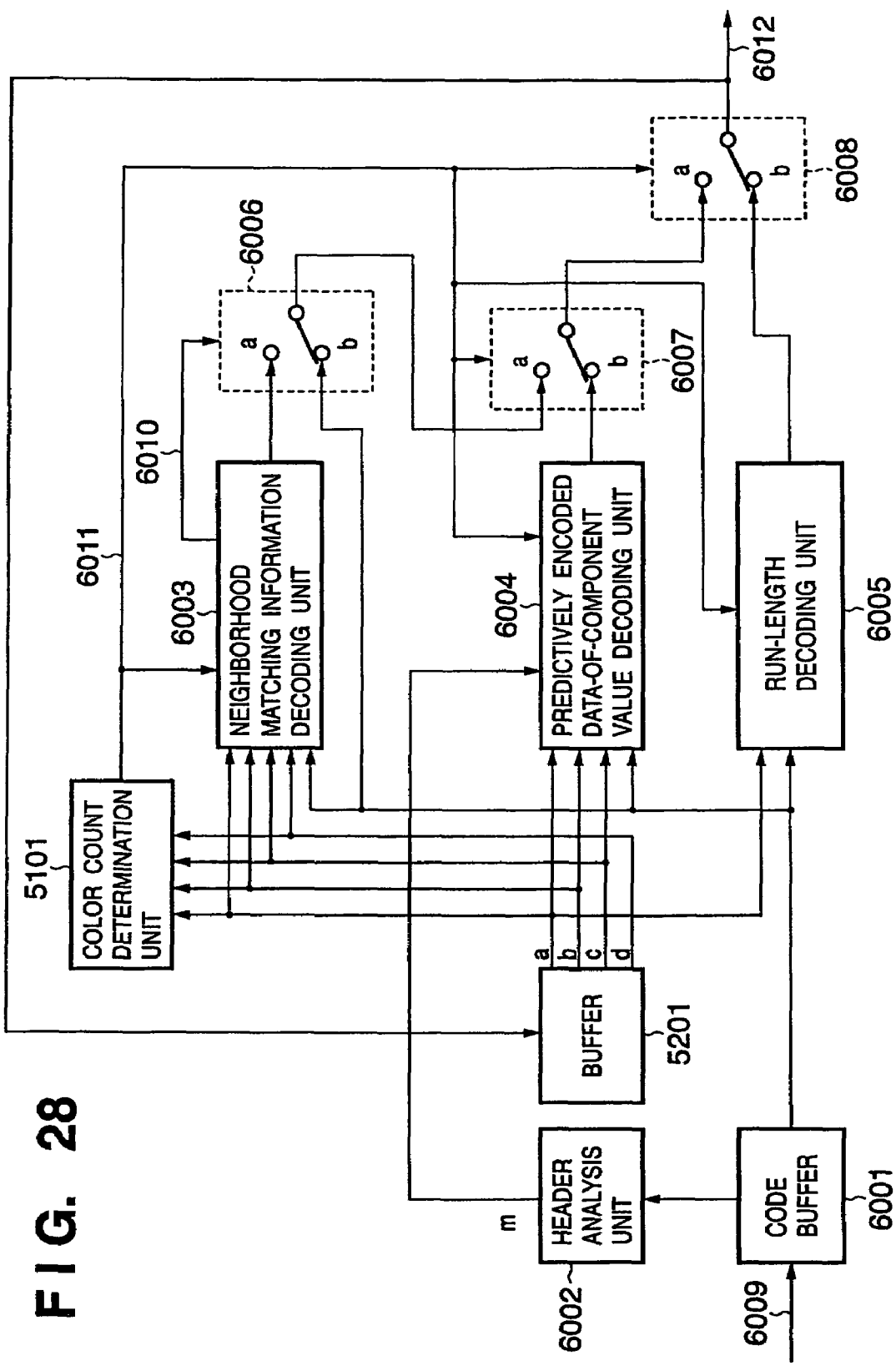
FIG. 28 is a block diagram showing an image processing apparatus according to the eighth embodiment.

FIG. 28 is a block diagram showing an image processing apparatus which decodes encoded image data according to the eighth embodiment.

As shown in FIG. 28, the image processing apparatus according to the eighth embodiment comprises a code buffer 6001, header analysis unit 600.2, neighborhood matching information decoding unit 6003, predictively encoded data-of-component value decoding unit 6004, and run-length decoding unit 6005. The apparatus also comprises switches 6006, 6007, and 6008, a buffer 5201, and a color count determination unit 5101. In FIG. 28, reference numerals 6009, 6010, 6011, and 6012 denote signal lines. The same reference numerals denote blocks which perform the same operations as those of processing blocks in the image processing apparatus according to the seventh embodiment, and a description thereof will be omitted.

A decoding process performed by the image processing apparatus according to the eighth embodiment will be explained with reference to FIG. 28.

Decoded pixel data is finally output from the switch 6008. The decoded pixel data is also stored in the buffer 5201 (having a capacity enough to store decoded pixel data of two lines). The buffer 5201 is cleared to 0 prior to the start of the decoding process in order to ensure neighboring pixels when the pixel of interest is positioned on the boundary of an image.

Encoded data to be decoded is input to the image processing apparatus via the signal line 6009, and properly stored in the code buffer 6001. The header analysis unit 6002 acquires additional information.

The color count determination unit 5101 obtains the color count Nc of four decoded pixels (Xa, Xb, Xc, and Xd) around the pixel X of interest by the process described in the seventh embodiment.

When the color count Nc output from the color count determination unit 5101 is one of 1 to 3, the neighborhood matching information decoding unit 6003 determines that the encoded data of interest is encoded data in FIG. 26A or 26B, and decodes vector information. When the decoded vector information does not coincide with the color count Nc, the neighborhood matching information decoding unit 6003 outputs one of the decoded surrounding pixels Xa to Xd as the decoding result of the pixel of interest. In addition, the neighborhood matching information decoding unit 6003 outputs, to the signal line 6010, surrounding pixel state information representing whether the decoded vector information coincides with the color count Nc.

Figure 30:
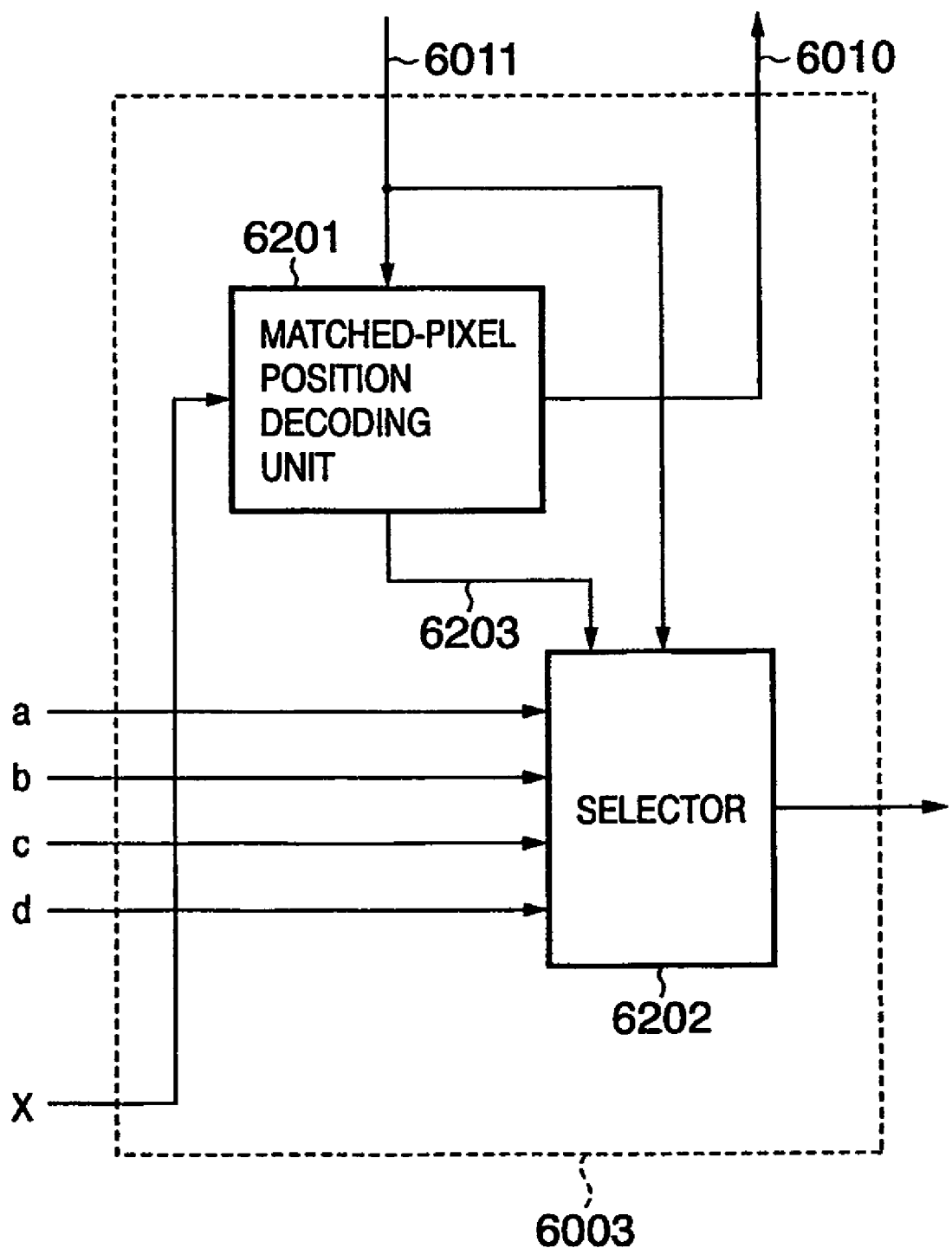
FIG. 30 is a block diagram showing a neighborhood matching information decoding unit 6003.

FIG. 30 is a block diagram showing details of the neighborhood matching information decoding unit 6003. As shown in FIG. 30, the neighborhood matching information decoding unit 6003 comprises a matched-pixel position decoding unit 6201 and selector 6202. Reference numerals 6010, 6011, and 6203 denote signal lines. A process performed in the neighborhood matching information decoding unit 6003 will be explained with reference to FIG. 30.

The matched-pixel position decoding unit 6201 receives the color count No via the signal line 6011. When the color count NC is one of 1 to 3, the matched-pixel position decoding unit 6201 selects one of the correspondence tables between the code word and vector information shown in FIGS. 15A to 15C. By using the selected table, the matched-pixel position decoding unit 6201 decodes vector information on the assumption that the input encoded data is encoded data of vector information. The decoded vector information is output to the selector 6202 via the signal line 6203. The matched-pixel position decoding unit 6201 compares the decoded vector information with the color count Nc. When the decoded vector information coincides with the color count Nc, the matched-pixel position decoding unit 6201 outputs "1" as surrounding-pixel state information from the signal line 6010; otherwise, "0". When the color count Nc is 4, the matched-pixel position decoding unit 6201 outputs "1" as surrounding pixel state information to the signal line 6010, and outputs "4" as the vector information to the signal line 6203. As a result, the surrounding pixel state information and vector information become identical to those in FIG. 37.

In accordance with the vector information input from the matched-pixel position decoding unit 6201 via the signal line 6203, the selector 6202 selects and outputs one of the component values of the pixels Xa, Xb, Xc, and Xd around the pixel X of interest. When the vector information is "0", the selector 6203 selects each component value of Xa. When the vector information is "1", the selector 6203 selects each component value of a pixel having the second pixel value (color) which can be first detected to be different from Xa in the order of Xa, Xb, Xc, and Xd. Similarly, when the vector information is "2", the selector 6202 selects and outputs each component value of a pixel having the third pixel value different from the first pixel value (Xa) and second pixel value in the order of Xa, Xb, Xc, and Xd. When the neighborhood matching information is "3" or "4", an output from the selector 6202 is invalid. In this case, the switch 6006 connected to the neighborhood matching information decoding unit 6003 is connected to the terminal b, and an output from the selector 6202 is ignored.

When the surrounding pixel state information input from the signal line 6010 is "0" (the number of colors in the four surrounding pixels is 3 or less, and a pixel having the same color as that of the pixel of interest exists in the four surrounding pixels), the switch 6006 is connected to the terminal a. Resultantly, a pixel value output from the neighborhood matching information decoding unit 6003 is sent to the switch 6007. When the surrounding pixel state information is "1", the switch 6006 is connected to the terminal b so as to send, to the switch 6007, an uncompressed pixel value of each component that is extracted from the code buffer 6001.

When the color count Nc output from the color count determination unit 5101 is 4, the predictively encoded data-of-component value decoding unit 6004 reads out encoded data from the code buffer 6001, and decodes the R, G, and B components of the pixel.

Figure 31:
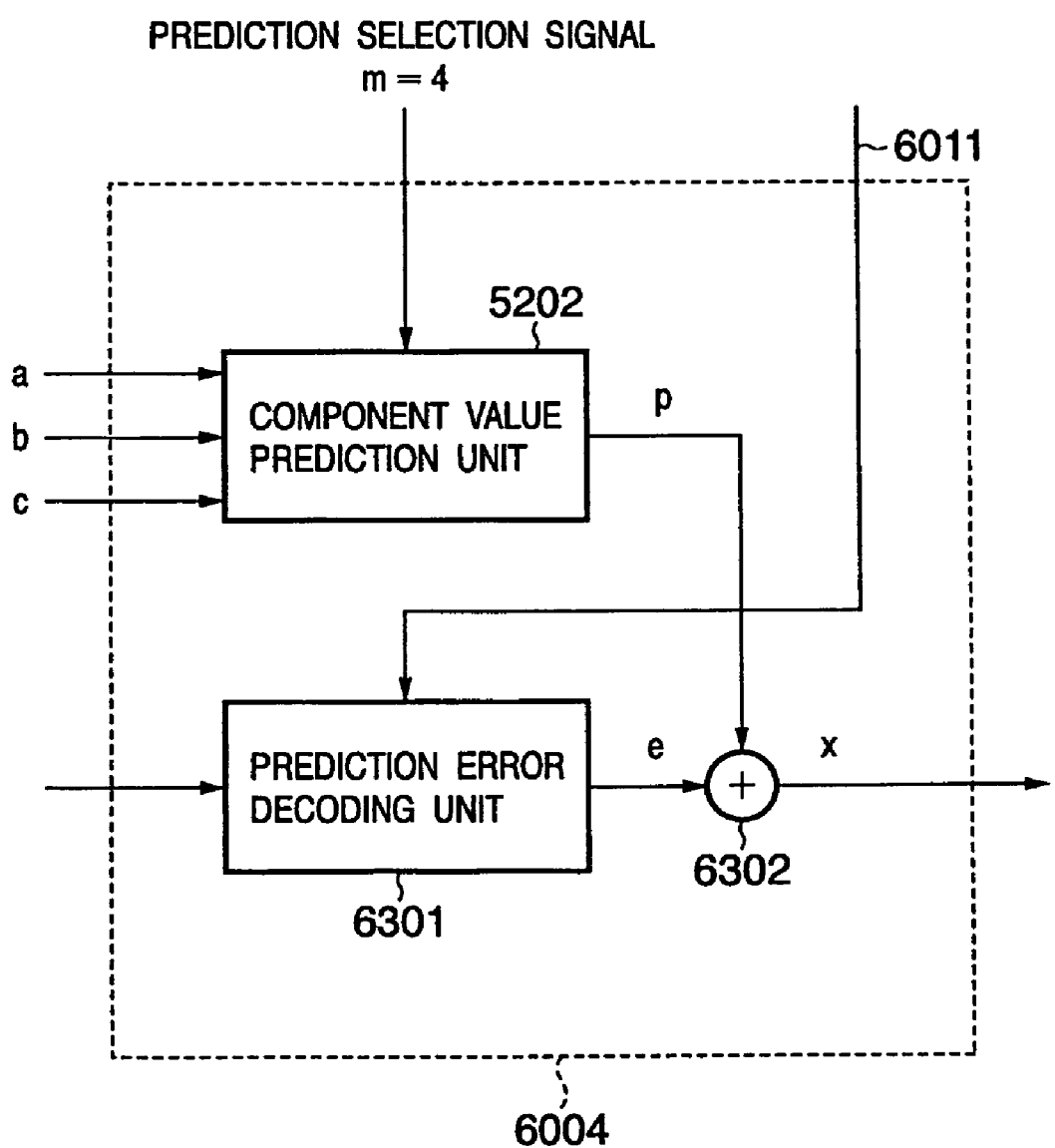
FIG. 31 is a block diagram showing the internal configuration of a predictively encoded data-of-component value decoding unit 6004.

FIG. 31 is a block diagram showing details of the predictively encoded data-of-component value decoding unit 6004. As shown in FIG. 31, the predictively encoded data-of-component value decoding unit 6004 is made up of a component value prediction unit 5202, prediction error decoding unit 6301, and: adder 6302. Reference numeral 6011 denotes a signal line. A process performed in the predictively encoded data-of-component value decoding unit 6004 will be explained with reference to FIG. 31.

When the color count Nc input from the signal line 6011 is 4, the prediction error decoding unit 6301 decodes the prediction error of the component of interest in the pixel of interest by a decoding procedure paired with the encoding process of the prediction error encoding unit 5701 that has been described in the seventh embodiment. Similar to the prediction error encoding unit 5701, the prediction error decoding unit 6301 comprises a counter N which holds the number of encoded pixels, and counters A[C] (C is a component number of 0 to 2) each of which holds the sum of the absolute values of encoded prediction errors for each component. At the start of decoding, the counter N is set to 1, and the counters A[0] to A[2] are set to 2. In decoding the component value of interest in the pixel of interest, the same value as the parameter k used for encoding is derived from N and A[0] to A[2] by the same method as that in encoding. By using the parameter k, a nonnegative integral value V is decoded. A Golomb code is decoded by procedures opposite to the encoding procedures. First, the run of "0"s is checked after the start of decoding, and acquired as an integral value m. Then, k bits are extracted immediately after "1" which terminates the run of "0"S. The integral value m is shifted to the left by k bits, and ORed with the extracted k bits to decode the nonnegative integral value V. A prediction error e is decoded from the nonnegative integral value V by the following equations:

When V is an odd number, $e=-(V+1)/2$

When V is an even number, $e=V/2$

Similar to the seventh embodiment, the component value prediction unit 5202 generates a predicted value p. The adder 6302 reconstructs and outputs the component value of interest. After each component is decoded, the counter A[C] is updated by adding the absolute value |e| of the decoded prediction error to the counter A[C]. After all the components of the pixel of interest are decoded, the counter N is incremented by one and updated. In order to limit A[C] and N within a predetermined range, a process of updating A[C] and N to ½ at the timing when N reaches a predetermined value (e.g., 32) is applied. This process must be executed commonly on the encoding and decoding sides in order to obtain the same parameter k on the two sides.

The above process is executed for all the components of the pixel of interest to decode and output them.

Referring back to the description of FIG. 28, when the color count Nc output from the color count determination unit 5101 is 4, the switch 6007 is connected to the terminal b; otherwise, to the terminal a.

When the color count Nc output from the color count determination unit 5101 is 1, the run-length decoding unit 6005 reads out encoded data from the code buffer 6001, and decodes the run RL of the same pixel value as the immediately preceding pixel Xa, and outputs RL pixel values Xa as decoded pixel values (RL may be 0). The decoding process of the run-length decoding unit 6005 is paired with the encoding process of the run-length encoding unit 5104 in the seventh embodiment.

When the color count Nc changes to 1 from another value, the next code word is read out from the code buffer 6001 by giving priority to a request from the run-length decoding unit 6005 rather than one from the neighborhood matching information decoding unit 6003. This is because, when the color count Nc changes to 1 from another value, encoded data to be decoded is a run-length encoded word.

When the color count No output from the color count determination unit 5101 is 1, the switch 6008 is connected to the terminal b. The switch 6008 is fixed to the terminal b while RL pixel values Xa decoded by the run-length decoding unit 6005 are output. After the RL pixel values Xa are output, the switch 6008 is connected to the terminal a.

The decoded values of the respective components of pixels are output from the signal line 6012. The decoded values are also stored in the buffer 5201, and used as surrounding pixel values in decoding a subsequent pixel.

By the above operation, original image data can be completely reconstructed (decoded) from encoded data which is generated in the seventh embodiment and its modification.

Modification to Eighth Embodiment

Figure 36:
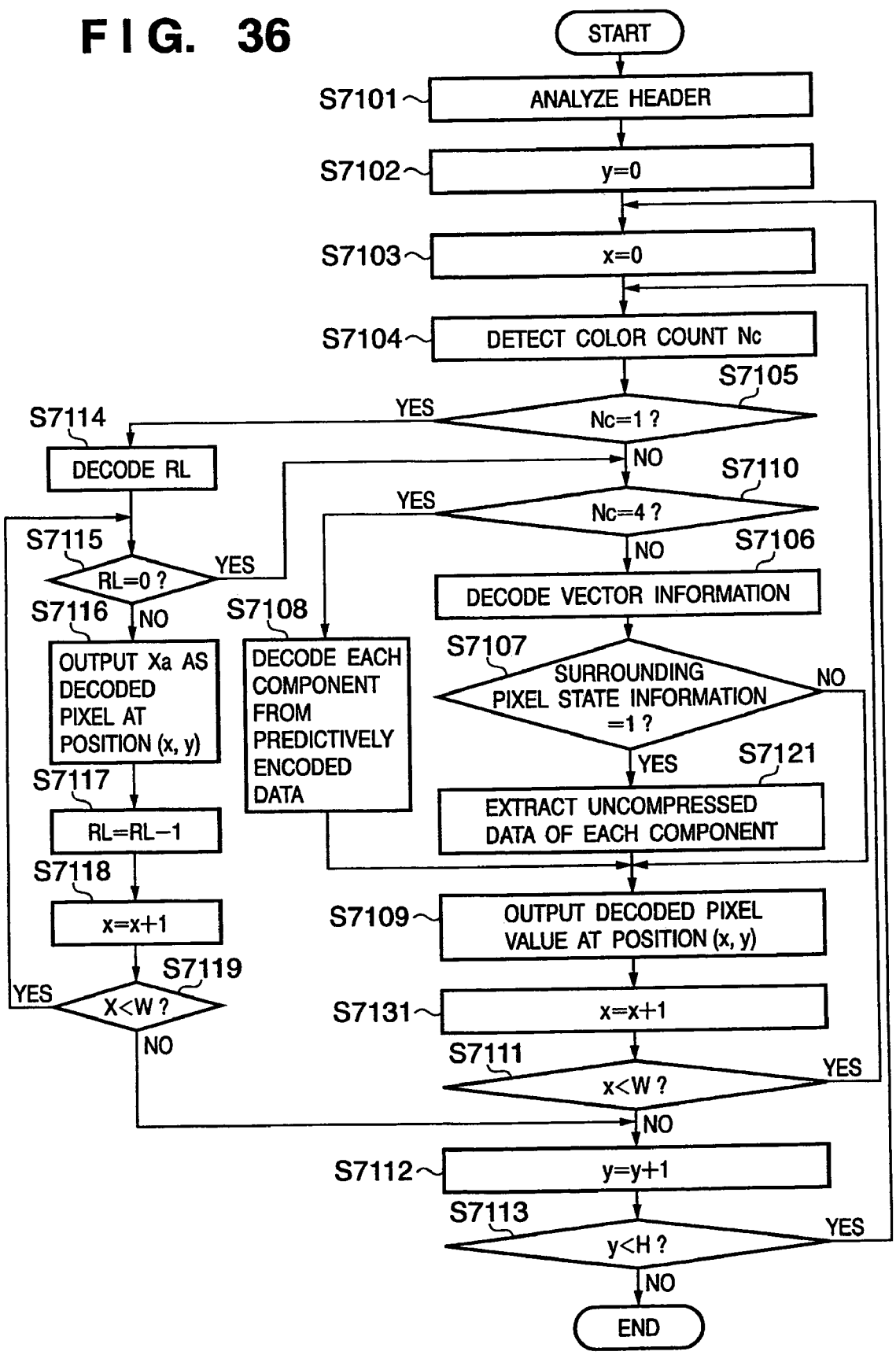
FIG. 36 is a flowchart showing process procedures according to a modification to the eighth embodiment.

The eighth embodiment may be implemented by software. An example of the software will be explained. An apparatus configuration when the apparatus is implemented by software is the same as that in FIG. 14 which is referred to in the modification to the seventh embodiment, and a description thereof will be omitted. The process procedures of a decoding application which runs in the apparatus will be described with reference to the flowchart of FIG. 36. Processes corresponding to various processing units shown in FIG. 28 are implemented by functions, subroutines, and the like in software. In the modification, the names of the processing units in FIG. 28 are directly used for descriptive convenience. The process content of each unit corresponds to a process described in the eighth embodiment. As a matter of course, the buffer 5201 and code buffer 6001 are allocated in a RAM 1402 by a CPU 1401 prior to the start of a process.

In step S7101, encoded data to be decoded is input from the signal line 6009 to the code buffer. The header analysis unit 6002 analyzes the header of the encoded data to extract additional information necessary for decoding. A counter y which holds the vertical position of the pixel of interest is set to 0 (step S7102), and a counter x which holds the horizontal position of the pixel of interest is set to 0 (step S7103). Attention is given to a pixel positioned at coordinates (x,y), and the color count determination unit 5101 obtains the color count Nc by referring to decoded surrounding pixels Xa, Xb, Xc, and Xd (step S7104). If the color count Nc is 1 (YES in S7105), the process shifts to step S7114; if NO, to step S7110

(step S7105). If YES in step S7105, the switch 6008 is connected to the terminal b; if NO, to the terminal a.

In step S7110, the color count Nc is compared with 4. If Nc=4, the switch 6007 is connected to the terminal b, and the predictively encoded data-of-component value decoding unit 6004 decodes each component of the pixel of interest step 6004 (step S7108). If Nc≠4, the switch 6007 is connected to the terminal a, the switch 6006 is connected to the terminal a, and the neighborhood matching information decoding unit 6003 decodes vector information. If the decoded value of the vector information is different from the color count Nc, one of Xa, Xb, Xc, and Xd is selected and output in accordance with the decoded value (step S7106). The neighborhood matching information decoding unit 6003 outputs, to the signal line 6010, surrounding pixel state information representing whether the decoded vector information coincides with the color count Nc.

It is determined whether the surrounding pixel state information is "1" (step S7107). If the surrounding pixel state information is "1", the switch 6006 is switched to the terminal b to extract and output each uncompressed component value contained in the encoded data (step S7121). The obtained pixel value is output as a decoded pixel value at the position (x,y) from the signal line 6012 via the switches 6007 and 6008 (step S7109).

The counter x which holds the horizontal position of the pixel of interest is incremented by one (step S7131). The counter x is compared with the horizontal pixel count W. If x<W (YES in step S7111), the process returns to step S7104 to perform the decoding process for the next pixel. If x≧W (NO in step S7111), the process shifts to step S7112 (step S7111).

If it is determined in step S7105 that the color count Nc is 1, the process shifts to step S7114, and the run-length decoding unit 6005 internally decodes the run length RL. The decoded run length RL is compared with 0 (step S7115). If RL=0 (YES in step S7115), the process shifts to step S7120. In this case, the connection of the switch 6008 is changed from the terminal b to the terminal a.

If it is determined in step S7115 that RL≠0. Xa is output as a decoded pixel value at the position (x,y) to the signal line 6012 via the switch 6008 (step S7116). The counter RL is decremented by one (step S7117), and the counter x which holds the horizontal position of the pixel of interest is incremented by one (step S7118). In step S7119, the counter x is compared with the horizontal pixel count W. If x<W, the process returns to step S7115; if x≧W, the process shifts to step S7112 (step S7119).

In step S7112, the counter y which holds the vertical position of the pixel of interest is incremented by one, and compared with the vertical pixel count H of the image. If y<H (YES in step S7113), the process returns to step S7103 to similarly process each pixel on the next line. If y≦H (NO in step S7113), the decoding process for the target image data ends (step S7113).

By the above operation, original image data can be completely reconstructed from encoded data, similar to the eighth embodiment.

Ninth Embodiment

In the image processing apparatus according to the seventh embodiment, whether to encode vector information is switched in accordance with the number of colors in surrounding pixels. More specifically, the number of colors in four surrounding pixels is counted. When there are four colors, each component is predictively encoded without encoding any vector information. When there are one to three colors, vector information is encoded. If none of the four surrounding pixels has the same pixel value as that of the pixel of interest, each component value is transmitted without compression.

However, the switching method is not limited to the above one, and whether to encode vector information may be switched by referring to information other than the number of colors. The ninth embodiment will describe a configuration in which the magnitudes of difference values between surrounding pixels are compared, and when the number of colors is one or two and when the number of colors is three and the difference between surrounding pixels is large, vector information is encoded.

Figure 32:
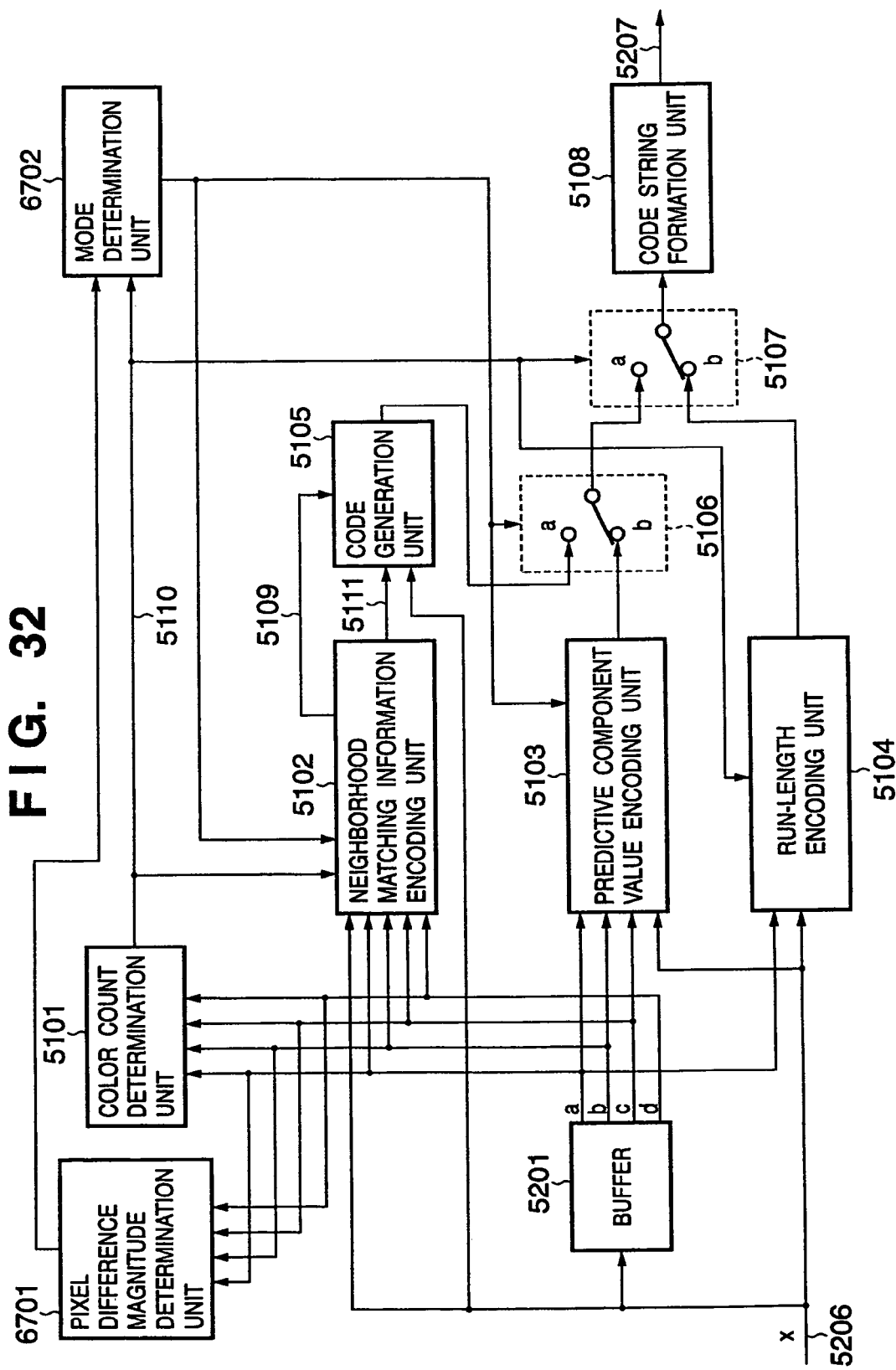
FIG. 32 is a block diagram showing the functional configuration of an image processing apparatus according to the ninth embodiment.

FIG. 32 is a block diagram showing the functional configuration of an image processing apparatus according to the ninth embodiment. As shown in FIG. 32, the image processing apparatus according to the ninth embodiment is configured by adding a pixel difference magnitude determination unit 6701 and mode determination unit 6702 to the block diagram of FIG. 24 that has been described in the seventh embodiment. The same reference numerals denote blocks which perform the same operations as those of processing blocks in the image processing apparatuses according to the seventh embodiment, and a description thereof will be omitted. As described in the modification to the seventh embodiment, the functions of respective units shown in FIG. 32 may be implemented by a program which causes a computer to implement them.

A difference of an image encoding process performed by the image processing apparatus according to the ninth embodiment from that performed by the image processing apparatus according to the first embodiment will be explained with reference to FIG. 32.

Image data to be encoded by the image processing apparatus according to the ninth embodiment is image data of C, M, Y, and K colors. Each component (color component) is formed from pixel data which expresses a density value of 0 to 255 by 8 bits. Image data to be encoded is formed by laying out pixels dot-sequentially, i.e., in the raster scan order, and each pixel is formed by laying out data in the order of C, M, Y, and K. An, image is made up of W horizontal pixels and H vertical pixels. CMYK color image data can be processed almost similarly to RGB color image data. Processes for the three R, G, and B components by the image processing apparatus according to the first embodiment are performed for the four C, M, Y, and K components.

The pixel difference magnitude determination unit 6701 reads out, from a buffer 5201, component values a, b, c, and d of interest in four pixels Xa, Xb, Xc, and Xd around the pixel X of interest. For the respective C, M, Y, and K components, the pixel difference magnitude determination unit 6701 calculates the sums Dc, Dm, Dy, and Dk of the absolute values of differences between a and b, b and c, and c and d. The pixel difference magnitude determination unit 6701 adds the sums Dc, Dm, Dy, and Dk calculated for the respective components, obtaining the total sum D of the differences between the pixels. The total sum D is compared with a predetermined threshold Th. If D≧Th, the pixel difference magnitude determination unit 6701 outputs "1" as a result of magnitude determination; if D<Th, "0". When the surrounding pixel value greatly changes, "1" is output, and when it hardly changes, "0" is output.

The mode determination unit 6702 determines whether to encode vector information, in accordance with the determination result of the pixel difference magnitude determination unit 6701 and a color count Nc output from a color count determination unit 5101. The mode determination unit 6702 outputs "1" as a mode determination result when vector information is to be encoded, and "0" when it is not encoded.

More specifically, vector information is encoded when either of the following two conditions is satisfied:

i) the color count Nc is 1 or 2, or ii) the color count Nc is 3 and an output from the pixel difference magnitude determination unit 6701 is "1".

If either of these conditions is not met, the mode determination unit 6702 determines not to encode vector information, and outputs "0" as a mode determination result.

In the seventh embodiment, the operations of the neighborhood matching information encoding unit 5102, predictive component value encoding unit 5103, and switch 5106 are explained separately in a case wherein the color count Nc takes a value of 1 to 3 and a case wherein the color count. Nc is 4. In the ninth embodiment, when an output from the mode determination unit 6702 is "1", the same operation as that when the color count Nc takes a value of "1" to 3, which has been described in the seventh embodiment, is performed. When an output from the mode determination unit 6702 is "0", the same operation as that when the color count Nc is 4 is performed.

When the encoding process by the image processing apparatus according to the ninth embodiment is implemented by a computer program, the flow is almost the same as the flowchart shown in FIG. 34 according to the seventh embodiment, except a process in step S6922. In step S6922 of the seventh embodiment, the process branches to step S6908 or S6906 in accordance with whether the color count Nc is 4. To the contrary, in the ninth embodiment, the pixel difference magnitude determination unit 6701 determines the magnitudes of difference values between surrounding pixels, and the mode determination unit 6702 determines whether to encode neighborhood matching information. If an output from the mode determination unit 6702 is "0" (YES), a switch 5106 is connected to the terminal b, and the process shifts to step S6908. If an output from the mode determination unit 6702 is "1", the switch 5106 is connected to the terminal a, and the process shifts to step S6906.

Also in the ninth embodiment, a CPU 1401 can operate to losslessly encode an image.

As described above, the image processing apparatus according to the ninth embodiment applies predictive encoding when the number of surrounding colors is small (three colors in the ninth embodiment) but the difference values between surrounding pixels are small. That is, encoded neighborhood matching information and each component are transmitted without compression for a part at which a large prediction error is readily generated. Predictive encoding is applied to only a part at which predictive encoding is considered preferable. Hence, implementation of more efficient encoding can be expected.

Note that encoded data which is generated by the image processing apparatus according to the ninth embodiment is decoded by procedures opposite to the encoding process. It will readily occur to those skilled in the art that the decoding process at this time can be implemented by adding a change corresponding to the above-mentioned change to the image processing apparatus according to the eighth embodiment that has been described as an apparatus for decoding encoded data which is generated by the image processing apparatus according to the seventh embodiment.

10th Embodiment

In the image processing apparatuses according to the seventh and ninth embodiments, neighborhood matching information is encoded. If the same pixel value as that of the pixel of interest does not exist in surrounding pixels (the pixel values do not match each other), each component value is transmitted at the original bit precision without compression. However, the code amount can also be reduced by a method other than predictive transform. An example of this method will be explained as the 10th embodiment.

Figure 33:
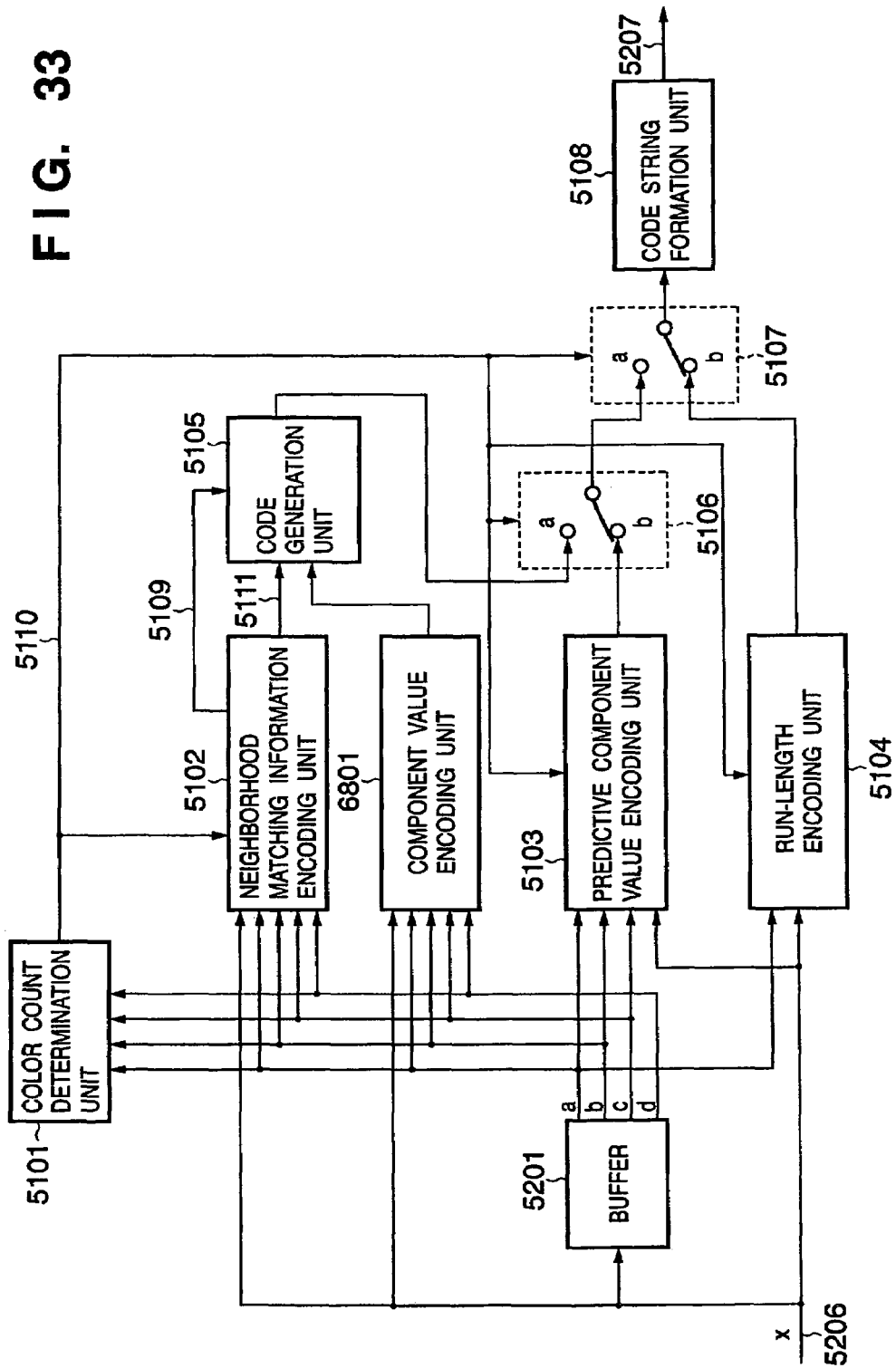
FIG. 33 is a block diagram showing the functional configuration of an image processing apparatus according to the 10th embodiment.

FIG. 33 is a block diagram showing the functional configuration of an image processing apparatus according to the 10th embodiment. As shown in FIG. 33, the image processing apparatus according to the 10th embodiment is configured by adding a component value encoding unit 6801 to FIG. 24 showing the block configuration of the image processing apparatus according to the seventh embodiment. The same reference numerals denote blocks which perform the same operations as those of processing blocks in the image processing apparatuses according to the seventh embodiment, and a description thereof will be omitted. Also in the 10th embodiment, the functions of respective units shown in FIG. 33 can be apparently implemented by a program which causes a computer to implement them. In this case, the program is loaded into a RAM 1402 from an external storage device 1407 in FIG. 14, a storage medium drive 1408, or an external apparatus via an I/F 1409.

A difference of an image encoding process performed by the image processing apparatus according to the 10th embodiment from that according to the seventh embodiment will be explained with reference to FIG. 33.

Also in the 10th embodiment, similar to the seventh embodiment, image data of R, G, and B colors is encoded. Each component (color component) is formed from pixel data which expresses a luminance value of 0 to 255 by 8 bits.

The component value encoding unit 6801 reads out, from a buffer 5201, component values a, b, c, and d of interest in four pixels Xa, Xb, Xc, and Xd around the pixel X of interest. The component value encoding unit 6801 calculates exclusive-ORs R1, R2, and R3 of a and b, a and c, and a and d, and calculates an OR R of R1, R2, and R3:

$R1 = a \text{ xor } b$ $R2 = a \text{ xor } c$ $R3 = a \text{ xor } d$ $R = R1 | R2 | R3$ Each bit of the calculated variable R represents that a, b, c, and d all are common at a digit position whose bit is "0", and are not common at a digit position whose bit is "1".

The run n of "0"s from the most significant bit MSB of the variable R toward a lower bit is obtained. Upper n bits of the component value a are compared with those of the component x of interest in the pixel X of interest. If these upper bits match each other, "1" is output as a code; if they do not match each other, "0" is output.

If these upper bits match each other ("1" is output), this means that n bits from the MSB of the component x of the pixel X of interest toward a lower bit match those of the surrounding pixel. Subsequently, lower (8-n) bits of the component x are output without compression. If these upper bits do not match each other ("0" is output), all bits subsequent to x are output without compression.

In decoding, R is obtained by the same process as the above one. Since it is known how many difference bits follow one bit representing a match/mismatch, encoded data can be correctly decoded.

Figure 35:
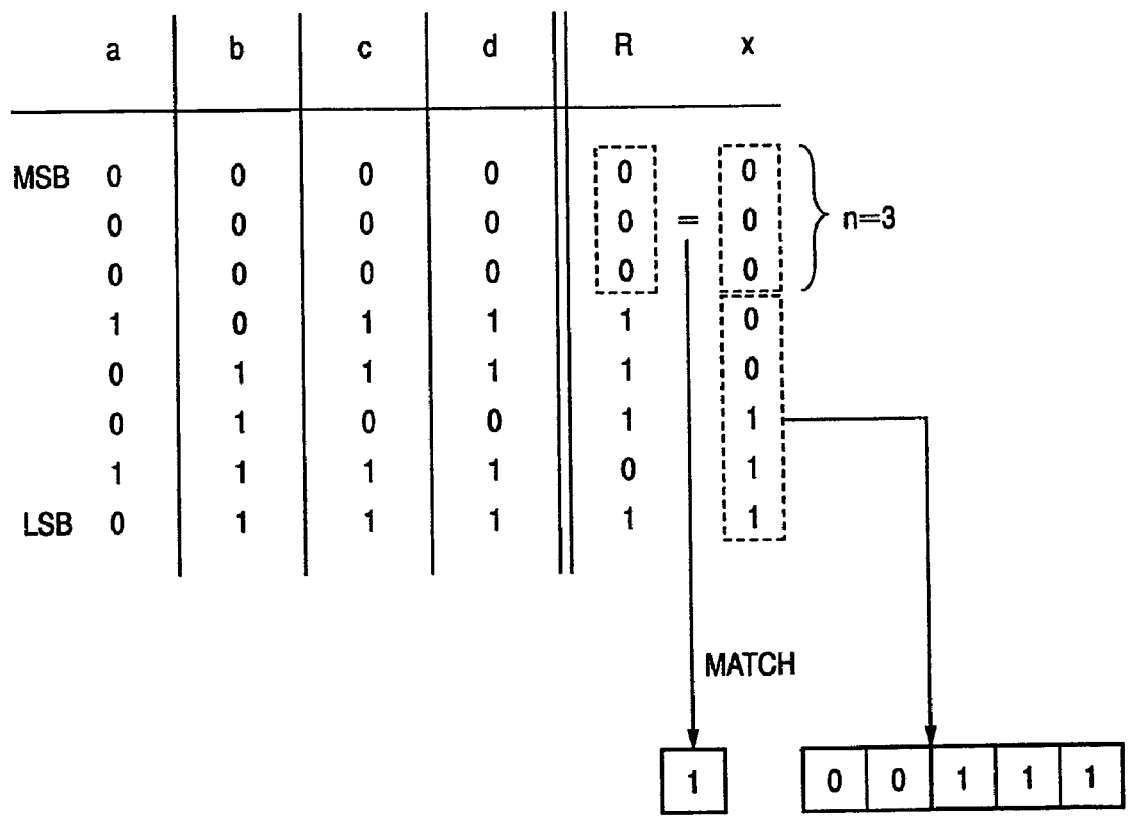
FIG. 35 is a table for explaining the contents of an encoding process by a component value encoding unit 6801 according to the 10th embodiment.

FIG. 35 shows how to form a code by the component value encoding unit 6801. In FIG. 35, the component value x of the pixel of interest=7(0x7) is encoded at a=18(0x12), b=15 (0x0f), and c=d=27(0x1b). In this case, a, b, c, and d have common upper 3 bits (n=3), the component value x to be encoded also has the same upper 3 bits to those of a to d, and thus "1" representing a match is output. Subsequently, lower 5-bit information "00111B" (B means a binary number) is output.

In FIG. 35, if x=128(0x80), "0" representing that upper 3 bits do not match corresponding ones is output. Then, all the bits "10000000B" of x are output. This process is performed for all the R, G, and B components to encode these component values.

The encoded data is output as a code word for R, G, and B in FIG. 26B.

The flow of the encoding process by the image processing apparatus according to the 10th embodiment is almost the same as the flowchart shown in FIG. 34 according to the modification to the seventh embodiment, except a process in step S6923. In step S6923 of the seventh embodiment, each component is output without compression. In the 10th embodiment, the component value encoding unit 6801 encodes and outputs each component.

Similar to the seventh embodiment and its modification, it is apparent that a process complying with the flowchart shown in FIG. 34 can be achieved by loading a program complying with FIG. 34 into a RAM 1402 and executing it by a CPU 1401.

As described above, the image processing apparatus according to the 10th embodiment encodes neighborhood matching information, and if a mismatch occurs, each component value of the pixel of interest is encoded by a method other than predictive encoding. The 10th embodiment can increase the compression ratio more than in the seventh embodiment.

Note that encode data which is generated by the image processing apparatus according to the 10th embodiment is decoded by procedures opposite to the encoding process. This can be implemented by only adding a change corresponding to the above-mentioned change to the image processing apparatus according to the eighth embodiment that has been described as an apparatus for decoding encoded data which is generated by the image processing apparatus according to the seventh embodiment. A description of the decoding process will be omitted.

Other Embodiment

The present invention is not limited to the above-described embodiments.

The seventh to 10th embodiments have described configurations for neighborhood matching information encoding, run-length encoding, and predictive encoding. These embodiments are suitable to obtain higher compression ratio regardless of the feature of an image such as a text, line art, CG image, or natural image. However, neither run-length encoding nor predictive encoding need always be used.

Neighborhood matching information encoding uses a code word which is defined in advance on the assumption of the probability distribution. However, a code word different from those in the above examples may be used, or a different encoding method such as an arithmetic code may be applied.

The above embodiments employ Golomb encoding as entropy encoding of the prediction error of a component value. Another entropy encoding such as Huffman encoding may also be adopted.

As pixel values around the pixel X of interest X, Xa, Xb, Xc, and Xd are referred to. Alternatively, a larger number of pixels may be referred to, or the number of reference pixels may be decreased to, e.g., only Xa and Xb.

Encoding of an RGB image and CMYK image as the color space of a color image has been described.

However, the present invention can be applied to image data (e.g., an Lab image or YCrCb image) made up of a plurality of components, and is not limited to the above embodiments. In the above description, the input order of image data is the raster scan order. An image may be decomposed into bands each having a predetermined number of lines, and the bands may be scanned one by one preferentially in the vertical direction. In this case, reference pixels are set from encoded pixels in accordance with the scanning method.

The above embodiments have described the encoding and decoding apparatuses as separate apparatuses. Needless to say, one apparatus is equipped with these two functions to integrate common units.

As is apparent from the description of the embodiments, the present invention can be applied to any apparatus such as a digital camera as far as the apparatus encodes/decodes an image.

As described above in the embodiments, the present invention can be implemented even by a computer program. The present invention may be stored as firmware in an apparatus, or can be simply applied to an application program or driver program in a PC or the like. In general, a computer program can be executed by setting a computer-readable storage medium such as a CD-ROM into a computer, and copying or installing the program in the system. The computer-readable storage medium apparently falls within the scope of the present invention.

As many apparently widely different embodiments of the present invention can be made without departing from the spirit and scope thereof, it is to be understood that the invention is not limited to the specific embodiments thereof except as defined in the claims.

This application claims the benefit of Japanese Application No. 2005-059361, filed Mar. 3, 2005, 2005-059363, filed Mar. 3, 2005, which are hereby incorporated by reference herein in their entirety.

What is claimed is:

1. An image encoding apparatus which receives image data in which one pixel is formed from a plurality of color component data, and losslessly encodes the image data, comprising:

predictive encoding means for obtaining predicted values of respective color component data which form input pixel data of interest, by referring to color component data of an encoded pixel near the pixel of interest, and generating predictively encoded data;

color counting means for counting the number of colors contained in a plurality of pixel data at encoded pixel positions near the pixel of interest, and generating color count information;

vector information generation means for comparing the pixel data of interest with the plurality of pixel data present at the encoded pixel positions near the pixel of interest, and generating-vector information for specifying whether a neighboring pixel having the same color as a color of the pixel of interest exists, and when the neighboring pixel having the same color exists, specifying a position of the neighboring pixel relative to the pixel of interest;

vector information encoding means for encoding the vector information; and encoded data generation means for generating encoded data to be output, from encoded data obtained by said predictive encoding means and said vector information encoding means on the basis of the color count information obtained by said color counting means and the vector information obtained by said vector information generation means, wherein when the number of colors represented by the color count information is not more than a predetermined threshold and the vector information represents presence of a neighboring pixel having the same color as the color of the pixel of interest, said encoded data generation means outputs the encoded data generated by said vector information encoding means as encoded data of the pixel of interest, when the number of colors counted by said color counting means is not more than the predetermined threshold and the vector information represents absence of a neighboring pixel having the same color as the color of the pixel of interest, said encoded data generation means outputs, as encoded data of the pixel of interest, the encoded data generated by said vector information encoding means and the predictively encoded data generated by said predictive encoding means, and when the number of colors counted by said color counting means exceeds the predetermined threshold, said encoded data generation means outputs the predictively encoded data generated by said predictive encoding means as encoded data of the pixel of interest.

2. The apparatus according to claim 1, wherein said vector information generation means generates vector information corresponding to the number of colors represented by the color count information obtained by said color counting means, and said vector information encoding means generates a code word of the vector information by using a code which is formed in accordance with a probability distribution assumed for the number of colors represented by the color count information.

3. The apparatus according to claim 1, further comprising:

run-length encoding means for, when a run of pixels having the same color is predicted from encoded pixels, counting the number of subsequently input pixels having the same color as a color of a predetermined encoded pixel, and outputting encoded data of a counted run; and switching means for selecting and outputting the encoded data from said run-length encoding means at a timing when said run-length encoding means generates encoded data of a run of pixels having the same color, and when no run of pixels is predicted from encoded pixels, selecting and outputting the encoded data from said encoded data generation means.

4. A method of controlling an image encoding apparatus which receives image data in which one pixel is formed from a plurality of color component data, and losslessly encodes the image data, comprising:

a predictive encoding step of obtaining predicted values of respective color component data which form input pixel data of interest, by referring to color component data of an encoded pixel near the pixel of interest, and generating predictively encoded data;

a color counting step of counting the number of colors contained in a plurality of pixel data at encoded pixel positions near the pixel of interest, and generating color count information;

a vector information generation step of comparing the pixel data of interest with the plurality of pixel data present at the encoded pixel positions near the pixel of interest, and generating vector information for specifying whether a neighboring pixel having the same color as a color of the pixel of interest exists, and when the neighboring pixel having the same color exists, specifying a position of the neighboring pixel relative to the pixel: of interest;

a vector information encoding step of encoding the vector information; and an encoded data generation step of generating encoded data to be output, from encoded data obtained in the predictive encoding step and the vector information encoding step on the basis of the color count information obtained in the color counting step and the vector information obtained in the vector information generation step, wherein in the encoded data generation step, when the number of colors represented by the color count information is not more than a predetermined threshold and the vector information represents presence of a neighboring pixel having the same color as the color of the pixel of interest, the encoded data generated in the vector information encoding step is output as encoded data of the pixel of interest, when the number of colors counted in the color counting step is not more than the predetermined threshold and the vector information represents absence of a neighboring pixel having the same color as the color of the pixel of interest, the encoded data generated in the vector information encoding step and the predictively encoded data generated in the predictive encoding step is output as encoded data of the pixel of interest, and when the number of colors counted in the color counting step exceeds the predetermined threshold, the predictively encoded data generated in the predictive encoding step is output as encoded data of the pixel of interest.

5. A computer program which is loaded into a computer and executed to function as an image encoding apparatus that receives image data in which one pixel is formed from a plurality of color component data, and losslessly encodes the image data, functioning as:

predictive encoding means for obtaining predicted values of respective color component data which form input pixel data of interest, by referring to color component data of an encoded pixel near the pixel of interest, and generating predictively encoded data;

color counting means for counting the number of colors contained in a plurality of pixel data at encoded pixel positions near the pixel of interest, and generating color count information;

vector information generation means for comparing the pixel data of interest with the plurality of pixel data present at the encoded pixel positions near the pixel of Interest, and generating vector information for specifying whether a neighboring pixel having the same color as a color of the pixel of interest exists, and when the neighboring pixel having the same color exists, specifying a position of the neighboring pixel relative to the pixel of interest;

vector information encoding means for encoding the vector information; and encoded data generation means for generating encoded data to be output, from encoded data obtained by said predictive encoding means and said vector information encoding means on the basis of the color count information obtained by said color counting means and the vector information obtained by said vector information generation means, wherein said encoded data generation means functions to when the number of colors represented by the color count information is not more than a predetermined threshold and the vector information represents presence of a neighboring pixel having the same color as the color of the pixel of interest, output the encoded data generated by said vector information encoding means as encoded data of the pixel of interest, when the number of colors counted by said color counting means is not more than the predetermined threshold and the vector information represents absence of a neighboring pixel having the same color as the color of the pixel of interest, output, as encoded data of the pixel of interest, the encoded data generated by said vector information encoding means and the predictively encoded data generated by said-predictive encoding means, and when the number of colors counted by said color counting means exceeds the predetermined threshold, output the predictively encoded data generated by said predictive encoding means as encoded data of the pixel of interest.

6. A computer-readable storage medium storing a computer program defined in claim 5.

7. An image decoding apparatus which decodes image data that has one pixel formed from a plurality of color component data and is encoded in a predetermined pixel order, comprising:

storage means for storing decoding results by a predetermined number of lines, and performing initialization by data of a predetermined color prior to start of decoding;

predictive decoding means for obtaining a predicted value by referring to color component data of a decoded pixel near input pixel data of interest, and decoding predictively encoded data;

color counting means for counting the number of colors contained in a plurality of pixel data at decoded pixel positions near the pixel of interest, and generating color count information;

first decoded data output means for, when the number of colors in the color count information obtained by said color counting means exceeds a predetermined number, determining that encoded data of the pixel of interest is predictively encoded data, and outputting a decoding result obtained by said predictive decoding means as decoded data of the pixel of interest;

vector information decoding means for, when the number of colors in the color count information obtained by said color counting means is not more than the predetermined number, determining that the encoded data of the pixel of interest is vector information, and decoding the vector information;

second decoded data output means for, when the vector information obtained by said vector information decoding means represents a decoded neighboring pixel position having the same color as a color of the pixel of interest, selecting pixel data at a corresponding position in said storage means, and outputting the pixel data as decoded data of the pixel of interest; and third decoded data output means for, when the vector information obtained by said vector information decoding means represents absence of a neighboring pixel position having the same color as the color of the pixel of interest, causing said predictive decoding means to decode encoded data input subsequently to the vector information, and outputting the decoded data as decoded data of the pixel of interest.

8. The apparatus according to claim 7, wherein said vector information decoding means decodes the vector information by using a code which is formed in accordance with a probability distribution assumed for the number of colors represented by the color-count information.

9. The apparatus according to claim 7, comprising:

run-length decoding means for, when a run of pixels having the same color is predicted from decoded pixels, decoding a run of pixels having the same color as a color of a predetermined decoded pixel; and switching means for outputting the decoded data from said run-length decoding means at a timing when said run-length decoding means generates pixel data having the same color, and when no run of pixels having the same color is predicted from decoded pixels, selecting decoded data from said first decoded data output means, said second decoded data output means, and said third decoded data output means, and outputting the selected decoded data.

10. A method of controlling an image decoding apparatus which comprises storage means for storing decoding results by a predetermined number of lines and performing initialization by data of a predetermined dolor prior to start of decoding, and decodes image data that has one pixel formed from a plurality of color component data and is encoded in a predetermined pixel order, comprising:

a predictive decoding step of obtaining a predicted value by referring to color component data of a decoded pixel near input pixel data of interest, and decoding predictively encoded data;

a color counting step of counting the number of colors contained in a plurality of pixel data at decoded pixel positions near the pixel of interest, and generating color count information;

a first decoded data output step of, when the number of colors in the color count information obtained in the color counting step exceeds a predetermined number, determining that encoded data of the pixel of interest is predictively encoded data, and outputting a decoding result obtained in the predictive decoding step as decoded data of the pixel of interest;

a vector information decoding step of, when the number of colors in the color count information obtained in the color counting step is not more than the predetermined number, determining that the encoded data of the pixel of interest is vector information, and decoding the vector information;

a second decoded data output step of, when the vector information obtained in the vector information decoding step represents a decoded neighboring pixel position having the same color as a color of the pixel of interest, selecting pixel data at a corresponding position in the storage means, and outputting the pixel data as decoded data of the pixel of interest: and a third decoded data output step of, when the vector information obtained in the vector information decoding step represents absence of a neighboring pixel position having the same color as the color of the pixel of interest, decoding encoded data input subsequently to the vector information in the predictive decoding step, and outputting the decoded data as decoded data of the pixel of interest.

11. A computer program which is loaded into a computer and executed to function as an image decoding apparatus which decodes image data that has one pixel formed from a plurality of color component data and is encoded in a predetermined pixel order, functioning as:
   allocation means for allocating a buffer memory which stores decoding results by a predetermined number of lines and is initialized by data of a predetermined color prior to start of decoding;
   predictive decoding means for obtaining a predicted value by referring to color component data of a decoded pixel near input pixel data of interest, and decoding predictively encoded data:
   color counting means for counting the number of colors contained in a plurality of pixel data at decoded pixel positions near the pixel of interest, and generating color count information;
   first decoded data output means for, when the number of colors in the color count information obtained by said color counting means exceeds a predetermined number, determining that encoded data of the pixel of interest is predictively encoded data, and outputting a decoding result obtained by said predictive decoding means as decoded data of the pixel of interest;
   vector information decoding means for, when the number of colors in the color count information obtained by said color counting means is not more than the predetermined number, determining that the encoded data of the pixel of interest is vector information, and decoding the vector information;
   second decoded data output means for, when the vector information obtained by said vector information decoding means represents a decoded neighboring pixel position having the same color as a color of the pixel of interest, selecting pixel data at a corresponding position in the buffer memory, and outputting the pixel data as decoded data of the pixel of interest; and
   third decoded data output means for, when the vector information obtained by said vector information decoding means represents absence of a neighboring pixel position having the same color as the color of the pixel of interest, causing said predictive decoding means to decode encoded data input subsequently to the vector information, and outputting the decoded data as decoded data of the pixel of interest.

12. A computer-readable storage medium storing a computer program defined in claim 11.

* * * * *